United States Patent
Iijima et al.

(10) Patent No.: US 10,886,539 B2
(45) Date of Patent: Jan. 5, 2021

(54) CATALYST-CARRIER CARBON MATERIAL, SOLID-POLYMER FUEL CELL CATALYST, SOLID-POLYMER FUEL CELL, AND METHOD FOR MANUFACTURING CATALYST-CARRIER CARBON MATERIAL

(71) Applicants: NIPPON STEEL & SUMITOMO METAL CORPORATION, Tokyo (JP); NIPPON STEEL CHEMICAL & MATERIAL CO., LTD., Tokyo (JP)

(72) Inventors: Takashi Iijima, Tokyo (JP); Noriyuki Negi, Tokyo (JP); Masataka Hiyoshi, Tokyo (JP); Katsumasa Matsumoto, Tokyo (JP); Shinya Furukawa, Tokyo (JP); Kenichiro Tadokoro, Tokyo (JP); Takumi Nishimoto, Tokyo (JP); Hiroyuki Hayashida, Kitakyushu (JP); Takumi Kouno, Kitakyushu (JP); Kazuhiko Mizuuchi, Kitakyushu (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 438 days.

(21) Appl. No.: 15/551,879

(22) PCT Filed: Feb. 17, 2016

(86) PCT No.: PCT/JP2016/054609
§ 371 (c)(1),
(2) Date: Aug. 17, 2017

(87) PCT Pub. No.: WO2016/133132
PCT Pub. Date: Aug. 25, 2016

(65) Prior Publication Data
US 2018/0069247 A1    Mar. 8, 2018

(30) Foreign Application Priority Data

Feb. 18, 2015  (JP) ................................. 2015-029451
Jul. 28, 2015  (JP) ................................. 2015-148565
(Continued)

(51) Int. Cl.
*H01M 4/90*  (2006.01)
*H01M 8/1018*  (2016.01)
(Continued)

(52) U.S. Cl.
CPC .......... *H01M 4/9083* (2013.01); *H01M 4/86* (2013.01); *H01M 4/96* (2013.01); *H01M 8/10* (2013.01);
(Continued)

(58) Field of Classification Search
CPC .................................................. H01M 4/9083
See application file for complete search history.

(56) References Cited

U.S. PATENT DOCUMENTS

2007/0224479 A1   9/2007  Tadokoro et al.
2008/0063915 A1   3/2008  Yamamoto
(Continued)

FOREIGN PATENT DOCUMENTS

JP    11-121297 A    4/1999
JP    2005-25947 A   1/2005
(Continued)

OTHER PUBLICATIONS

Hummers, Jr. et al., "Preparation of Graphitic Oxide," J. Am. Chem. Soc., vol. 80, Mar. 20, 1958, p. 1339.
(Continued)

*Primary Examiner* — Stephan J Essex
(74) *Attorney, Agent, or Firm* — Birch, Stewart, Kolasch & Birch, LLP

(57) ABSTRACT

A carbon material for catalyst carrier use excellent in both durability and power generation performance under operat-
(Continued)

ing conditions at the time of low humidity, in particular both durability of a carbon material for catalyst carrier use with respect to repeated load fluctuations due to startup and shutdown and power generation performance under operating conditions at the time of low humidity, and a catalyst for solid-polymer fuel cell use prepared using the same etc. are provided.

To solve this technical problem, according to one aspect of the present invention, there is provided a carbon material for catalyst carrier use satisfying the following (A) to (D):

(A) an oxygen content $O_{ICP}$ of 0.1 to 3.0 mass % contained in the carbon material for catalyst carrier use;

(B) a residual amount of oxygen $O_{1200°\ C.}$ of 0.1 to 1.5 mass % remaining after heat treatment in an inert gas (or vacuum) atmosphere at 1200° C.;

(C) a BET specific surface area of 300 to 1500 m$^2$/g; and (D) a G-band half-width $\Delta G$ of 30 to 70 cm$^{-1}$ detected in a range of 1550 to 1650 cm$^{-1}$ of the Raman spectrum.

35 Claims, 1 Drawing Sheet

(30) Foreign Application Priority Data

| | | |
|---|---|---|
| Jul. 28, 2015 | (JP) | 2015-148566 |
| Jul. 28, 2015 | (JP) | 2015-148567 |
| Nov. 4, 2015 | (JP) | 2015-216404 |
| Dec. 17, 2015 | (JP) | 2015-246394 |

(51) Int. Cl.

| | |
|---|---|
| *H01M 10/6568* | (2014.01) |
| *H01M 8/10* | (2016.01) |
| *H01M 4/86* | (2006.01) |
| *H01M 4/96* | (2006.01) |
| *H01M 10/61* | (2014.01) |

(52) U.S. Cl.
CPC ......... *H01M 8/1018* (2013.01); *H01M 10/61* (2015.04); *H01M 10/6568* (2015.04); *H01M 2008/1095* (2013.01)

(56) References Cited

U.S. PATENT DOCUMENTS

| | | |
|---|---|---|
| 2009/0208780 A1 | 8/2009 | Sun et al. |
| 2011/0058308 A1 | 3/2011 | Nishi et al. |
| 2013/0023405 A1 | 1/2013 | Hitomi et al. |
| 2014/0154941 A1 | 6/2014 | Zhamu et al. |
| 2015/0352522 A1 | 12/2015 | Mizuuchi et al. |
| 2016/0093892 A1* | 3/2016 | Hori ................ H01M 4/88 429/530 |
| 2016/0315331 A1 | 10/2016 | Yoshiwara et al. |

FOREIGN PATENT DOCUMENTS

| | | |
|---|---|---|
| JP | 2005-332807 A | 12/2005 |
| JP | 2006-294468 A | 10/2006 |
| JP | 2007-220414 A | 8/2007 |
| JP | 2007-335162 A | 12/2007 |
| JP | 2008-41482 A | 2/2008 |
| JP | 2008-123744 A | 5/2008 |
| JP | 2008-269850 A | 11/2008 |
| JP | 2011-3552 A | 1/2011 |
| JP | 2011-28978 A | 2/2011 |
| JP | 2013-58436 A | 3/2013 |
| JP | WO 2014/129597 A1 | 3/2013 |
| JP | 2014-6970 A | 1/2014 |
| WO | WO 2009/075264 A1 | 6/2009 |
| WO | WO 2015/098089 A1 | 7/2015 |

OTHER PUBLICATIONS

International Search Report and Written Opinion of the International Searching Authority (Forms PCT/ISA/210 and PCT/ISA/237) for International Application No. PCT/JP2016/054609, dated May 17, 2016, with English translations.

Rodriguez-Reinoso et al., "Effect of Microporosity and Oxygen Surface Groups of Activated Carbon in the Adsorption of Molecules of Different Polarity," J. Phys. Chem., vol. 96, No. 6, 1992, pp. 2707-2713.

Qiao et al., "Development of Mesophase Pitch Derived Mesoporous Carbons through a commercially Nanosized Temple", Langmuir, vol. 22, 2006, 3791-3797, XP055511665.

Zhang et al., "Modification of Activated Carbon by Means of Microwave Heating and its Effects on the Pore Texture and Surface Chemistry", Research Journal of Applied Sciences, Engineering and Technology, voll. 5, No. 5, 2013, pp. 1791-1795, XP055511397.

Zhu et al., "Chemical and electrochemical ageing of carbon materials used in supercapacitor electrodes", Carbon, vol. 46, 2008 (Available online Jul. 31, 2008), pp. 1829-1840, XP055511883.

* cited by examiner

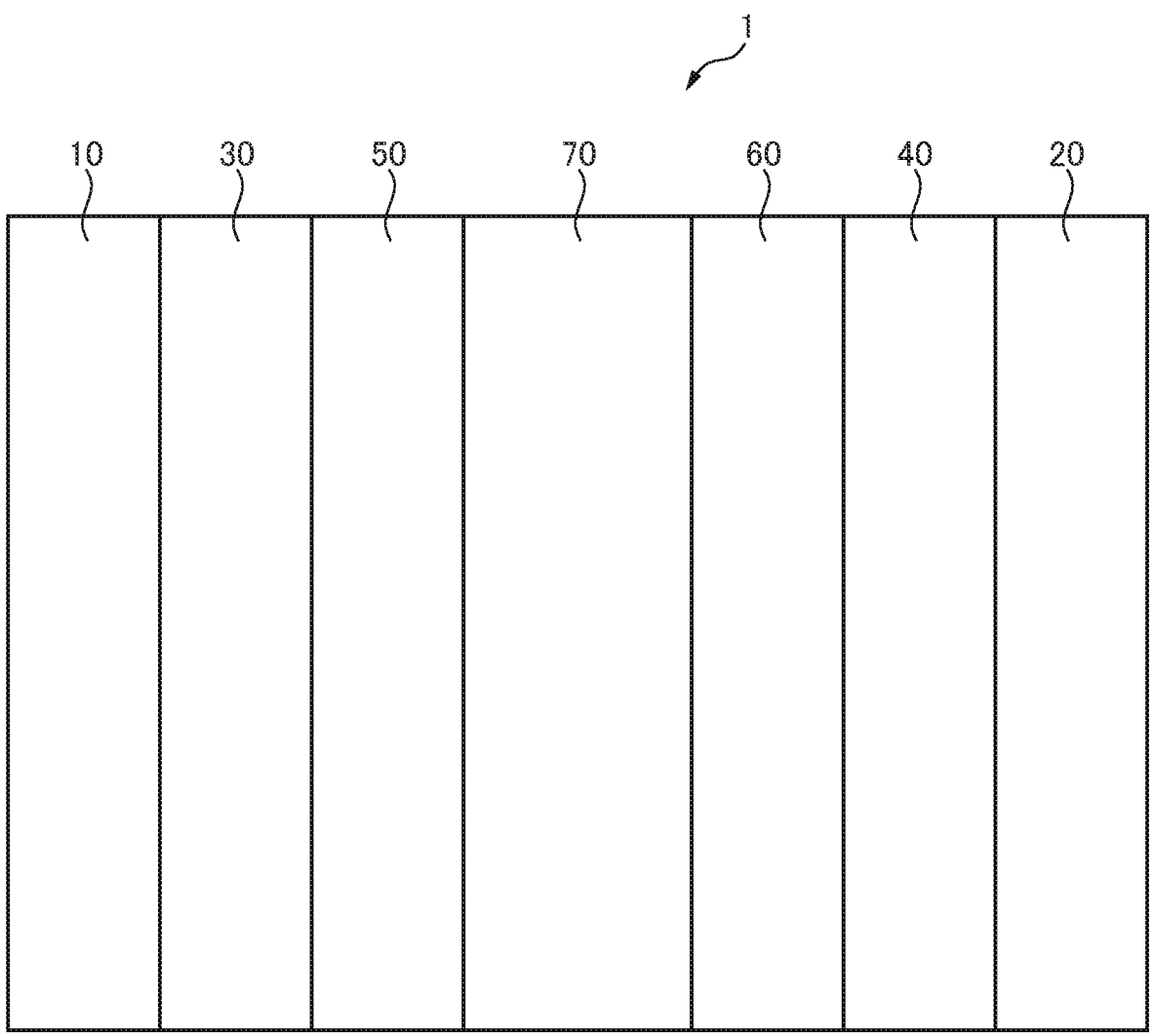

CATALYST-CARRIER CARBON MATERIAL, SOLID-POLYMER FUEL CELL CATALYST, SOLID-POLYMER FUEL CELL, AND METHOD FOR MANUFACTURING CATALYST-CARRIER CARBON MATERIAL

TECHNICAL FIELD

The present invention relates to a carbon material for catalyst carrier use, a catalyst for solid-polymer fuel cell use, a solid-polymer fuel cell, and a method for producing a carbon material for catalyst carrier use.

BACKGROUND ART

Along with energy problems and global warming and other environmental problems in recent years, work has been proceeding on the development of fuel cells as power supplies for driving vehicles and as stationary power generation unites. In particular, solid-polymer fuel cells able to operate at low temperatures of 100° C. or less have come under the spotlight. Work is proceeding on their development and commercialization. In a solid-polymer fuel cell, usually a proton conductive electrolytic film is sandwiched between a catalyst layer forming an anode and a catalyst layer forming a cathode arranged at its two sides. Such a structure is called a "membrane electrode assembly" (MEA). In a solid-polymer fuel cell, furthermore, this membrane electrode assembly is sandwiched between gas diffusion layers arranged at its outsides. Furthermore, separators are arranged at the outsides. A solid-polymer fuel cell therefore comprises a membrane electrode assembly, gas diffusion layers, and separators as its basic structure. This basic structure is called a "unit cell". A fuel cell is usually configured by stacking the number of unit cells required for realizing the necessary output.

In a solid-polymer fuel cell of such basic structures (unit cells), the anode side and the cathode side respectively have gas flow paths arranged at them. At the cathode side, oxygen, air, or another oxidizing gas is supplied, while at the anode side, hydrogen or another reducing gas is supplied. These oxidizing gas and reducing gas are respectively supplied through the gas diffusion layers to the catalyst layers. Further, the energy difference (potential difference) between the chemical reaction which occurs at the catalyst layer of the anode and the chemical reaction which occurs at the catalyst layer of the cathode is utilized to take out current. For example, when hydrogen gas is used as the reducing gas and oxygen gas is used as the oxidizing gas, the energy difference (potential difference) between the chemical reaction which occurs at the catalyst layer of the anode ($H_2 \rightarrow 2H^+ + 2e^-$ ($E_0 = 0V$)) and the chemical reaction which occurs at the catalyst layer of the cathode ($O_2 + 4H^+ + 4e^- \rightarrow 2H_2O$ ($E_0 = 1.23V$)) is utilized to take out current.

In this regard, when utilizing such a solid-polymer fuel cell as a power supply for driving a vehicle or a stationary power generation unit, durability over a long period is sought from the fuel cell. However, particularly when a solid-polymer fuel cell is used as a power supply for driving a vehicle, it is frequently operated to start up and shut down. Further, at the time of this startup and shutdown, unavoidable fluctuation of potential occurs. In particular, sometimes, in the catalyst layers of a solid-polymer fuel cell, carbon black or another conductive carbon material is used as the carbon material for catalyst carrier use, platinum or platinum alloy is used as the catalyst metal, and, further, a proton conductive polymer electrolyte is used. Such catalyst layers are repeatedly exposed to fluctuations of potential occurring at the time of startup and shutdown (load fluctuations). For this reason, the carbon material for catalyst carrier use is oxidized forming carbon dioxide gas and ends up being consumed. As a result, the carbon material for catalyst carrier use falls in gas diffusibility and water drainability, the cell characteristics fall, and a sufficient power generation performance can no longer be obtained, that is, the problem of deterioration of the carbon material for catalyst carrier use occurs.

Such deterioration of a carbon material for catalyst carrier use is one factor due to which the cell performance of the solid-polymer fuel cell falls. The reason is considered to be as follows. In a solid-polymer fuel cell, at the time of shutdown, an operation is performed to supply oxidizing gas to the catalyst layer of the anode side and replace the reducing gas supplied to the catalyst layer with oxidizing gas. At this time, the reducing gas of the catalyst layer of the anode side sometimes remains without being completely replaced. If the fuel cell is started up in the state where this reducing gas remains, at the time of startup, a local cell is formed at the anode side. As a result, the potential of the cathode side rises and the catalyst layer of the cathode side is exposed to a high potential. Further, due to the catalyst metal of the catalyst layer, water is electrolyzed and oxygen is generated. Due to this oxygen, the carbon material for catalyst carrier use of the catalyst layer is oxidized. Further, a reaction of $C + O_2 \rightarrow CO_2$ occurs and the carbon material for catalyst carrier use deteriorates. If such deterioration of the carbon material for catalyst carrier use proceeds, the concentration overpotential at the catalyst layer increases and the cell performance of the solid-polymer fuel cell remarkably falls.

Therefore, in the past, several proposals have been made to solve the problem of the drop in the cell performance of a solid-polymer fuel cell due to such deterioration of a carbon material for catalyst carrier use. For example, PLT 1 proposes to treat carbon black used as a carbon material for catalyst carrier use by heating it at 2000 to 3000° C. for 5 to 20 hours as treatment conditions to graphitize it to raise the graphitizability and hydrophobicity of the carbon black and thereby improve the durability of the carbon material for catalyst carrier use (see paragraphs 0031 to 0032). PLT 2 proposes to treat carbon particles used as a carbon material for catalyst carrier use by heating them at 1400 to 1700° C. for 5 to 15 hours as treatment conditions to heat treat them to raise the hydrophobicity of the carbon particles and thereby improve the durability of the carbon material for catalyst carrier use (see claim 1).

In this regard, inside of a catalyst layer of a solid-polymer fuel cell, usually, the pores forming the gas diffusion paths formed in the spaces of the material, the electrolytic film forming the proton conductive paths, and the carbon material or metal material or other conductive material forming the electron conductive paths have to form continuous networks. Further, for the proton conduction paths in the electrolytic film or catalyst layers, a polymer electrolytic material comprised of an ion exchange resin such as a perfluorosulfonic acid polymer is used. Such normally used polymer electrolytic materials first exhibit high proton conductivity in a moist environment. Therefore, to make a fuel cell operate efficiently, the reducing gas supplied to the catalyst layer of the anode or the oxidizing gas supplied to the catalyst layer of the cathode is made to contain water vapor to maintain these catalyst layers constantly in a moist state. Furthermore, the carbon material for catalyst carrier use forming these catalyst layers is also given hydrophilicity.

For example, NPLT 1 proposes the method of using 15N concentrated nitric acid to treat the activated carbon to oxidize it. NPLT 2 proposes the method of using the Brodie method of using fuming nitric acid and potassium chlorate ($KClO_3$) for oxidation, the Staudenmaier method of using concentrated sulfuric acid, concentrated nitric acid, and potassium chlorate ($KClO_3$) or potassium perchlorate ($KClO_4$) for oxidation, the Hummers and Offeman method of using concentrated sulfuric acid, sodium nitrate ($NaNO_3$), and potassium permanganate ($KMnO_4$) for oxidation, etc. so as to treat the layered carbon material of graphite for oxidation. PLT 3 describes that activated carbon or other carbon powder can be made hydrophilic by introducing polar functional groups (for example, alcohol groups, ketone groups, carboxylic acid groups, sulfonic acid groups, nitro groups, etc.) at the surface of the carbon and by treatment by immersion into hot concentrated sulfuric acid, treatment by $HNO_3$, treatment by $HClO_4$, treatment by $NaClO_4$, and other methods. In addition to these as well, for example, PLTs 4 to 6 describe imparting hydrophilicity to a carbon material for catalyst carrier use forming the catalyst layers.

However, the method for imparting hydrophilicity to a carbon material for catalyst carrier use forming the catalyst layers of a solid-polymer fuel cell is mainly the method of using an acid etc. to introduce polar functional groups to the carbon surface of the carbon material for catalyst carrier use. For this reason, excess oxygen is transported to the carbon surface and as a result the oxidative consumption of the carbon material for catalyst carrier use is accelerated. The durability is thereby lowered.

As explained above, when using graphitization treatment or heat treatment to raise the graphitizability and hydrophobicity of a carbon material for catalyst carrier use, the hydrophilicity of the carbon material for catalyst carrier use falls and it becomes difficult to maintain the moist state required for efficiently operating a solid-polymer fuel cell. In particular, sometimes the power generation performance under operating conditions at the time of low humidity falls. When raising the hydrophilicity of a carbon material for catalyst carrier use by hydrophilization treatment, sometimes the oxidative consumption of the carbon material for catalyst carrier use is accelerated and the durability is lowered. For this reason, raising the graphitizability and hydrophobicity of a carbon material for catalyst carrier use to improve the durability and imparting hydrophilicity to the carbon material for catalyst carrier use for efficiently operating a fuel cell are in a so-called tradeoff relationship. This becomes a major obstacle in the design of a carbon material for catalyst carrier use of a catalyst for solid-polymer fuel cell use.

PLT 7 proposes not to impart hydrophilicity to the carbon material for catalyst carrier use as hydrophilization treatment, but use spherical carbon porous bodies having pores of uniform size, large pore volume, high water retention, and average pore size of 3 nm or less to thereby improve the power generation performance under operating conditions at the time of low humidity. However, PLT 7 does not allude to the durability of a carbon material for catalyst carrier use (spherical carbon porous bodies). Further, in this method, the process of production when producing spherical carbon porous bodies includes use of spherical mesoporous bodies made of silica as a template and is extremely troublesome. Further, the water adsorption performance of spherical carbon porous bodies under operating conditions at the time of low humidity cannot necessarily be said to be sufficient.

In the past as well, attempts have been made to solve this problem. For example, PLT 8 uses a glassy carbon powder and treats this glassy carbon powder in a steam, carbon dioxide, or air atmosphere further at 400 to 1200° C. to activate it and make it porous. It has been proposed to use the obtained porous glassy carbon powder as a carbon material for catalyst carrier use to try to achieve both of durability and high power generation performance under operating conditions at the time of low humidity of the carbon material for catalyst carrier use. However, for example, this PLT 8 describes processing a mixture of rayon pulp and softwood pulp to make paper, stacking this paper to prepare a base material, impregnating this base material with a phenol resin solution, then heat curing the phenol resin and furthermore treating it to fire and carbonize. To produce a glassy carbon powder in this way, there are the problems of massive trouble and production costs. Furthermore, the heating temperature at the time of the activation treatment of the glassy carbon powder is, even at the highest, 1200° C., so it is difficult to think that the graphitization and hydrophobicity of the obtained carbon material for catalyst carrier use (porous glassy carbon powder) are sufficiently enhanced.

PLT 9 proposes application of a carbon material with a highly developed dendritic structure and highly developed pores and a large specific surface area to a capacitor and a catalyst carrier for a fuel cell. The inventors synthesized this carbon material and used it as a catalyst to investigate the power generation characteristics of a solid-polymer fuel cell. As a result, it was confirmed that the power generation characteristics were good, but there was remarkable deterioration of durability due to oxidative consumption.

Furthermore, PLT 10 proposes to further heat treat the carbon material of PLT 9 to raise the crystallinity and thereby raise the durability against oxidative consumption. However, due to the heat treatment for raising the crystallinity, the functional groups on the surface of the carbon material break down and as a result the hydrophilicity falls. Therefore, when applying this carbon material to a catalyst carrier of a solid-polymer fuel cell, there was the problem that the output voltage at the time of low humidity operation remarkably fell.

In this regard, PLT 11 proposes a high performance electrode catalyst for a solid polymer fuel cell comprised of a carbon carrier containing nitrogen atoms and/or boron atoms and a transition metal on which platinum or a platinum alloy is carried wherein the carried amount of platinum or a platinum alloy is small. This catalyst is characterized by forming a complex on the carbon carrier by the nitrogen atoms and/or boron atoms and the transition metal element to increase the activity. However, there were the issues of remarkable oxidative consumption of nitrogen against fluctuations of potential such as exposure to a high potential such as over 1.3V generated at the time of startup and shutdown of the fuel cell and low durability against fluctuations in potential.

CITATION LIST

Patent Literature

PLT 1: Japanese Patent Publication No. 2011-003552A
PLT 2: Japanese Patent Publication No. 2008-041482A
PLT 3: Japanese Patent Publication No. 11-121297A
PLT 4: Japanese Patent Publication No. 2005-025947A
PLT 5: Japanese Patent Publication No. 2008-123744A
PLT 6: Japanese Patent Publication No. 2011-028978A
PLT 7: Japanese Patent Publication No. 2007-220414A
PLT 8: Japanese Patent Publication No. 2006-294468A PLT 9: WO2009/075264A
PLT 10: WO2014/129597A
PLT 11: Japanese Patent Publication No. 2013-058436A Non-Patent Literature NPLT 1: F. Rodriguez-Reinoso et al., *Journal of Physical Chemistry*, Vol. 96, No. 6, pp. 2707-2713 (1992)
NPLT 2: W. Hummers and R. E. Offeman, *J. Am. Chem. Soc.*, 80, 1339 (1958)

SUMMARY OF INVENTION

Technical Problem

The inventors engaged in various studies to realize both durability against oxidative consumption and power generation performance under operating conditions at the time of low humidity, which are in a tradeoff relationship, in the above-mentioned carbon material for catalyst carrier use of a catalyst for solid-polymer fuel cell use.

The inventors engaged in numerous studies and during that time made several discoveries enabling the above problems to be solved. First, the oxygen atoms usually contained in a carbon material for catalyst carrier use are present in this carbon material in various chemical forms, for example, hydroxyl groups, carboxyl groups, carbonyl groups, ether groups, phenolic hydroxyl groups, lactone bonds, acid anhydride bonds, quinone bonds, etc. Further, the starting temperature of breakdown of these oxygen atoms differs depending on the chemical form. The inventors determined that the content of the oxygen atoms remaining after heat treating the carbon material for catalyst carrier use in an inert gas (or vacuum) atmosphere at 1200° C. (residual amount of oxygen) is one of the important indicators for achieving both durability against oxidative consumption and power generation performance under operating conditions at the time of low humidity.

The hydrogen atoms contained in a carbon material for catalyst carrier use mainly include ones contained as functional groups including oxygen atoms and ones contained at ends of the graphene frameworks or locations of defects. The former hydrogen atoms contained as functional groups containing oxygen atoms are consumed along with the thermal decomposition and consumption of functional groups containing oxygen atoms by heat treatment of the carbon material for catalyst carrier use in an inert gas (or vacuum) atmosphere at 1200° C. or so. On the other hand, the hydrogen atoms contained at the ends of the graphene framework and locations of defects are not consumed by heat treatment in an inert gas (or vacuum) atmosphere at 1400° C. or so but start to be consumed after the temperature rises to 1600° C. or so. The inventors determined that, in the same way as the case of oxygen atoms, the content of the hydrogen atoms remaining after heat treating the carbon material for catalyst carrier use at 1200° C. (residual amount of hydrogen) is one of the important indicators for achieving both durability against oxidative consumption and power generation performance under operating conditions at the time of low humidity.

The inventors found that by using a porous carbon material having a residual amount of oxygen remaining after heat treating a carbon material for catalyst carrier use in an inert gas atmosphere at 1200° C. and also an oxygen content, BET specific surface area, and value of G-band half-width detected in a range of 1550 to 1650 cm$^{-1}$ of the Raman spectrum of the carbon material for catalyst carrier use in predetermined ranges, it is possible to easily produce a solid-polymer fuel cell excellent in both durability and power generation performance under operating conditions at the time of low humidity, in particular both durability with respect to repeated load fluctuations due to startup and shutdown and power generation performance under operating conditions at the time of low humidity and thereby completed the present invention.

An object of the present invention is to provide a carbon material for catalyst carrier use excellent in both durability and power generation performance under operating conditions at the time of low humidity, in particular both durability of a carbon material for catalyst carrier use with respect to repeated load fluctuations due to startup and shutdown and power generation performance under operating conditions at the time of low humidity, and a method of production of the same.

Further, the object of the present invention is to provide a catalyst for solid-polymer fuel cell use excellent in both durability and power generation performance under operating conditions at the time of low humidity, in particular both durability with respect to repeated load fluctuations due to startup and shutdown and power generation performance under operating conditions at the time of low humidity, and a solid-polymer fuel cell using the same.

Solution to Problem

To solve this problem, according to one aspect of the present invention, there is provided a carbon material for catalyst carrier use able to carrier a catalyst for solid-polymer fuel cell use, the carbon material for catalyst carrier use satisfying the following (A) to (D):

(A) an oxygen content $O_{ICP}$ of 0.1 to 3.0 mass % contained in the carbon material for catalyst carrier use;
(B) a residual amount of oxygen $O_{1200° C.}$ of 0.1 to 1.5 mass % remaining after heat treatment in an inert gas (or vacuum) atmosphere at 1200° C.;
(C) a BET specific surface area of 300 to 1500 m$^2$/g; and
(D) a G-band half-width ΔG of 30 to 70 cm$^{-1}$ detected in a range of 1550 to 1650 cm$^{-1}$ of the Raman spectrum.

Here, the residual amount of oxygen $O_{1200° C.}$ may be 0.1 to 1.2 mass %.

Further, a residual amount of hydrogen $H_{1200° C.}$ at the time of treatment in an inert gas (or vacuum) atmosphere at 1200° C. may be 0.005 to 0.080 mass %.

Further, the oxygen content $O_{ICP}$ may be 0.1 to 2.0 mass %.

Further, the BET specific surface area may be 500 to 1500 m$^2$/g.

Further, the material may further satisfy the following (E) to (H):

(E) a CO gas quantity $Q_{CO}$ of 50 to 250 μmol/g generated at 600 to 900° C. in temperature region in TPD measurement;
(F) a CO$_2$ gas quantity $Q_{CO2}$ of 10 to 100 μmol/g generated at 300 to 700° C. in temperature region in TPD measurement;
(G) a micropore area $S_{micro}$ of 200 to 800 m$^2$/g; and (H) $Q_{CO} > Q_{CO2}$ Further, the CO gas quantity $Q_{CO}$ may be 80 to 200 μmol/g.

Further, the CO$_2$ gas quantity $Q_{CO2}$ may be 15 to 60 μmol/g.

Further, the material may further satisfy the following (I) to (J):

(I) a nitrogen content $N_{ICP}$ of 0.3 to 5.0 mass % contained in the carbon material for catalyst carrier use; and (J) a residual amount of nitrogen $N_{900°\,C.}$ of 0.2 to 4.0 mass % remaining after heat treatment in an inert gas (or vacuum) atmosphere at 900° C.

Further, the BET specific surface area may be 400 to 1200 m²/g.

Further, a G-band half-width ΔG detected in a range of 1550 to 1650 cm⁻¹ of the Raman spectrum may be 30 to 60 cm⁻¹.

Further, in an $N_{1s}$ spectrum measured by XPS, an $N_{1s}$ intensity ratio (N-Q/N-6) of an N-6 peak with a binding energy near 398.5 eV and an N-Q peak near 400.5 eV may be 0.2 to 1.6 in range.

Further, a residual amount of nitrogen $N_{900°\,C.}$ may be 0.2 to 3.5 mass %.

Further, the material may further satisfy the following (K):

(K) a boron content $B_{ICP}$ of 0.3 to 5.0 mass %

Further, the oxygen content $O_{ICP}$ may be 0.3 to 3.0 mass %.

Further, the BET specific surface area $S_{BET}$ may be 300 to 1000 m²/g.

Further, in a $B_{1s}$ spectrum measured by XPS, an intensity ratio (BO/BC) of a peak (BO) corresponding to B—O bonds with a binding energy near 192 eV and a peak (BC) corresponding to B—C bonds with a binding energy near 186 eV may be 0.2 to 1.5.

Further, the residual amount of oxygen $O_{900°\,C.}$ after heat treatment in an inert gas atmosphere at 900° C. may be 0.2 to 2.0 mass %.

According to another aspect of the present invention, there is provided a catalyst for solid-polymer fuel cell use comprising the above carbon material for catalyst carrier use and a catalyst metal carried in the carbon material for catalyst carrier use.

Here, the catalyst metal may be platinum or a platinum alloy mainly comprised of platinum.

According to another aspect of the present invention, there is provided a solid-polymer fuel cell comprising the above catalyst for solid-polymer fuel cell use.

According to another aspect of the present invention, there is provided a method for producing the above carbon material for catalyst carrier use, the method comprising: an oxidation treatment step of oxidizing a porous carbon material to introduce oxygen-containing functional groups into the porous carbon material; a nitrogen substitution step of substituting nitrogen-containing functional groups for part or all of the oxygen-containing functional groups by nitrogen substitution treatment of heating the oxidized porous carbon material obtained by the oxidation treatment step, in an ammonia gas atmosphere; and a functional group modifying step of heat treating the porous carbon material after nitrogen substitution treatment obtained at the nitrogen substitution step in an inert gas and/or ammonia gas atmosphere to modify the nitrogen-containing functional groups formed in the nitrogen substitution step to nitrogen-containing functional groups mainly comprised of pyridine-type nitrogen and quaternary-type nitrogen.

According to another aspect of the present invention, there is provided a method for producing the above carbon material for catalyst carrier use comprising a carrying treatment step of making the porous carbon material carry a nitrogen-containing organic compound and a fixation treatment step of heat treating the porous carbon material after the carrying treatment obtained by this carrying treatment step in an inert gas and/or reducing gas atmosphere at 500 to 1100° C. to fix the nitrogen in the nitrogen-containing organic compound on the porous carbon material.

Here, in the carrying treatment step, the method may disperse the porous carbon material in a nitrogen-containing organic compound solution obtained by dissolving the nitrogen-containing organic compound in a solvent, then evaporate off the solvent from the obtained nitrogen-containing organic compound solution.

Further, in the fixation treatment step, the method may perform heat treatment in a reducing gas atmosphere containing a reducing gas comprised of 5 to 100 vol % of ammonia gas and having a balance of an inert gas at 500 to 1100° C.

Further, the method, in the fixation treatment step, may perform heat treatment in a reducing gas atmosphere containing 5 to 100 vol % of ammonia gas as a reducing gas comprised and having a balance of an inert gas at 500 to 1100° C., then perform heat treatment again in an inert gas atmosphere at 700 to 1100° C.

Further, the porous carbon material may be a porous carbon material controlled in crystallinity obtained by heat treating the porous carbon material in an inert gas atmosphere at 1400 to 2500° C. to control the crystallinity.

Further, the BET specific surface area of the porous carbon material may be 300 to 1200 m²/g.

Further, a melting point, decomposition temperature, or sublimation temperature of the nitrogen-containing organic compound may be 200° C. or more.

According to another aspect of the present invention, there is provided a method of production of the above carbon material for catalyst carrier use, the method comprising a boron source carrying step of making a starting carbon material comprised of a porous carbon material carry a boron source comprised of a boron-containing compound, a boron introducing step of heat treating the boron source-carrying carbon material obtained at the boron source carrying step in an inert gas atmosphere to make the boron diffuse to the inside of the carbon material, and an oxygen content adjusting step of oxidizing the boron-containing carbon material obtained in the boron introducing step in an oxidizing gas atmosphere, then heat treating the boron-containing carbon material in an inert gas and/or reducing gas atmosphere to adjust the oxygen content.

Advantageous Effects of Invention

According to the present invention, it is possible to provide a carbon material for catalyst carrier use excellent in both durability and power generation performance under operating conditions at the time of low humidity, in particular both durability with respect to repeated load fluctuations due to startup and shutdown (in particular, resistance to oxidative consumption of cathode side) and power generation performance under operating conditions at the time of low humidity, and a method of production of the same. Further, according to the present invention, it is possible to provide a catalyst for solid-polymer fuel cell use excellent in both durability and power generation performance under operating conditions at the time of low humidity, in particular both durability with respect to repeated load fluctuations due to startup and shutdown (in particular, resistance to oxidative consumption of cathode side) and power generation performance under operating conditions at the time of low humidity, and a solid-polymer fuel cell using the same.

BRIEF DESCRIPTION OF DRAWINGS

FIG. 1 is a schematic view showing the general constitution of a solid-polymer fuel cell according to an embodiment of the present invention.

DESCRIPTION OF EMBODIMENTS

Below, preferred embodiments of the present invention will be explained in detail while referring to the attached drawings. Note that, in the Description and drawing, components having substantially the same functions and configurations will be assigned the same reference notations and overlapping explanations will be omitted.

1. First Embodiment

Basically what is important in the first embodiment is that at the same time as raising the crystallinity of the carbon material used for the catalyst carrier, high stability oxygen is given to the surface of the carbon material so as to maintain the hydrophilicity and water retention at the optimum states. The crystallinity of a carbon material is related to the durability of a solid-polymer fuel cell. That is, the crystallinity of the carbon material is a property essential for maintaining the structure of a carbon material for catalyst carrier use carrying a catalyst stable with respect to a potential fluctuating in accordance with the output. A structure which is high in crystallinity, that is, comprised of large carbon hexagonal network planes (condensed polycyclic aromatic) stacked together, is small in area of edge parts weak against oxidation, so an oxidation reaction has a difficult time advancing and is large in number of resonant aromatic rings, so the stability of the edge parts themselves increases.

Seen from another viewpoint, if the crystallinity of a carbon material rises, the area of the edge parts decreases, the oxygen-containing functional groups having polarity present at the edge parts also decrease, and the hydrophilicity remarkably falls. As a result, the problem arises that electrodes of a catalyst using a high crystallinity carbon material for the carrier are weak in strength of moisture retention, the resistance to proton conduction at the time of low humidity operation becomes larger, and the output voltage falls. To solve this problem, it is sufficient to impart oxygen-containing functional groups having polarity to the high crystallinity carbon material to improve the hydrophilicity of the carbon material. However, when imparting carboxyl groups, lactone groups, phenolic hydroxyl groups, ether groups, and other oxygen-containing functional groups, even if the hydrophilicity is improved and the output in low humidity operation is improved, oxidative consumption of the carbon material with respect to fluctuations in potential starting from decomposition of these functional groups is promoted, so the durability ends up falling.

Therefore, the inventors took note of the oxygen (quinone type oxygen) of the carbonyl groups forming quinone bonds etc. which are highest in stability in the chemical forms containing oxygen in the carbon material and studied the measurement of the amount of oxygen of this quinone type oxygen and control of the same. As a result, the inventors found that when making a carbon material with an amount of stable oxygen remaining after heat treatment in an inert gas (or vacuum) atmosphere at 1200° C. (residual amount of oxygen) in a certain range the catalyst carrier, it is possible to achieve both improvement of the output at the time of low humidity operation and durability at the obtained fuel cell and thereby came up with the idea of the present invention. That is, the carbon material used for the catalyst carrier is high in crystallinity and contains a predetermined amount of oxygen in a chemical form stable against heat. To quantitatively express the oxygen present in this heat stable chemical form, in the present invention, the oxygen content included in the initial state and the residual amount of oxygen remaining after heat treatment in an inert gas (or vacuum) atmosphere at 1200° C. are defined.

The carbon material for catalyst carrier use of the present invention is a porous carbon material which satisfies the requirements of the following (A) to (D): (A) an oxygen content $O_{ICP}$ of 0.1 to 3.0 mass % contained in the carbon material for catalyst carrier use, (B) a residual amount of oxygen $O_{1200°\,C.}$ of 0.1 to 1.5 mass % remaining after heat treatment in an inert gas (or vacuum) atmosphere at 1200° C., (C) a BET specific surface area of 300 to 1500 m²/g, and (D) a G-band half-width of 30 to 70 cm$^{-1}$ detected in a range of 1550 to 1650 cm$^{-1}$ of the Raman spectrum. Preferably the residual amount of hydrogen $H_{1200°\,C.}$ remaining after heat treatment in an inert gas (or vacuum) atmosphere at 1200° C. is 0.005 to 0.080 mass %.

Here, in the carbon material for catalyst carrier use, the oxygen content $O_{ICP}$ measured by trace oxygen analysis has to be 0.1 to 3.0 mass %, preferably is 0.1 to 2.0 mass %, more preferably is 0.3 mass % to 1.5% mass %, still more preferably is 0.4 mass % to 1.4 mass %. If this oxygen content $O_{ICP}$ of the carbon material for catalyst carrier use is less than 0.1 mass %, there is the problem that the graphitizability does not become high enough for the durability against oxidative consumption to be improved. Conversely, if becoming higher than 3.0 mass %, the oxygen in the carbon material becomes greater and the durability against oxidative consumption becomes lower. As a result, the problem arises that sufficient durability against repeated load fluctuations due to startup and shutdown cannot be obtained.

Further, regarding the residual amount of oxygen $O_{1200°\,C.}$ remaining after heat treatment in an inert gas (or vacuum) atmosphere at 1200° C., the residual amount of oxygen $O_{1200°\,C.}$ measured by trace oxygen analysis has to be 0.1 mass % to 1.5 mass %, preferably is 0.1 mass % to 1.2 mass %. If this residual amount of oxygen $O_{1200°\,C.}$ is smaller than 0.1 mass %, there is the problem that the drop in polarity causes the hydrophilicity to fall and the power generation characteristics at the time of low humidity operation fall. Conversely, if becoming greater than 1.5 mass %, oxidative consumption starting from the oxygen-containing functional groups easily advances. As a result, the problem arises that the durability against repeated load fluctuation falls.

Furthermore, the BET specific surface area at the carbon material for catalyst carrier use of the present invention has to be 300 m²/g to 1500 m²/g, preferably is 500 to 1500 m²/g, more preferably is 700 m²/g to 1400 m²/g. If this BET specific surface area of the carbon material for catalyst carrier use is less than 300 m²/g, there is the problem that the surface area for carrying the catalyst metal becomes insufficient and a sufficient power generation performance cannot be exhibited. Conversely, becoming higher than 1500 m²/g means the graphene becoming smaller and the locations of defects becoming more numerous. Therefore, the problem arises that the strength of the carbon material for catalyst carrier use itself falls and the material can no longer be used as a catalyst for a fuel cell.

Furthermore, in the carbon material for catalyst carrier use of the present invention, the G-band half-width detected in the range of the Raman spectrum of 1550 to 1650 cm$^{-1}$ (below, sometimes referred to as simply as the "G-band half-width") has to be 30 to 70 cm$^{-1}$, preferably 30 to 65 cm$^{-1}$, more preferably 35 to 60 cm$^{-1}$. If this G-band half-width is smaller than 30 cm$^{-1}$, there is the problem that the crystallinity of the carbon material for catalyst carrier use becomes too high and in the step of carrying the catalyst metal, it becomes hard to carry a catalyst metal with a high dispersion. Conversely, if becoming larger than 90 cm$^{-1}$, the problem arises that sufficient durability against repeated load fluctuations due to startup and shutdown cannot be obtained.

Further, the carbon material for catalyst carrier use of the present invention has to be a porous carbon material having the above oxygen content $O_{ICP}$, residual amount of oxygen $O_{1200°\ C.}$, BET specific surface area, and G-band half-width, but preferably the residual amount of hydrogen $H_{1200°\ C.}$ remaining after heat treating this porous carbon material in an inert gas (or vacuum) atmosphere at 1200° C. is 0.005 to 0.080 mass %, preferably 0.008 to 0.04. If this residual amount of hydrogen $H_{1200°\ C.}$ is lower than 0.005 mass %, sometimes the power generation performance under operating conditions at the time of low humidity cannot be sufficient exhibited. Conversely, if becoming higher than 0.080 mass %, sometimes the problem of flooding easily occurs.

Here, the porous carbon material used as the carbon material for catalyst carrier use of the present invention is not particularly limited so long as one satisfying an oxygen content $O_{ICP}$: 0.1 to 3.0 mass %, residual amount of oxygen $O_{1200°\ C.}$: 0.1 to 1.5 mass %, BET specific surface area: 300 to 1500 m$^2$/g, and G-band half-width of the Raman spectrum: 30 to 70 cm$^{-1}$.

As such a porous carbon material, for example, carbon black, graphite, carbon fiber, activated carbon, etc. and crushed forms of these and carbon nanofibers and other carbon compounds etc. can be used. One type of these may be used alone or two types or more may be mixed for use. Here, as the carbon black, as commercially available products, Vulcan XC-72, Vulcan P, Black Pearls 880, Black Pearls 1100, Black Pearls 1300, Black Pearls 2000, Regal 400, etc. made by Cabot, Ketjen Black EC made by Lion Corporation, #3150, #3250, and other oil furnace blacks made by Mitsubishi Chemical, Denka Black and other acetylene blacks made by Denka, Ketjen EC, Ketjen EC-600Jd, etc. made by Ketjen Black International Company, Printex XE2, Printex XE2-B, etc. made by Degussa, and YP, RP, etc. made by Kuraray Chemical may be mentioned. Further, materials obtained by treating these porous carbon materials to activate them to make them more porous and porous carbon materials obtained by treating them by suitable heat treatment, hydrogen introduction treatment for introducing hydrogen atoms, and other additional treatment to satisfy the above-mentioned oxygen content $O_{ICP}$, residual amount of oxygen $O_{1200°\ C.}$, BET specific surface area, and G-band half-width of the Raman spectrum can also be used.

The catalyst metal to be carried in the carbon material for catalyst carrier use is not particularly limited so long as one having the function of promoting the necessary chemical reaction at the anode side or cathode side catalyst layer. As specific examples, platinum, palladium, ruthenium, gold, rhodium, osmium, yttrium, tungsten, lead, iron, chrome, cobalt, nickel, manganese, vanadium, molybdenum, gallium, aluminum, and other metals or complexes or alloys of two types or more of these metals combined may be mentioned. Furthermore, other catalyst metals or co-catalyst metals etc. may be jointly used. In the present invention, what is particularly preferable as a catalyst metal is platinum or a platinum alloy mainly comprised of platinum.

The method for producing a carbon material for catalyst carrier use for a catalyst for solid-polymer fuel cell use of the present invention is not particularly limited so long as a method which can give a porous carbon material the above predetermined oxygen content $O_{ICP}$, predetermined residual amount of oxygen $O_{1200°\ C.}$, predetermined BET specific surface area, and predetermined G-band half-width of the Raman spectrum and, furthermore, in accordance with need, a predetermined residual amount of hydrogen $H_{1200°\ C.}$. Various treatments can be applied in accordance with need.

For example, it is possible to use a strong oxidation treatment to impart various oxygen-containing functional groups and use heat treatment in an inert atmosphere or vacuum to remove unstable oxygen-containing functional groups to obtain a carbon material having a suitable oxygen content. In this case, the temperature of the heat treatment after the oxidation treatment may be optimized in accordance with the extent of strength of the oxidation treatment. For example, when performing the oxidation treatment by a high concentration of nitric acid, since the introduced amount of oxygen is large, to obtain an oxygen content prescribed in the present invention, it is necessary to perform heat treatment at a 1200° C. or more temperature. In the case of oxidation treatment by hydrogen peroxide, heat treatment at 800° C. to 1400° C. is preferable. Further, as an inert atmosphere, nitrogen, argon, helium, etc. can be suitably used. The heat treatment time is preferably 10 minutes to 5 hours. If 10 minutes or less, a sufficient heat treatment effect cannot be obtained and unstable functional groups also end up remaining. If the heat treatment exceeds 5 hours, the process becomes longer, so this is not preferable from the practical standpoint in the work process. Whatever the case, at a 1600° C. or higher temperature, all of the oxygen is consumed, so the upper limit of the heat treatment temperature is 1600° C.

As the oxidation treatment, in addition to the above nitric acid treatment and hydrogen peroxide treatment, there is wet chemical oxidation. So long as wet chemical oxidation, the exact treatment is not particularly limited. If giving specific examples, as described in the section on "background art", a method of oxidizing a layered carbon material comprised of graphite by the Brodie method of using fuming nitric acid and potassium chlorate (KClO$_3$) for oxidation, the Staudenmaier method of using concentrated sulfuric acid, concentrated nitric acid, and potassium chlorate (KClO$_3$) or potassium perchlorate (KClO$_4$) for oxidation, the Hummers and Offeman method of using concentrated sulfuric acid, sodium nitrate (NaNO$_3$), and potassium permanganate (KMnO$_4$) for oxidation, etc. has been proposed. Furthermore, PLT 3 describes that activated carbon or other carbon powder can be made hydrophilic by introducing polar functional groups (for example, alcohol groups, ketone groups, carboxylic acid groups, sulfonic acid groups, nitro groups, etc.) at the surface of the carbon and by treatment by immersion into hot concentrated sulfuric acid first and foremost, treatment by HNO$_3$ and treatment by HClO$_4$, treatment by NaClO$_4$, and other methods. In these cases as well, by heat treating the material in an inert atmosphere or in a vacuum in accordance with the amount of oxygen after the oxidation treatment, it is possible to obtain a carbon material containing oxygen stable against heat as the main oxygen.

Furthermore, as dry type oxygen introduction treatment, it is possible to apply oxygen plasma treatment, ozone treatment, etc. In this case as well, by studying the optimum heat treatment conditions in accordance with the oxidation strength and introduced amount of oxygen, it is possible to obtain a carbon material optimum for the present invention. Further, it is also possible to apply the above various oxidation treatments suitably combined.

The control of the G-band half-width ΔG of the Raman spectrum is similar to the control of the crystallinity of a carbon material. By using a large crystallite carbon material for the starting material or controlling the heat treatment temperature to match the ease or difficulty of graphitization of the starting material, it is possible to obtain a predetermined ΔG. Note that, depending on the carbon material, sometimes it is possible to obtain a predetermined ΔG even without such treatment. Specifically, it is sufficient to use a so-called graphitization furnace or other heat treatment furnace and heat treat the carbon material in an inert atmosphere at an optimal temperature in the 1600 to 2500° C. temperature range. To prevent the micropores from being crushed, preferably a carbon material giving a predetermined G-band half-width ΔG in a 2200° C. or less heat treatment is selected. The specific carbon material is not particularly limited, but in general commercially available carbon black produced by the furnace method and treated to activate it to make it porous, cast type carbon obtained by using mesoporous silica, zeolite, and other various porous materials, which are generally known in the field of carbon materials as a porous carbon material, as a casting mold and covering the pores with various carbon sources, and Ketjen Black and other commercially available porous carbon black treated to activate it according to need to increase the micropores can be used.

Further, for the method of producing the catalyst used for producing the catalyst layer of the solid-polymer fuel cell using the carbon material for catalyst carrier use of the present invention, for example, the method of immersing the carbon material for catalyst carrier use in an aqueous solution of chloroplatinic acid or other catalyst metal compound, adding a hydrogen peroxide solution at a predetermined temperature while stirring, then adding an $Na_2S_2O_4$ aqueous solution to prepare a catalyst precursor, filtering, rinsing, and drying this catalyst precursor, then treating it to reduce it in a 100%-$H_2$ stream at a predetermined temperature and time or other conventionally known method of production of a catalyst of this type can be applied.

Furthermore, for such an obtained catalyst for solid-polymer fuel cell use as well, it is possible to use a method similar to the conventionally known method to form a catalyst layer for solid-polymer fuel cell use and further use this catalyst layer to produce a solid-polymer fuel cell.

2. Second Embodiment

The inventors engaged in intensive study to further improve the characteristics of the carbon material for catalyst carrier use according to the first embodiment and came up with the idea of the carbon material for catalyst carrier use according to a second embodiment.

That is, as explained above, the oxygen atoms contained in the carbon material used for a catalyst carrier are present in this carbon material in various chemical forms, for example, hydroxyl groups, carboxyl groups, carbonyl groups, ether groups, phenolic hydroxyl groups, lactone bonds, acid anhydride bonds, quinone bonds, etc. Due to the differences in the chemical forms, the starting temperatures of decomposition differ. Further, when heating a carbon material in an inert gas (or vacuum) atmosphere by a certain speed, the functional groups having these oxygen atoms decompose. Further, the inventors engaged in studies focusing on the CO (carbon monoxide) and $CO_2$ (carbon dioxide) generated at this time and as a result determined that the $CO_2$ gas quantity $Q_{CO2}$ generated in the 600 to 900° C. temperature region and the CO gas quantity $Q_{CO}$ generated in the 300 to 700° C. temperature region are important indicators for achieving both durability against oxidative consumption and power generation performance under operating conditions at the time of low humidity. Note that, to quantitatively show the amounts of oxygen present in such heat stable chemical forms, the inventors found that the oxygen content $O_{ICP}$ contained in the carbon material in the initial state is suitable.

Furthermore, the inventors found that to improve the durability and the power generation characteristics under low humidity conditions, there are limits with just improvements of the functional groups. Further, the inventors found that good power generation characteristics are exhibited even under extreme low humidity conditions only after combination with a specific pore structure. A pore structure obtained by a combination of the BET surface area $S_{BET}$ and micropore surface area $S_{micro}$ as specific indicators is prescribed. Micropores are small in pore size, so promote adsorption of water vapor at a low relative pressure. Therefore, the carbon material for catalyst carrier use becomes higher in ability to store water vapor the greater the area of the micropores. However, to enable gas to be diffused to the Pt particles carried inside the mesopores, a certain ratio of the pore area has to be allocated to mesopores. Therefore, the micropore surface area $S_{micro}$ being in a certain range with respect to the BET surface area $S_{BET}$ is necessary for raising the catalyst performance as a whole.

The inventors found a porous carbon material satisfying not only the requirements of the first embodiment, but also the requirements of the $CO_2$ gas quantity $Q_{CO2}$, CO gas quantity $Q_{CO}$, and micropore surface area $S_{micro}$. By using this carbon material as the carbon material for catalyst carrier use, the durability and power generation performance under operating conditions at the time of low humidity, in particular the durability against repeated load fluctuations due to startup and shutdown and power generation performance under operating conditions at the time of low humidity, are both improved. The inventors came up with the idea of the carbon material for catalyst carrier use according to the second embodiment based on this discovery.

Basically what is important in the second embodiment, in addition to the requirements of the first embodiment, is to increase the area of the micropores. Therefore, the inventors took note of the hydroxyl groups (—OH) and cyclic ether type oxygen (—O—) among the chemical forms containing oxygen in the carbon materials used for a catalyst carrier and studied measurement of the amounts of oxygen accounted for by these hydroxyl groups (—OH) and cyclic ether-type oxygen (—O—) and control of the same. Further, the inventors moved forward with studies using temperature-programmed desorption (TPD). As a result, the inventors found that quantification of the carbon monoxide (CO) and carbon dioxide ($CO_2$) generated when the oxygen-containing functional groups decompose under heat is suitable, that the $CO_2$ gas quantity $Q_{CO2}$ of the carbon dioxide generated in the 300 to 700° C. temperature region generally corresponds to the amount of oxygen derived from carbonic acid, that the CO gas quantity $Q_{CO}$ of the carbon monoxide generated in the 600 to 900° C. temperature region generally corresponds to the amount of oxygen derived from the hydroxyl groups and cyclic ether-type oxygen, and that to raise the durability of a carbon material, it is important to suppress the $CO_2$ gas quantity $Q_{CO2}$ to relatively increase the CO gas quantity $Q_{CO}$ (that is, make $Q_{CO}$>$Q_{CO2}$).

Further, the micropores in the carbon material used for a catalyst carrier, as will be understood from the water vapor adsorption characteristic of activated carbon, governs the water vapor adsorption characteristic at a low relative pressure. It is known that micropores start to adsorb water vapor at a lower relative pressure the smaller the pore size of the micropores and that, further, they adsorb water vapor at a lower relative pressure the higher the hydrophilicity of the carbon walls forming the pores. Furthermore, it is clear that the pore volume determines the absolute value of the amount of water vapor adsorption. Therefore, the inventors decided to first analyze the micropores to confirm that a carbon material had a certain volume of micropores and the carbon walls in the micropores were hydrophilic. For this analysis of the micropores, the same measurement data as the time of the BET analysis, that is, the adsorption/desorption isotherm of the nitrogen gas measured at the liquid nitrogen temperature, was used. Further, as the analysis method, the as plot method of the method of analysis suitable for precision quantification of the surface area of the micropores was employed. Further, the inventors studied the conditions of micropores required for improving the power generation characteristics under low humidity conditions. As a result, the inventors found that by limiting the numerical values of the micropore surface area calculated at the as plot method to 200 to 800 m$^2$/g, the power generation characteristics at low humidity are improved.

The carbon material for catalyst carrier use of the solid-polymer fuel cell of the present invention was conceived from the above-mentioned viewpoint. The carbon material for catalyst carrier use preferably satisfies not only the requirements of the first embodiment (requirements of (A) to (D)), but also the requirements of the following (E) to (H): (E) a CO gas quantity $Q_{CO}$ of 50 to 250 µmol/g generated at 600 to 900° C. in temperature region in TPD measurement, (F) a CO$_2$ gas quantity $Q_{CO2}$ of 10 to 100 µmol/g generated at 300 to 700° C. in temperature region in TPD measurement, and (G) a micropore area $S_{micro}$ of 200 to 800 m$^2$/g, and (H) $Q_{CO}$>$Q_{CO2}$.

Here, in the TPD measurement of (E) measured by temperature-programmed desorption (TPD), the CO gas quantity $Q_{CO}$ generated in a 600 to 900° C. temperature region is 50 to 250 µmol/g, preferably 80 to 200 µmol/g. Further, in the TPD measurement of (F), the CO$_2$ gas quantity $Q_{CO2}$ generated in the 300 to 700° C. temperature region is 10 to 100 µmol/g, preferably 15 to 60 µmol/g. If the CO gas quantity $Q_{CO}$ is lower than 50 µmol/g, the amount of the functional groups having polarity is too small, so there is the problem that it is not possible to exhibit a low humidity characteristic suitable for the present invention. Conversely, if becoming higher than 250 µmol/g, the polar functional groups become too numerous, so at the time of high humidity, the water vapor condenses and forms drops of water and the problem of obstructing gas diffusion and causing flooding is liable to occur. Further, if the CO$_2$ gas quantity $Q_{CO2}$ is lower than 10 µmol/g, in the same way as when the CO gas quantity $Q_{CO}$ is too small, the amount of polar functional groups is too small, so there is the problem that it is not possible to realize low humidity characteristics suitable for the present invention. Conversely, if becoming higher than 100 µmol/g, the polar functional groups become too numerous, so at the time of high humidity, the water vapor condenses and forms drops of water and the problem of these drops of water obstructing gas diffusion and causing flooding is liable to occur.

Further, to raise the durability of a carbon material, it is necessary to suppress the CO$_2$ gas quantity $Q_{CO2}$ to make the CO gas quantity $Q_{CO}$ relatively larger. For this reason, the requirement that (H) $Q_{CO}$>$Q_{CO2}$ has to be satisfied.

Further, in the carbon material for catalyst carrier use of the present invention, the micropore area $S_{micro}$ of (F) obtained by the above micropore analysis is 200 to 800 m$^2$/g, preferably 250 to 700 m$^2$/g. If this micropore area $S_{micro}$ is lower than 200 m$^2$/g, the volume for absorbing and storing water vapor itself becomes too small, so the catalyst layer cannot be supplied with sufficient water vapor. As a result, there is the problem that a suitable humidity cannot be held. Conversely, if becoming higher than 800 m$^2$/g, it becomes difficult to sufficiently secure a volume of mesopores of a diameter of 2 nm or more carrying the catalyst metal particles. As a result, the problem is liable to arise that the dispersion of the catalyst metal particles becomes poor and the power generation characteristics fall.

Here, the porous carbon material used as the carbon material for catalyst carrier use of the solid-polymer fuel cell of the present invention is not particularly limited so long as satisfying (A) to (H). As such a porous carbon material, carbon materials similar to the first embodiment may be mentioned. By further activating these porous carbon materials, it is possible to introduce suitable amounts of micropores suitable for the present invention. Furthermore, by performing suitable heat treatment, oxidation treatment, and other additional treatment, it is possible to make the above-mentioned indicators of $O_{ICP}$, $Q_{CO}$, $Q_{CO2}$, $S_{BET}$, $\Delta G$, and $S_{micro}$ values suitable for the present invention.

Here, the catalyst metal to be carried by the carbon material for catalyst carrier use is not particularly limited so long as one having the function of promoting the necessary chemical reactions at the catalyst layer of the anode side or cathode side. It is possible to use materials similar to those listed in the first embodiment.

The method for producing a carbon material for catalyst carrier use of the solid-polymer fuel cell of the present invention is not particularly limited so long as a method which can impart to a porous carbon material a constitution satisfying the requirements of (A) to (H). Various treatments can be applied according to need.

First, the method for imparting to the carbon material a constitution satisfying the requirements of (A) to (D) can be made one similar to the first embodiment. As the method for controlling the CO gas quantity $Q_{CO}$ and the CO$_2$ gas quantity $Q_{CO2}$ of the carbon material, for example, the method of using strong oxidation treatment to impart various oxygen-containing functional groups, then using heat treatment in an inert atmosphere or vacuum to remove the oxygen-containing functional groups unstable against heat such as carboxyl groups may be mentioned. According to this method, it is possible to adjust the carbon material to a surface state having hydroxyl groups and cyclic ether-type oxygen and other oxygen-containing functional groups suitable for the present invention. Depending on the initial acid treatment and the extent of the subsequent heat treatment temperature, it is possible to obtain a carbon material having a CO gas quantity $Q_{CO}$ and the CO$_2$ gas quantity $Q_{CO2}$ suitable for the present invention. Here, the oxidation treatment can be treatment similar to the oxidation treatment performed for adjusting the oxygen content.

Further, in the heat treatment performed in an inert atmosphere or in a vacuum after such oxidation treatment, the heat treatment temperature may be optimized in accordance with the extent of strength of the oxidation treatment. If giving an example, when using high concentration nitric acid for the heat treatment, the amount of oxygen which is introduced is large. Due to this, to make the amount of oxygen the one prescribed in the present invention, a 500° C. or more temperature must be set for heat treatment. On the other hand, in the case of treatment by hydrogen peroxide, 300 to 600° C. or so heat treatment is preferable. Further, as an inert atmosphere, nitrogen, argon, helium, etc. are preferably used. The heat treatment time is preferably 10 minutes to 5 hours. If less than 10 minutes, a sufficient effect of the heat cannot be obtained and unstable functional groups are also liable to remain. If over 5 hours, the process becomes long in time, so this is not preferable in practical terms in the work process. Whatever the case, at 1600° C. or more temperature, all of the oxygen is consumed, so the upper limit of the heat treatment temperature is 1600° C.

Furthermore, as a dry oxygen introduction treatment, oxygen plasma treatment, ozone treatment, etc. can be applied. In this case as well, by studying the optimum heat treatment conditions for the oxidation strength and amount of oxygen introduced, it is possible to obtain the optimal carbon material for the present invention. Further, it is also possible to suitably combine and apply the above various oxidation treatments.

Further, the method of using the carbon material for catalyst carrier use of the present invention to produce a catalyst for solid-polymer fuel cell use is not particularly limited. It is sufficient that it be similar to the first embodiment. Furthermore, the method of using such an obtained catalyst for solid-polymer fuel cell use to produce a catalyst layer for solid-polymer fuel cell use is also not particularly limited. It is sufficient to apply a method similar to the conventionally known method. Further, this catalyst layer can be used to produce a solid-polymer fuel cell.

3. Third Embodiment

The inventors engaged in intensive studies to further improve the characteristics of the carbon material for catalyst carrier use according to the first embodiment and thereby come up with the idea of a carbon material for catalyst carrier use according to a third embodiment.

Specifically, the inventors engaged in numerous studies during which they deduced that the nitrogen atoms introduced into a porous carbon material are present as amino groups (—$NH_2$), nitro groups (—$NO_2$), nitroso groups (—NO), cyano groups (—CN), pyrrole type five-member ring nitrogen (=N—H), pyridine-type nitrogen (—N=), nitrogen of the quaternary amine type having one double bond and two single bonds in which the carbon inside the polycyclic aromatic group is replaced with nitrogen (below, referred to as "quaternary-type nitrogen"), or other nitrogen-containing functional groups.

Further, the inventors focused on controlling these forms of nitrogen atoms to realize both durability and low humidity characteristics in the carbon material. Furthermore, the inventors thought that nitrogen-containing functional groups with a high stability against heat would be excellent in durability against fluctuations of potential. Further, the inventors predicted that since, among the nitrogen-containing functional groups, the above-mentioned pyridine-type nitrogen and quaternary-type nitrogen are excellent in stability against heat, pyridine-type nitrogen is basic, and quaternary-type nitrogen is charged to the plus side, both nitrogen-containing functional groups would have polarity and would exhibit excellent hydrophilicity. For this reason, the inventors engaged in further studies on these nitrogen-containing functional groups.

Further, the inventors engaged in intensive studies with this viewpoint and as a result found that by introducing nitrogen-containing functional groups into a porous carbon material, then heat treating the material under conditions leaving pyridine-type nitrogen and quaternary-type nitrogen and decomposing and dissociating other nitrogen-containing functional groups, it is possible to control the form of the nitrogen-containing functional groups introduced into the porous carbon material to a state mainly comprised of pyridine-type nitrogen and quaternary-type nitrogen. Furthermore, the inventors found that by controlling the nitrogen content contained in the carbon material as a whole and, in that, the nitrogen content derived from the pyridine-type nitrogen and quaternary-type nitrogen, it is possible to realize both durability and low humidity characteristics of the porous carbon material.

Furthermore, the inventors found that a porous carbon material where pyridine-type nitrogen and quaternary-type nitrogen are separated in the $N_{1s}$ spectrum by XPS and the ratio of these pyridine-type nitrogen and quaternary-type nitrogen present, found from the respective intensity ratios, is in a predetermined range has better durability and low humidity characteristics.

Further, the inventors came up with the idea of a porous carbon material satisfying, in addition to the requirements of the first embodiment, the requirement of the nitrogen content of the porous carbon material and the nitrogen content derived from pyridine-type nitrogen and quaternary-type nitrogen. By using this carbon material as a carbon material for catalyst carrier use, the durability and power generation performance under operating conditions at the time of low humidity, in particular the durability against repeated load fluctuation due to startup and shutdown and power generation performance under operating conditions at the time of low humidity, are both improved. The inventors came up with the idea of the carbon material for catalyst carrier use according to the third embodiment based on this discovery.

Basically what is important in the third embodiment is to, in addition to the requirements of the first embodiment, impart nitrogen with a high stability to the surface of the carbon materials. In a general porous carbon material, if the crystallinity becomes higher, the edge parts are decreased in area and oxygen-containing functional groups having a polarity present at the edge parts also decrease and so the hydrophilicity remarkably falls. As a result, there are the problems that the electrodes of the catalysts using a high crystallinity carbon material for the carrier are weak in moisture retention strength, the resistance to proton conduction at a low humidity operation becomes large, and the output voltage falls. To solve this problem, it is sufficient to introduce nitrogen-containing functional groups having polarity into a high crystallinity carbon material to raise the hydrophilicity of the carbon material. However, if introducing nitrogen-containing functional groups into the porous carbon material, there are various forms of the introduced nitrogen-containing functional groups. Usually, even if the hydrophilicity is improved and the output under operating conditions at the time of low humidity is improved, oxidative consumption of the carbon material with respect to fluctuations in potential starting from the decomposition of these nitrogen-containing functional groups is promoted and durability end up falling.

Therefore, the inventors took note of the overall nitrogen-containing functional groups introduced into a porous carbon material and the pyridine-type nitrogen and quaternary-type nitrogen highest in stability even among the different chemical forms and studied measurement of the overall nitrogen content of this carbon material and the nitrogen content derived from the pyridine-type nitrogen and quaternary-type nitrogen and control of the same. As a result, the inventors found that the amount of stable nitrogen remaining due to heat treatment in an inert gas (or vacuum) atmosphere at 900° C. (residual amount of nitrogen) roughly corresponds to the nitrogen content derived from the pyridine-type nitrogen and quaternary-type nitrogen. Furthermore, the inventors found that when using a carbon material with a residual amount of nitrogen after heat treatment at 900° C. within a certain range as the catalyst carrier, the durability of the fuel cell and the output characteristics at the time of low humidity operation are both improved. As a result, the inventors reached the present invention. That is, a carbon material used for a catalyst carrier is high in crystallinity and includes a predetermined amount of nitrogen in a chemical form stable against heat. To quantitatively express the nitrogen present in a chemical form stable against heat, in the present invention, the nitrogen content in the initial state and the residual amount of nitrogen remaining after heat treatment in an inert gas (or vacuum) atmosphere at 900° C. are prescribed.

The carbon material for catalyst carrier use of the solid-polymer fuel cell of the present invention was made from the above-mentioned viewpoint. The carbon material for catalyst carrier use preferably satisfies, in addition to the requirements of the first embodiment (requirements of (A) to (D)), the requirements of the following (I) to (J). (I) Nitrogen content $N_{ice}$ contained in carbon material of 0.3 to 5.0 mass % and (J) residual amount of nitrogen $N_{900° C.}$ remaining after heat treatment in inert gas (or vacuum) atmosphere at 900° C. of 0.2 to 4.0 mass %.

The nitrogen content $N_{ICP}$ measured by trace nitrogen analysis has to be 0.3 to 5.0 mass %, preferably is 0.35 to 4.0 mass %. If the nitrogen content $N_{ICP}$ of this carbon material for catalyst carrier use is less than 0.3 mass %, there is little polarity of the surface, so the hydrophilicity becomes weak and a drop in output voltage at the time of low humidity operation is liable to be invited. Conversely, if the nitrogen content $N_{ICP}$ becomes higher than 5.0 mass %, even if controlling the type of the contained nitrogen to raise the resistance to oxidative consumption, oxidative consumption of an extent causing practical problems is liable to be caused.

The residual amount of nitrogen $N_{900° C.}$ of (J) remaining after heat treatment in an inert gas (or vacuum) atmosphere at 900° C. has to be 0.2 to 4.0 mass %, preferably 0.3 to 3.5 mass %. If this residual amount of nitrogen $N_{900° C.}$ is lower than 0.2 mass %, the amount of nitrogen introduced is small, so the polarity of the surface of the carbon material is weak and the improvement of the hydrophilicity which the present invention tries to achieve becomes insufficient and, as a result, the power generation characteristics are liable to fall. Conversely, if the residual amount of nitrogen $N_{900° C.}$ becomes higher than 4.0 mass %, the oxidative consumption due to the introduction of nitrogen is liable to become greater and a durability able to withstand practical use is liable to be unable to be obtained.

Furthermore, regarding the requirement (C) explained in the first embodiment, the BET specific surface area $S_{BET}$ is preferably 400 to 1200 m$^2$/g, more preferably 500 to 1100 m$^2$/g. If the BET specific surface area $S_{BET}$ of this carbon material for catalyst carrier use is less than 400 m$^2$/g, there is the problem that in some cases the surface area for sufficiently carrying the catalyst metal becomes insufficient and a sufficient power generation performance cannot be exhibited. Conversely, the BET specific surface area $S_{BET}$ becoming higher than 1200 m$^2$/g means that the graphene becomes smaller and the locations of defects become greater. Therefore, the problem arises that sometimes the carbon material for catalyst carrier use itself falls in strength and the material can no longer be used as a catalyst for fuel cell use.

Furthermore, regarding the requirement (D) explained in the first embodiment, the G-band half-width is preferably 30 cm$^{-1}$ to 60 cm$^{-1}$, more preferably 30 cm$^{-1}$ to 50 cm$^{-1}$. If this G-band half-width is smaller than 30 cm$^{-1}$, the problem arises that sometimes the crystallinity of the carbon material for catalyst carrier use becomes too high, so it becomes difficult to carry the catalyst metal with a high dispersion in the step of carrying the catalyst metal. Conversely, if the G-band half-width becomes larger than 60 cm$^{-1}$, the problem arises that sometimes sufficient durability cannot be obtained with respect to repeated load fluctuations due to startup and shutdown.

Further, in the carbon material for catalyst carrier use of the present invention, in addition to satisfying the requirements of the above (A) to (D), (I), and (J), preferably the $N_{1s}$ intensity ratio (N-Q/N-6) between the N-6 peak with a binding energy near 398.5 eV and the N-Q peak near 400.5 eV in the $N_{1s}$ spectrum measured by XPS may be 0.2 to 1.6 in range. By satisfying this condition, a more excellent durability and low humidity characteristics are achieved. Note that, the intensities of the N-Q, N-6, and other peaks which can be found from the XPS spectrum are found by waveform separation of the spectrum.

The method for producing a carbon material for catalyst carrier use of a solid-polymer fuel cell of the present invention is not particularly limited so long as a method able to give a porous carbon material a constitution satisfying the above requirements of (A) to (D), (I), and (J), preferably a method able to further give a predetermined $N_{1s}$ strength ratio (N-Q/N-6). Various treatments may be applied in accordance with need.

As a porous carbon material used when producing such a carbon material for catalyst carrier use, carbon materials similar to the first embodiment may be mentioned. Further, a material obtained by further treating these porous carbon materials to activate them to make them more porous may also be used.

Further, the porous carbon material used when producing a carbon material for catalyst carrier use is preferably a porous carbon material excellent in crystallinity so as to raise the durability against repeated load fluctuations due to startup and shutdown of the solid-polymer fuel cell. Further, according to need, it is also possible to heat treat a porous carbon material in an inert gas atmosphere at 1400° C. to 2500° C., preferably 1600° C. to 2400° C., for 0.5 hour to 5 hours, preferably 1 hour to 3 hours in time (heat treatment for control of crystallinity). In this case, the crystallinity is further raised.

The method of producing a carbon material for catalyst carrier use of the present invention using the above porous carbon material is not particularly limited. It is preferably a method comprising an oxidation treatment step of oxidizing a porous carbon material to introduce oxygen-containing functional groups into the porous carbon material, a nitrogen substitution step of converting part or all of the oxygen-containing functional groups to nitrogen-containing functional groups by nitrogen substitution treatment heating the oxidized porous carbon material obtained by the oxidation treatment step in an ammonia gas atmosphere, and a functional group modifying step of heat treating the porous carbon material after nitrogen substitution treatment obtained at the nitrogen substitution step in an inert gas atmosphere to adjust the nitrogen-containing functional groups formed in the nitrogen substitution step to nitrogen-containing functional groups mainly comprised of pyridine-type nitrogen and quaternary-type nitrogen.

The oxidation treatment for introducing oxygen-containing functional groups into the porous carbon material may be treatment similar to the first embodiment. Further, the nitrogen substitution treatment is not particularly limited so long as able to replace the oxygen functional groups introduced into the porous carbon material with nitrogen functional groups, but, for example, it may also be nitrogen substitution treatment heating the material in an ammonia gas atmosphere at 500° C. to 1000° C. By such nitrogen substitution treatment, it is possible to remove the unstable oxygen-containing functional groups to obtain a porous carbon material having nitrogen-containing functional groups of a structure where oxygen is replaced with nitrogen.

Furthermore, in the functional group modifying step for adjusting the nitrogen-containing functional groups formed in the nitrogen substitution step to nitrogen-containing functional groups mainly comprising pyridine-type nitrogen and quaternary-type nitrogen, heat treatment is performed for heating the porous carbon material after the nitrogen substitution treatment in an inert gas and/or ammonia gas atmosphere. As the heat treatment conditions preferable at this time, a heating temperature of 900° C. to 1200° C. and a heating time of 10 minutes to 5 hours may be mentioned. As the inert gas, nitrogen, argon, helium, etc. may be suitably used. If the heating temperature at the time of heat treatment is lower than 900° C., it is difficult to cause the nitrogen-containing functional groups other than the pyridine-type nitrogen and quaternary-type nitrogen to decompose and dissociate. Conversely, if the heating temperature at the time of heat treatment exceeds 1200° C., the nitrogen-containing functional groups of the pyridine-type nitrogen or quaternary-type nitrogen are liable to decompose and dissociate. Further, if the heating time at the time of heat treatment is less than 10 minutes, a sufficient heating effect cannot be obtained and unstable nitrogen-containing functional groups also are liable to remain. Conversely, if the heating time at the time of heat treatment exceeds 5 hours, the process becomes protracted. This is not preferable in practical terms in a work process.

Note that, the method for producing a carbon material for catalyst carrier use of the present invention need only include the oxidation treatment step, nitrogen substitution step, and functional group modifying step. For example, the following method may also be used to prepare the carbon material for catalyst carrier use. That is, the oxidized porous carbon material obtained by the oxidation treatment step is heat treated at 700° C. to 1100° C. Next, the oxygen-containing functional groups are modified to cyclic ether type oxygen and quinone type oxygen. After that, the carbon material may be heat treated in an ammonia gas atmosphere at 500° C. to 1000° C. in heating temperature. Due to this, the oxygen-containing functional groups modified to cyclic ether type oxygen and quinone type oxygen can be converted to nitrogen-containing functional groups of pyridine-type nitrogen and quaternary-type nitrogen.

The catalyst metal carried on the carbon material for catalyst carrier use of the present invention is not particularly limited so long as one having the function of promoting the necessary chemical reaction at the catalyst layer of the anode side or cathode side. A material similar to those listed in the first embodiment can be used.

Further, the method of using the carbon material for catalyst carrier use of the present invention to produce a catalyst for solid-polymer fuel cell use is not particularly limited. It may be one similar to the first embodiment. Furthermore, the method of using the thus obtained catalyst for solid-polymer fuel cell use to produce a catalyst layer for solid-polymer fuel cell use is also not particularly limited.

It is possible to apply a method similar to the conventionally known methods. Further, this catalyst layer may be used to produce a solid-polymer fuel cell.

4. Fourth Embodiment

The inventors further studied the method for producing a carbon material for catalyst carrier use according to the third embodiment. As a result, the inventors came up with the idea of introducing nitrogen-containing functional groups into a porous carbon material, then leaving behind pyridine-type nitrogen and quaternary-type nitrogen and heat treating the result under conditions causing the other nitrogen-containing functional groups to decompose and dissociate. Furthermore, the inventors newly developed, as the method of introducing nitrogen-containing functional groups into a porous carbon material, leaving behind pyridine-type nitrogen and quaternary-type nitrogen, and causing the other nitrogen-containing functional groups to decompose and dissociate, the method of performing carrying treatment carrying an organic compound containing nitrogen atoms in its molecule (below, referred to as a "nitrogen-containing organic compound") in a porous carbon material, the next heat treating the porous carbon material after carrying treatment in an inert gas atmosphere and/or reducing gas atmosphere at 500° C. to 1100° C. as fixation treatment.

Further, the inventors found that in the fixation treatment, it is possible to use a reducing gas atmosphere comprised of ammonia gas so as to control the type of nitrogen-containing functional groups fixed and the amounts fixed. Furthermore, the inventors found that due to this, it is possible to produce a carbon material for catalyst carrier use of a solid-polymer fuel cell having pyridine-type nitrogen and quaternary-type nitrogen in predetermined ranges and having excellent durability and low humidity characteristics. Furthermore, the inventors found that by heat treating the nitrogen-containing porous carbon material obtained by the various above-mentioned treatments further in an inert gas atmosphere at 700° C. to 1100° C., it is possible to more accurately control the types of the nitrogen-containing functional groups and the ratios of presence of the same. Further, the inventors found that due to this, it is possible to easily produce a carbon material for catalyst carrier use having the features of the third embodiment.

Basically what is important in the fourth embodiment is the measurement of the overall nitrogen content of the carbon material and the nitrogen content derived from the pyridine-type nitrogen and quaternary-type nitrogen and the control of the same. The inventors found that the amount of stable nitrogen remaining due to heat treatment in an inert gas (or vacuum) atmosphere at 900° C. (residual amount of nitrogen) roughly corresponds to the nitrogen content derived from the pyridine-type nitrogen and quaternary-type nitrogen. Furthermore, the inventors found that when using a carbon material with such a residual amount of nitrogen after this 900° C. heat treatment in a certain range as the catalyst carrier, the durability and output characteristics in low humidity operation of the fuel cell are both improved. As a result, the inventors reached the present invention. That is, the carbon material used for a catalyst carrier is one having a high crystallinity and including a predetermined amount of nitrogen in a chemical form stable against heat. To express quantitatively the nitrogen present in a chemical form stable against heat in this way, the present invention prescribes the nitrogen content in the initial state and the residual amount of nitrogen remaining after heat treatment in an inert gas (or vacuum) atmosphere at 900° C.

According to the fourth embodiment, it is possible to produce a carbon material for catalyst carrier use according to the third embodiment.

Specifically, that method has a carrying treatment step of making a porous carbon material carry a nitrogen-containing organic compound and a fixation treatment step of heat treating the porous carbon material after the carrying treatment obtained in this carrying treatment step in an inert gas and/or reducing gas atmosphere at 500 to 1100° C. to fix the nitrogen in the nitrogen-containing organic compound on the porous carbon material.

As the porous carbon material used when producing such a carbon material for catalyst carrier use, carbon materials similar to the first embodiment may be mentioned. Further, a material obtained by further treating these porous carbon materials to activate them to make them more porous may also be used.

Further, the porous carbon material used when producing such a carbon material for catalyst carrier use preferably is a porous carbon material excellent in crystallinity so as to raise the durability against repeated load fluctuations due to startup and shutdown of the solid-polymer fuel cell. Furthermore, if necessary, the porous carbon material may be heat treated in an inert gas atmosphere at 1400° C. to 2500° C., preferably 1600° C. to 2400° C. for 0.5 hour to 5 hours, preferably 1 hour to 3 hours (heat treatment for control of crystallinity). In this case, the crystallinity is further raised.

Furthermore, it is important that the porous carbon material used when producing the carbon material for catalyst carrier use readily accept nitrogen. Therefore, before the carrying treatment step of making the surface of the porous carbon material carry the nitrogen-containing organic compound, treatment may also be performed to reform the surface of the porous carbon material used as the starting material. Due to such treatment, it is possible to raise the fixed rate of the heat decomposition products including nitrogen produced at the time of heat treatment at the fixation treatment step. Specifically, for example, A: nano-size pores are introduced into the porous carbon material to make the interaction between the nitrogen-containing organic compound carried in the pores and the pore walls stronger. B: functional groups with a strong interaction with the nitrogen-containing organic compound (for example, oxygen-containing functional groups etc.) are introduced to the surface of the porous carbon material or functional groups which easily chemically bond with the nitrogen-containing organic compound at the time of heating are introduced at the surface of the porous carbon material, and C: functional groups such as those which decompose under heat at the same time as the nitrogen-containing organic compound (for example, oxygen-containing functional groups etc.) are introduced to the surface of the porous carbon material.

Therefore, regarding the porous carbon material used as the starting material before the carrying treatment, from the above viewpoint A, preferably the BET specific surface area may be 300 $m^2/g$ to 1200 $m^2/g$, more preferably 500 $m^2/g$ to 1000 $m^2/g$. Further, from the above viewpoints B and C, the oxygen content is preferably 0.1 to 3.0 mass %, more preferably 0.1 to 2.0 mass %, still more preferably 0.3 to 1.5 mass %.

Further, the nitrogen-containing organic compound which the porous carbon material is made to carry in the carrying treatment step has to be a compound which decomposes under heat at the time of the heat treatment of the next fixation treatment step and imparts nitrogen to the porous carbon material. Specifically, the nitrogen-containing organic compound preferably does not fuse, decompose, sublimate, etc. at less than 200° C. Furthermore, the nitrogen-containing organic compound preferably has a melting point, decomposition temperature (temperature when decomposing without changing from solid phase to liquid phase) or sublimation temperature of 200° C. or more, preferably 250° C. to 300° C., and decomposes under heat at 300° C. or more. Furthermore, the thermal decomposition products including nitrogen of the nitrogen-containing organic compound preferably are adsorbed and fixed on the surface of the porous carbon material. Such a nitrogen-containing organic compound is not particularly limited so long as complying with the object of fixing the nitrogen, but preferably it is possible to use various types of nitrogen-containing heterocyclic compounds. Further, the form of the nitrogen in the nitrogen-containing organic compound is not particularly limited so long as achieving the object of fixing the nitrogen explained above, but if a complex-member type cyclic nitrogen or pyridine-type nitrogen, the ratio of fixing the nitrogen to the porous carbon material becomes higher and the nitrogen can be easily fixed in the form of pyridine-type nitrogen or quaternary-type nitrogen.

As the nitrogen-containing heterocyclic compound suitable as a nitrogen-containing organic compound to be carried on the porous carbon material at this carrying treatment step, for example, pyrrole, imidazole, pyrazole, oxazole, isoxazole, thiazole, pyrazoline, and their derivatives and other 5-member ring type compounds, pyridine, pyrazine, pyrimidine, pyridazine, triazine, tetrazine, uracil, and their derivatives and other 6-member ring type compounds, indole, isoindole, benzimidazole, purine, xanthine, indazole, benzoxazole, benzothiazole, and their derivatives and other 5-member ring+6-member ring type compounds, quinoline, quinoxaline, quinazoline, cinnoline, pteridine, and their derivatives and other 6-member ring+6-member ring type compounds, etc. may be mentioned. Furthermore, tetraphenyl porphyrin, phthalocyanine, phenazine, phenothiazine, acridine, tacrin, melanin, and other polycyclic compounds etc. may be mentioned.

Further, the method of making the porous carbon material carry the nitrogen-containing organic compound in this carrying treatment step is not particularly limited. For example, the method of making the nitrogen-containing organic compound dissolve in a suitable solvent, adding the porous carbon material in the obtained nitrogen-containing organic compound solution, making these nitrogen-containing organic compound solution and porous carbon material sufficiently contact each other, then evaporating away the solvent etc. may be mentioned.

Further, in the fixation step fixing the nitrogen in the nitrogen-containing organic compound on the porous carbon material, heat treatment is performed to heat the nitrogen-carrying porous carbon material in an inert gas and/or reducing gas atmosphere at 500 to 1100° C., preferably 600 to 1000. Here, the fixed rate of carbon would fall in an oxidizing gas atmosphere, so this is not preferred. Conversely, if a reducing gas atmosphere, there is the effect that when the nitrogen-containing organic compound contains oxygen etc., at the time of thermal decomposition, the production of $CO_2$ etc. by oxygen in the molecules and carbon is suppressed. As the reducing gas atmosphere, hydrogen, ammonia, etc. can be used. Further, as the inert gas atmosphere, nitrogen, argon, helium, etc. can be preferably used. Further, regarding the treatment time in heat treatment, usually 10 minutes to 5 hours is good. If less than 10 minutes, a sufficient heat treatment effect cannot be obtained and unstable functional groups are liable to remain.

Conversely, if over 5 hours, the process becomes protracted, so this is not preferable in practical terms in the work process.

Here, if the heating temperature at the time of heat treatment in the fixation treatment step is less than 500° C., the form of the nitrogen introduced to the surface of the obtained carbon material for catalyst carrier use is liable to be poor in heat stability and the catalyst carrier is liable to fall in durability. Further, if the heating temperature at the time of heat treatment is over 1100° C., the nitrogen-containing functional groups are liable to decompose and the effect of the present invention is liable to no longer be exhibited.

Further, in the fixation treatment step, it is also possible to perform heat treatment in a reducing gas atmosphere containing a reducing gas comprised of 5 to 100 vol %, preferably 10 to 100 vol %, of ammonia gas and having a balance of inert gas at 500 to 1100° C., preferably 550 to 1000° C. Furthermore, if necessary, it is possible to perform such heat treatment, then again perform heat treatment in an inert gas atmosphere at 700 to 1100° C., preferably 750 to 1050° C. By this heat treatment in a reducing gas atmosphere or the heat treatment in this reducing gas atmosphere plus repeat heat treatment in an inert gas atmosphere, it is possible to control the types of nitrogen-containing functional groups fixed and the fixed amounts of the same or possible to more accurately control the types of nitrogen-containing functional groups and the ratios of the same. As a result, it becomes possible to produce a carbon material for catalyst carrier use of a solid-polymer fuel cell having the desired durability and low humidity characteristics. The carbon material for catalyst carrier use obtained by the method of the present invention satisfies all of the requirements of the third embodiment. Due to this, the solid-polymer fuel cell using the carbon material for catalyst carrier use can achieve both better durability and low humidity characteristics.

The catalyst metal carried at the carbon material for catalyst carrier use is not particularly limited so long as one having the function of promoting the necessary chemical reaction at the catalyst layer of the anode side or cathode side. A material similar to those listed in the first embodiment can be used.

Further, the method of using the carbon material for catalyst carrier use of the present invention to produce a catalyst for solid-polymer fuel cell use is not particularly limited and can be one similar to the first embodiment. Furthermore, the method of using such an obtained catalyst for solid-polymer fuel cell use to produce a catalyst layer for solid-polymer fuel cell use is also not particularly limited. A method similar to a conventionally known method may be applied. Further, this catalyst layer may be used to produce a solid-polymer fuel cell.

5. Fifth Embodiment

The inventors engaged in intensive studies to further improve the characteristics of the carbon material for catalyst carrier use according to the first embodiment and thereupon came up with the idea of the carbon material for catalyst carrier use according to a fifth embodiment.

When introducing boron atoms into a porous carbon material, as the form of the boron atoms introduced into this porous carbon material, >B-type boron atoms, boron atoms forming >B—OH-type functional groups, boron atoms forming —B=O-type functional groups, boron atoms forming >B—H-type functional groups, etc. may be considered as atoms forming the aromatic structures of the carbon material together with carbon atoms. The inventors focused on controlling the forms of these boron atoms in a porous carbon material to realize both durability and low humidity characteristics in the porous carbon material. In particular, it is known that boron atoms form a solid solution in a carbon material and is known that such solid solution boron atoms have a catalytic action raising the crystallinity of the aromatic structures in the process of diffusing and moving through the carbon material. Therefore, the inventors thought that higher crystallization due to boron atoms would suppress the oxidative consumption of the carbon material, that is, contribute to improved durability. Further, if boron atoms and carbon atoms are copresent in an oxidizing atmosphere, the boron atoms will be oxidized before the carbon atoms and become boron oxide ($B_2O_3$). The inventors thought that the boron oxide produced at this time might cover the surface of the carbon material and suppress oxidation of the carbon atoms, that is, realize an effect of suppression of oxidation. Furthermore, the inventors thought that boron oxide, if accompanied with a certain extent of density, might keep the carbon atoms on the surface of the carbon material from contacting oxygen and realize resistance to oxidative consumption of the carbon material.

Therefore, the inventors proceeded with further studies on utilizing the two effects of the effect raising the crystallinity of the aromatic structures due to the catalytic action of boron atoms and the effect of suppression of oxidation by covering the surface of the carbon material with boron oxide so as to improve the resistance to oxidative consumption of the porous carbon material.

Further, the inventors engaged in intensive studies with such a perspective and as a result found that by making the porous carbon material carry a boron source, then heat treating it to introduce boron atoms inside the carbon material, then further, as oxidation treatment, oxidizing part of the boron atoms introduced into the carbon material, then heat treating it to adjust the oxygen content in the carbon material, it is possible to realize both durability in the porous carbon material (in particular, resistance to oxidative consumption at the cathode side) and low humidity characteristics. Furthermore, the inventors found that a porous carbon material with an intensity ratio (BO/BC) in the $B_{1S}$ spectrum by XPS between the peak (BO) corresponding to B—O bonds with a binding energy near 192 eV and the peak (BC) corresponding to the B—C bonds with a binding energy near 186 eV (below, sometimes referred to simply as the "$B_{1S}$ spectrum intensity ratio (BO/BC)") in a predetermined range has better durability and low humidity characteristics.

Further, the inventors came up with the idea of a porous carbon material satisfying, in addition to the requirements of the first embodiment, the requirements of the boron content and oxygen content of the above porous carbon material. They found that by using this carbon material as the carbon material for catalyst carrier use, it is possible to easily produce a solid-polymer fuel cell excellent in both durability and power generation performance under operating conditions at the time of low humidity, in particular both durability against repeated load fluctuations due to startup and shutdown (in particular, resistance to oxidative consumption at cathode side) and power generation performance under operating conditions at the time of low humidity and thereby completed the present invention.

The carbon material for catalyst carrier use according to the fifth embodiment preferably satisfies the following requirement (K) in addition to the requirements of the first embodiment ((A) to (D)): (K) a boron content $B_{ICP}$ of 0.3 to 5.0 mass %. Boron atoms are present near the surface of the carbon material as component atoms of aromatic structures such as >B-type substituent atoms or as boron-containing functional groups such as >B—OH type, —B=O type, >B—H type. The boron atoms of substituent atoms present as component atoms of the former aromatic structures form polarity centers to contribute to the greater hydrophilicity of the carbon material for catalyst carrier use. Further, the latter boron-containing functional groups, in particular the boron-oxygen-containing functional groups containing oxygen atoms, are believed to contribute to greater hydrophilicity due to the oxygen atoms. Further, in particular, it is believed that the boron oxide ($B_2O_3$) present near the surface of the carbon material contributes to the resistance to oxidative consumption.

Here, in the present invention, in the process of using the boron source to introduce boron atoms into the porous carbon material, the boron atoms proceed to replace atoms and diffuse to the inside of the carbon material. At that time, due to the action of the boron atoms as graphitization catalysts, the crystallinity of the aromatic structures of the carbon material is improved. Further, due to the improvement of this crystallinity, in particular it is believed that the durability against repeated load fluctuations due to startup and shutdown of the solid-polymer fuel cell is improved. This is because if the crystallinity of aromatic structures in a carbon material becomes higher, structures comprised of large carbon hexagonal network faces (condensed polycyclic aromatic structures) stacked together grow, the area of the edge parts weak against oxidation becomes smaller so an oxidation reaction becomes harder to proceed, and the number of resonant aromatic rings becomes greater and the stability of the edge parts themselves also increases.

Further, if treating the porous carbon material carrying the boron sources near the surface to oxidize, the boron atoms will be oxidized before the carbon atoms. The boron oxide ($B_2O_3$) produced by this oxidation treatment is stopped near the surface as it is and covers the carbon material. It is believed that when this carbon material is used as the catalyst layer of a fuel cell, the carbon atoms forming the porous carbon material are kept from being oxidized and vaporized into $CO_2$ etc. and as a result the resistance to oxidative consumption of the porous carbon material is improved.

The boron content $B_{ICP}$ of (K) has to be 0.3 to 5.0 mass %, preferably 0.5 to 4.0 mass %. If this boron content $B_{ICP}$ is less than 0.3 mass %, the polarity of the surface of the carbon material becomes insufficient and the hydrophilicity weakens and therefore the desired output voltage is liable to be unable to be obtained under the operating conditions at the time of low humidity. Conversely, if becoming higher than 5.0 mass %, the electron conductivity of the carbon material falls, the electrical resistance when forming a catalyst layer for fuel cell use becomes larger, and, in this case as well, the desired output voltage is liable to be unable to be achieved.

Further, regarding the requirement (B) explained in the first embodiment, the oxygen content $O_{ICP}$ is preferably 0.3 to 3.0 mass %, preferably 0.5 to 2.5 mass %. If this oxygen content $O_{ICP}$ is less than 0.3 mass %, the polarity of the surface of the carbon material becomes insufficient, the hydrophilicity becomes weaker, and sometimes the desired output voltage under operating conditions at the time of low humidity cannot be achieved. Conversely, if the oxygen content $O_{ICP}$ becomes higher than 3.0 mass %, the oxidative consumption of the carbon due to the catalyst metal particles carried on the carrier becomes excessive and sometimes the resistance to oxidative consumption ends up falling.

Furthermore, regarding the requirement (C) explained in the first embodiment, the BET specific surface area $S_{BET}$ is preferably 300 to 1000 $m^2/g$, more preferably 400 to 900 $m^2/g$. If this BET specific surface area $S_{BET}$ is less than 300 $m^2/g$, the surface area for sufficiently carrying the catalyst metal becomes insufficient and sometimes sufficient power generation performance cannot be exhibited. Conversely, if the BET specific surface area $S_{BET}$ becomes higher than 1000 $m^2/g$, the graphene becomes smaller, the locations of defects become greater, the strength of the carbon material itself falls, and sometimes use as a catalyst for fuel cell use becomes no longer possible.

Furthermore, regarding the requirement (D) explained in the first embodiment, the G-band half-width is preferably 30 to 60 $cm^{-1}$, more preferably 30 to 50 $cm^{-1}$. If this G-band half-width is smaller than 30 $cm^{-1}$, the crystallinity of the carbon material becomes too high and sometimes it becomes difficult to carry the catalyst metal with a high dispersion in the process for carrying the catalyst metal. Conversely, if the G-band half-width becomes higher than 60 $cm^{-1}$, sometimes it becomes difficult to obtain sufficient durability against repeated load fluctuations due to startup and shutdown.

Further, the carbon material for catalyst carrier use of the present invention, in addition to satisfying the above requirements of (A) to (D) and (K), preferably satisfies at least one of the condition of the $B_{1s}$ spectrum intensity ratio (BO/BC) measured by XPS being 0.2 to 1.5, more preferably 0.3 to 1.3, and the condition of the $O_{900° C.}$ after heat treatment in an inert gas atmosphere at 900° C. being 0.2 to 2.0 mass %, more preferably 0.25 to 1.8 mass %. Note that, the peak intensities of the peak (BO) of the B—O bonds and the peak (BC) of the B—C bonds found from the XPS spectrum are found by waveform separation of the XPS spectrum.

Here, when the $B_{1S}$ spectrum intensity ratio (BO/BC) is 0.2 to 1.5 in range, better durability and low humidity characteristics are achieved. If this $B_{1S}$ spectrum intensity ratio (BO/BC) is less than 0.2, sometimes the boron-oxygen-containing functional groups become too small in amount, the hydrophilicity becomes insufficient, and the power generation characteristics under low humidity operating conditions become insufficient. Conversely, if the $B_{1S}$ spectrum intensity ratio (BO/BC) becomes higher than 1.5, the amount of boron present at the edge parts become too great, the electron conductivity of the surface of the carbon material falls, and sometimes the electrical resistance when forming a catalyst layer for fuel cell use becomes greater. In this case as well, sometimes the desired output voltage cannot be realized. Further, if the residual amount of oxygen $O_{900° C.}$ is lower than 0.2 mass %, the polarity is low, so sometimes the output voltage will fall under low humidity operating conditions. Conversely, if becoming higher than 2.0 mass %, the amount of oxygen becomes too large, so the oxidative consumption due to the catalyst metal carried on the carbon carrier becomes excessive and in turn the resistance to oxidative consumption sometimes falls.

The method for producing a carbon material for catalyst carrier use of a solid-polymer fuel cell of the present invention is not particularly limited so long as a method which can give the porous carbon material a constitution satisfying the above requirements of (A) to (D) and (K), preferably further a predetermined $B_{1S}$ spectrum intensity ratio (BO/BC) and/or predetermined residual amount of oxygen $O_{900° C.}$. For example, as that method, the method of using CVD treatment to make the porous carbon material carry boron atoms, then heat treating the material in an inert gas atmosphere to make the boron atoms diffuse to the inside of the carbon material, the method of carrying boric acid and boron oxide ($B_2O_3$) or other inorganic boron-containing compounds or an organic boron-containing compound containing boron atoms at the surface of a porous carbon material, then heat treating the material in an inert gas atmosphere to make the boron atoms diffuse to the inside of the carbon material, etc. may be illustrated.

When producing the carbon material for catalyst carrier use of the present invention, as a preferable method, it is possible to mention a method comprising a boron source carrying step of making a starting carbon material carry a boron source, a boron introducing step of heat treating the boron source-carrying carbon material obtained by the boron carrying step in an inert gas atmosphere to make the boron diffuse to the inside of the boron source-carrying carbon material, and an oxygen content adjusting step of oxidizing the boron-containing carbon material obtained in the boron introducing step in an oxidizing gas atmosphere, then heat treating the boron-containing carbon material in an inert gas and/or reducing gas atmosphere to adjust the oxygen content.

In the boron source carrying step, as the porous carbon material used as the starting carbon material, a material similar to those listed in the first embodiment can be used. Further, it is possible to use materials obtained by activating these porous carbon materials to make them further porous.

The porous carbon material used in this boron source carrying step is preferably a porous carbon material excellent in crystallinity so as to raise the durability against repeated load fluctuations due to startup and shutdown of the solid-polymer fuel cell. Further, it is also possible to heat treat the porous carbon material in an inert gas atmosphere at 1400 to 2500° C., preferably 1600 to 2400° C., for 0.5 to 5 hours, preferably 1 to 3 hours (heat treatment for control of crystallinity). In this case, the crystallinity is further raised. In the later explained boron introducing step, the crystallinity of the carbon material is improved, but there are limits to this effect. That is, in the carbon material before the boron introducing step, if the original crystallinity is low, sometimes the crystallinity in the carbon material after the boron introducing step can be not perfect, but is insufficient. For this reason, to obtain sufficient resistance to oxidative consumption, it is preferable to use a carbon material after control of the crystallinity by heat treatment in advance in the above way.

Further, the boron source used in the boron source carrying step is not particularly limited. Boric acid, $B_4C$, boron oxide ($B_2O_3$), and other inorganic boron-containing compounds, organic boron-containing compounds containing boron atoms, and other boron-containing compounds may be illustrated. From the viewpoint of the work efficiency in this boron source carrying step and efficiently causing boron to diffuse from the carried boron source to the carbon material, as preferable examples of the boron source, boric acid triesters, boronic acids (alkyl and alkenyl boronic acids, arylboronic acid, and heteroaryl boronic acid), boronic acid esters (alkyl and alkenyl boronic acid esters, arylboronic acid esters, heteroarylboronic acid esters), diboronic acids and diboronic acid esters, protected boronic acids, borinic acid esters, borane, borohydride, tetraphenylborate, tetrafluoroborate, trifluoroborate, boron trihalides (boron trichloride and boron trifluoride) or other organic boron compounds can be mentioned. As more preferable examples, those of these organic boron compounds having melting points of 200 to 400° C. may be mentioned.

In the boron source carrying step, the method of making the porous carbon material carry the boron source is not particularly limited. Various methods generally known as methods for making a carbon material carry a compound can be employed. As that method, for example, there are the method of dissolving the boron-containing compound of the boron source in a suitable solvent, adding a starting carbon material of a porous carbon material in the obtained solution, stirring well to obtain a slurry, then making the solvent evaporate from the obtained slurry to obtain a boron source-carrying carbon material or the method of filtering the slurry and drying the obtained solid components to obtain the boron source-carrying carbon material etc. Further, CVD treatment etc. may be used to make a porous carbon material carry boron atoms.

In the boron introducing step, by heat treating the porous carbon material on which the boron is carried in an argon gas atmosphere or other inert gas atmosphere, the boron is made to diffuse to the inside of the porous carbon material. Due to this, a boron-containing carbon material is obtained. The heating temperature at this time is preferably 1500 to 2200° C., more preferably 1600 to 2100° C. Further, the heating time is preferably 1 to 20 hours, more preferably 2 to 10 hours. If the heating temperature is lower than 1500° C., sometimes the boron will not diffuse to the inside of the carbon material. Conversely, if it becomes higher than 2200° C., the graphite crystallinity of the carbon material due to the catalytic action of the boron develops too much, so the porous structure ends up being destroyed and sometimes the carrying function of carrying catalyst metal particles is impaired. Further, if the heating time is shorter than 1 hour, sometimes boron will not sufficiently diffuse inside the carbon material. Conversely, if the heating time becomes longer than 20 hours, the actual manufacturing cost will sometimes become higher.

Furthermore, in the oxygen content adjusting step, by oxidizing the boron-containing carbon material in an oxidizing gas atmosphere, oxygen atoms are introduced into the boron-containing carbon material. Next, by heat treating the boron-containing carbon material in an inert gas and/or reducing gas atmosphere, the amount of the oxygen atoms introduced into the boron-containing carbon material (oxygen content) is adjusted.

Here, the oxidation treatment for introducing oxygen atoms into the boron-containing carbon material is not particularly limited. For example, it may be an oxidation treatment similar to the first embodiment.

Further, the boron-containing carbon material after the oxidation treatment is heated in an inert gas and/or reducing gas atmosphere. Due to this, it is possible to remove part or all of the oxygen (oxygen functional groups) introduced to the carbon atoms and preferentially leave the oxygen atoms bonded to the boron. The heating temperature in the heat treatment is usually 600 to 1100° C., preferably 700 to 1000° C., while the heating time is 1 to 10 hours, preferably 1 to 5 hours. Due to this, it is possible to remove the relatively unstable oxygen atoms (oxygen-containing functional groups) bonded to the carbon atoms. As a result, it is possible to obtain a carbon material for catalyst carrier use of the present invention having relatively stable oxygen atoms (fluorine-containing functional groups) bonded to boron atoms.

The catalyst metal to be carried in the carbon material for catalyst carrier use is not particularly limited so long as one having the function of promoting the necessary chemical reaction at the anode side or cathode side catalyst layer. A material similar to those listed in the first embodiment may be used.

Further, the method of using the carbon material for catalyst carrier use of the present invention to produce a catalyst for solid-polymer fuel cell use is not particularly limited and may be similar to the first embodiment. Furthermore, the method of using the thus obtained catalyst for solid-polymer fuel cell use to produce a catalyst layer for a solid-polymer fuel cell is also not particularly limited. It is possible to apply a method similar to the conventionally known methods. Further, this catalyst layer can be used to produce a solid-polymer fuel cell.

6. Sixth Embodiment

A sixth embodiment of the present invention will be explained. The sixth embodiment is a solid-polymer fuel cell 1 using a catalyst for solid-polymer fuel cell use according to any of the first to fifth embodiments (below, referred to as simply as "fuel cell 1"). Below, based on FIG. 1, the constitution of a fuel cell 1 according to the sixth embodiment will be explained.

First, based on FIG. 1, the overall constitution of the fuel cell 1 according to the present embodiment will be explained. The fuel cell 1 is, for example, a solid-polymer fuel cell and is provided with separators 10, 20, gas diffusion layers 30, 40, catalyst layers 50, 60, and an electrolytic film 70.

The separator 10 is the separator of the anode side. It introduces hydrogen or another reducing gas to the gas diffusion layer 30. The separator 20 is the separator of the cathode side. It introduces oxygen gas, air, or another oxidizing gas to the gas diffusing aggregate phase. The types of the separators 10, 20 are not particularly limited. They need only be separators used in conventional fuel cells, for example, solid-polymer fuel cells.

The gas diffusion layer 30 is the gas diffusion layer of the anode side. It causes the reducing gas supplied from the separator 10 to diffuse, then supplies it to the catalyst layer 50. The gas diffusion layer 40 is the gas diffusion layer of the cathode side. It causes the oxidizing gas supplied from the separator 20 to diffuse, then supplies it to the catalyst layer 60. The types of the gas diffusion layers 30, 40 are not particularly limited. They may be gas diffusion layers used in conventional fuel cells, for example, solid-polymer fuel cells. As examples of the gas diffusion layers 30, 40, carbon cloth or carbon paper or other porous carbon materials, metal meshes or metal wool and other porous metal materials etc. may be mentioned. Note that, as preferable examples of the gas diffusion layers 30, 40, two-layer structure gas diffusion layers where the layers of the gas diffusion layers at the separator sides become gas diffusing fiber layers mainly comprised of fibrous carbon materials and the layers at the catalyst layer sides become micropore layers mainly comprised of carbon black may be mentioned.

The catalyst layer 50 is the so-called "anode". Inside the catalyst layer 50, an oxidation reaction of the reducing gas occurs and protons and electrons are generated. For example, when the reducing gas is hydrogen gas, the following oxidation reaction occurs.

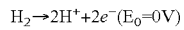

The protons generated due to the oxidation reaction pass through the catalyst layer 50 and electrolytic film 70 to reach the catalyst layer 60. The electrons produced due to the oxidation reaction pass through the catalyst layer 50, gas diffusion layer 30, and separator 10 to reach an outside circuit. The electrons perform work inside the outside circuit, then are introduced to the separator 20. After that, the electrons pass through the separator 20 and gas diffusion layer 40 to reach the catalyst layer 60. The constitution of the catalyst layer 50 is not particularly limited. That is, the constitution of the catalyst layer 50 may be a constitution similar to a conventional anode, may be a constitution similar to a later explained catalyst layer 60, or may be a constitution further higher in hydrophilicity than the catalyst layer 60.

The catalyst layer 60 is a so-called "cathode". Inside the catalyst layer 60, the oxidizing gas undergoes a reduction reaction whereby water is produced. For example, when the oxidizing gas is oxygen gas or air, the following reduction reaction occurs. The water produced by the oxidation reaction is discharged along with the unreacted oxidizing gas to the outside of the fuel cell 1. The detailed constitution of the catalyst layer 60 will be explained later.

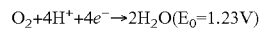

In this way, in the fuel cell 1, the energy difference between the oxidation reaction and the reduction reaction (potential difference) is utilized to generate power. In other words, the electrons produced by the oxidation reaction perform work in an external circuit.

The catalyst layer 60 includes an electrolytic material etc. in addition to a catalyst for solid-polymer fuel cell use according to any of the first to fifth embodiments. In this way, in the fuel cell 1, a catalyst for solid-polymer fuel cell use according to any of the first to fifth embodiment is included in the catalyst layer 60. Therefore, the fuel cell 1 is excellent in durability and power generation performance under operating conditions at the time of low humidity, in particular durability against repeated load fluctuations due to startup and shutdown (in particular, resistance to oxidative consumption at the cathode side) and power generation performance under operating conditions at the time of low humidity. Note that, the rest of the constitution of the catalyst layer 60 is not particularly limited. For example, the electrolytic material may also be a material similar to the later explained electrolytic film 70.

The electrolytic film 70 is comprised of an electrolytic material having proton conductivity. The electrolytic film 70 introduces protons generated by the oxidation reaction into the cathode comprised of the catalyst layer 60. Here, the type of the electrolytic material is not particularly limited. It need only be an electrolytic material used in a conventional fuel cell, for example, a solid-polymer fuel cell. A preferred example is an electrolytic material, that is, electrolytic resin, used in a solid-polymer fuel cell. As the electrolytic resin, for example, a polymer in which phosphoric acid groups, sulfonic acid groups, etc. are introduced, for example, a perfluorosulfonic acid polymer or a polymer in which benzene sulfonic acid is introduced etc. may be mentioned. According to the present embodiment, even if driving the fuel cell 1 under low humidity, low load conditions, it is possible to maintain a moist state of the electrolytic material. Of course, the electrolytic material according to the present embodiment may also be another type of electrolytic material. As such an electrolytic material, for example, an inorganic type, inorganic-organic hybrid type, or other electrolytic material etc. may be mentioned. Note that, the fuel cell 1 may also be a fuel cell which operates from ordinary temperature to 150° C. in range.

EXAMPLES

1. Example 1

Example 1 will be explained. Example 1 corresponds to the above-mentioned first embodiment. Note that, in Example 1, the oxygen content $O_{ICP}$ by trace oxygen analysis (mass %), the residual amount of oxygen $O_{1200°\ C.}$ remaining after heat treatment in an inert gas (or vacuum) atmosphere at 1200° C., the BET specific surface area (m²/g), the residual amount of hydrogen $H_{1200°\ C.}$ remaining in an inert gas (or vacuum) atmosphere at 1200° C. (mass %), and the G-band half-width of the Raman spectrum (cm⁻¹) were measured by the following methods.

Measurement of Oxygen Content

The oxygen content $O_{ICP}$ (mass %) was measured using an analysis apparatus comprised of a Model RH402 made by LECO and applying the usual inert gas fusion-thermal conductivity method used for measurement of C, H, O, and N.

Measurement of Residual Amount of Oxygen $O_{1200°\ C.}$ Remaining After Heat Treatment in Inert gas (or Vacuum) Atmosphere at 1200° C.

A sample was set in a graphitization furnace through which argon gas was circulated, was raised the furnace temperature by 15° C./min, and was held at 1200° C. for 1 hour. After that, while running argon through the inside of the furnace, the inside of the furnace was cooled to room temperature, then the sample was taken out. The amount of oxygen in this sample was measured in the same way as the above-mentioned measurement of the oxygen content. Further, the measured amount of oxygen was made the residual amount of oxygen $O_{1200°\ C.}$ remaining after heat treatment in an inert atmosphere at 1200° C.

Measurement of Residual Amount of Hydrogen $H_{1200°\ C.}$ Remaining After Heat Treatment in Inert Gas Atmosphere at 1200° C.

A sample was set in a graphitization furnace through which argon gas was circulated, was raised the sample temperature at 15° C./min, and was held at 1200° C. for 1 hour. After that, while running argon through the inside of the furnace, the sample was cooled down to room temperature, then the sample was taken out. The amount of hydrogen in this sample was measured in the same way as the above-mentioned measurement of the oxygen content. Further, the measured amount of hydrogen was made the residual amount of hydrogen $H_{1200°\ C.}$ remaining after heat treatment in an inert atmosphere at 1200° C.

Measurement of BET Specific Surface Area

The BET specific surface area (m²/g) was measured as follows. That is, about 50 mg of a sample was weighed out and dried at 90° C. for 2 hours in a vacuum. Further, the obtained dried sample was set in an automatic specific surface area measurement apparatus (BELSORPmini, made by Bel Japan) and an adsorption isotherm was prepared by the gas adsorption method using nitrogen gas. Next, by analyzing this adsorption isotherm by the attached BET analysis software, the BET specific surface area was measured.

Measurement of G-Band Half-width of Raman Spectrum

The G-band half-width of the Raman spectrum (cm⁻¹) was measured as follows. That is, about 3 mg of a sample was weighed out and set in a laser Raman spectrometer (made by JASCO, NRS-7100). Next, under measurement conditions of an excitation laser of 532 nm, a laser power of 100 mW (sample irradiation power: 0.1 mW), collection mode: backscattering, slit: 100 μm×100 μm, object lens: ×100, spot size: 1 μm, exposure time: 30 sec, observed wave number: 3200 to 750 cm⁻¹, cumulative times: 2, the Raman spectrum was measured. The G-band half-width was calculated based on the measurement results.

1. Preparation of Carbon Material for Catalyst Carrier Use

Below, the specific method of preparation so that the (A) oxygen content $O_{ICP}$ and (B) residual amount of oxygen $O_{1200°\ C.}$ give the desired (C) BET specific surface area and (D) ΔG prescribed in the present invention will be shown. The guidelines of control of the $O_{ICP}$ and $O_{1200°\ C.}$ is that by using strong oxidation treatment to introduce and add oxygen such as quinone-type oxygen which is stable against heat treatment in an inert atmosphere at 1200° C. into a carbon material, then removing the unstable oxygen other than the quinone-type oxygen by heat treatment in an inert atmosphere at 600 to 1600° C., it is possible to independently control the $O_{ICP}$ and $O_{1200°\ C.}$. Further, the (C) BET surface area and (D) ΔG are achieved by selecting as the porous carbon material used for the starting material, one which satisfies a BET surface area of 1500 m²/g or more and a ΔG of 30 cm⁻¹ or more and adjusting the temperature of the heat treatment in an inert atmosphere performed for obtaining the high crystallinity for raising the resistance to oxidative consumption.

Method A: Oxidation Treatment by Oxygen

Ketjen Black EC600JD made by Lion Corporation was set in a graphitization furnace and treated, while circulating argon gas, at 1800° C. for 1 hour (KB18). The carbon material obtained as a result was set in an electrical furnace and heat treated while circulating pure oxygen gas at 250° C. for 1 hour (KB18-Ox). Furthermore, this material was set in an electrical furnace and heat treated in an argon gas circulating atmosphere at 700° C. (KB18-Ox-700), 1000° C. (KB18-Ox-1000), 1300° C. (KB18-Ox-1300), and 1600° C. (KB18-O-1600) for 1 hour. The oxygen content $O_{ICP}$ (mass %), residual amount of oxygen $O_{1200°\ C.}$ (mass %), BET specific surface area (m²/g), G-band half-width of the Raman spectrum (cm⁻¹), and residual amount of hydrogen $H_{1200°\ C.}$ (mass %) of this series of carbon materials for a catalyst carrier obtained by this process were measured. The results are shown in Table 1.

Method B: Oxidation Treatment by Hydrogen Peroxide

Using a starting material the same as the above-mentioned Method A, the following method was used for oxidation treatment. 3 g of the starting material of the carbon material was placed in a 1 liter Erlenmeyer flask, 200 ml of the commercially available reagent hydrogen peroxide solution (made by Kanto Chemical, 30.0 to 35.5%) was poured in, and the mixture was stirred at room temperature for 10 hours. The stirred dispersion was filtered by a membrane filter, then the carbon material was dried by a hot air dryer at 60° C. (KB18-HP).

Furthermore, this carbon material was set in a graphitization furnace and was heat treated in an argon gas circulating atmosphere at 900° C. (KB18-HP-900), 1200° C. (KB18-HP-1200), 1400° C. (KB18-HP-1400) for 1 hour. The oxygen content $O_{ICP}$ (mass %), residual amount of oxygen $O_{1200°\ C.}$ (mass %), BET specific surface area (m²/g), G-band half-width of the Raman spectrum (cm⁻¹), and residual amount of hydrogen $H_{1200°\ C.}$ (mass %) of this series of carbon materials for a catalyst carrier obtained by this process were measured. The results are shown in Table 1.

Method C: Oxidation Treatment by Nitric Acid

Using a starting material the same as the above-mentioned Method A, the following method was used for oxidation treatment. 3 g of the starting material of the carbon material was placed in a 1 liter Erlenmeyer flask, 200 ml of the commercially available reagent nitric acid (made by Kanto Chemical, 69% concentration) was poured in, and the mixture was stirred at 90° C. for 2 hours. The stirred dispersion was filtered by a membrane filter, then the carbon material was dried by a hot air dryer at 60° C. (KB18-NA). Furthermore, this material was set in a graphitization furnace and was heat treated in an argon gas circulating atmosphere at 1000° C. (KB18-NA-1000), 1400° C. (KB18-NA-1400), 1300° C. (KB18-NA-1300), and 1600° C. (KB18-NA-1600) for 1 hour. The oxygen content O=(mass %), residual amount of oxygen $O_{1200°\ C.}$ (mass %), BET specific surface area (m²/g), G-band half-width of the Raman spectrum (cm⁻¹), and residual amount of hydrogen $H_{1200°\ C.}$ (mass %) of this series of carbon materials for a catalyst carrier obtained by this process were measured. The results are shown in Table 1.

Method D: Oxidation Treatment by Ozone

The same starting materials as in the above Method A were used by the following method for oxidation treatment. 3 g of the starting carbon material was placed in a 1-liter Erlenmeyer flask and oxygen containing ozone was introduced for treatment for 5 hours (KB18-OZ). Further, for the ozone generation unit, KQS-050 made by Kotohira Industry was used. Further, oxygen gas was introduced into the apparatus and ozone was generated. Furthermore, the ozone treated carbon material was set in a graphitization furnace and was heat treated in an argon gas circulating atmosphere at 600° C. (KB18-OZ-600), 900° C. (KB18-OZ-900), 1200° C. (KB18-OZ-1200), 1400° C. (KB18-OZ-1400) for 1 hour. The oxygen content $O_{ICP}$ (mass %), residual amount of oxygen $O_{1200°\ C.}$ (mass %), BET specific surface area (m²/g), G-band half-width of the Raman spectrum (cm⁻⁴), and residual amount of hydrogen $H_{1200°\ C.}$ (mass %) of this series of carbon materials for a catalyst carrier obtained by this process were measured. The results are shown in Table 1.

Method E: Oxidation Treatment by Solution Plasma Apparatus

The same starting materials as in the above Method A were used by the following method for oxidation treatment. A microwave liquid plasma apparatus AMPL-1500 made by Arios was used for plasma treatment in water (KB-1800-PO). Specifically, 3 g of the starting carbon material was dispersed in pure water. In that state, the pure water was stirred for about 15 minutes while generating plasma. Furthermore, the plasma treated carbon material was set in a graphitization furnace and was heat treated in an argon gas circulating atmosphere at 600° C. (KB18-PO-600), 900° C. (KB18-PO-900), 1200° C. (KB18-PO-1200), or 1400° C. (KB18-PO-1400) for 1 hour. The oxygen content $O_{ICP}$ (mass %), residual amount of oxygen $O_{1200°\ C.}$ (mass %), BET specific surface area (m²/g), G-band half-width of the Raman spectrum (cm⁻¹), and residual amount of hydrogen $H_{1200°\ C.}$ (mass %) of this series of carbon materials for a catalyst carrier obtained by this process were measured. The results are shown in Table 1.

Method F: Carbon Material for Catalyst Carrier Use Obtained by Oxidation Treatment of MCND A porous carbon material "product name: ESCARBON®-MCND made by Nippon Steel & Sumikin Chemical" was set in a graphitization furnace and heat treated in a stream of argon gas at 1800° C. for 1 hour (graphitization treatment). Next, the carbon material (MC18) obtained due to this was treated by oxidation treatment and a heat treatment step similar to the above-mentioned Method B (oxidation treatment by hydrogen peroxide). The temperature at the time of heat treatment was made 900° C. What was obtained due to this was denoted the carbon material for catalyst carrier use MC18-HP-900.

Next, the MC18 was treated by oxidation treatment and a heat treatment step similar to the above-mentioned Method C (oxidation treatment by nitric acid) (temperature at time of heat treatment of 1300° C.). What was obtained due to this was denoted the carbon material for catalyst carrier use MC18-NA-1300.

Furthermore, the MC18 was treated by oxidation treatment and a heat treatment step similar to the above-mentioned Method E (oxidation treatment by solution plasma apparatus) (temperature at time of heat treatment of 600° C.). What was obtained due to this was denoted the carbon material for catalyst carrier use MC18-PO-600. Further, for comparison, MC18 not treated in any way was evaluated as a carbon material for catalyst carrier use.

The oxygen content $O_{ICP}$ (mass %), residual amount of oxygen $O_{1200°\ C.}$ (mass %), BET specific surface area (m²/g), G-band half-width of the Raman spectrum (cm⁻¹), and residual amount of hydrogen $H_{1200°\ C.}$ (mass %) of this series of carbon materials for a catalyst carrier obtained by these processes were measured. The results are shown in Table 1.

Method G: Carbon Material for Catalyst Carrier Use Obtained by Oxidizing Carbon Material Activated to Increase Surface Area 2.0 g of KB18 obtained by the Method A was placed in a boat type sample holder made of quartz. This boat type sample holder was set in a quartz glass tube. Furthermore, this quartz glass tube was set inside a commercially available horizontal electrical furnace. Next, $CO_2$ gas was run through it at 150 ml/min and the material was treated at 1120° C. for 2 hours to obtain a carbon material KB18-AC (activation treatment). Using this carbon material KB18-AC as a starting material, the material was treated by a process similar to the above-mentioned Method F. Due to the above steps, KB18-AC-HP900, KB18-AC-NA1300, and KB18-AC-P0600 were prepared.

Similarly, by treating the MC18 of the Method F in the same way as above, MC18-AC-HP900, MC18-AC-NA1300, and MC18-AC-PO600 were prepared.

Furthermore, the samples obtained by making the treatment temperatures in the graphitization treatment of MCND of the Method F 1600° C., 2000° C., and 2100° C. were denoted MC16, MC20, and MC21. Further, these were treated to activate them as explained above, were further treated by plasma by the Method E, and were further heat treated at 600° C. Due to the above steps, MC16-AC-PO600, MC20-AC-PO600, and MC21-AC-PO600 were prepared.

The oxygen content $O_{ICP}$ (mass %), residual amount of oxygen $O_{1200°\ C.}$ (mass %), BET specific surface area (m²/g), G-band half-width of the Raman spectrum (cm⁻¹), and residual amount of hydrogen $H_{1200°\ C.}$ (mass %) of this series of carbon materials for a catalyst carrier obtained by these processes were measured. The results are shown in Table 1.

TABLE 1

| Carbon material for catalyst carrier use | Type | $O_{ICP}$ mass % | $O_{1200°C.}$ mass % | BET $m^2/g$ | $\Delta G$ $cm^{-1}$ | $H_{1200°C.}$ mass % | Remarks |
|---|---|---|---|---|---|---|---|
| KB18-OX | a | 4.5 | 0.30 | 710 | 37 | 0.062 | Comp. ex. |
| KB18-OX-700 | b | 1.4 | 0.20 | 720 | 36 | 0.023 | Ex. |
| KB18-OX-1000 | c | 0.6 | 0.20 | 720 | 34 | 0.015 | Ex. |
| KB18-OX-1300 | d | <0.1 | <0.1 | 715 | 33 | 0.005 | Comp. ex. |
| KB18-OX-1600 | e | <0.1 | <0.1 | 710 | 33 | 0.004 | Comp. ex. |
| KB18-HP | f | 4.8 | 0.4 | 685 | 38 | 0.066 | Comp. ex. |
| KB18-HP-900 | g | 1.4 | 0.4 | 690 | 36 | 0.022 | Ex. |
| KB18-HP-1200 | h | 1.2 | 0.35 | 685 | 35 | 0.019 | Ex. |
| KB18-HP-1400 | i | 1.1 | 0.25 | 680 | 35 | 0.012 | Ex. |
| KB18-NA | j | 4.9 | 0.45 | 625 | 41 | 0.078 | Comp. ex. |
| KB18-NA-1000 | k | 1.2 | 0.40 | 665 | 38 | 0.024 | Ex. |
| KB18-NA-1300 | l | 0.5 | 0.45 | 675 | 36 | 0.019 | Ex. |
| KB18-NA-1600 | m | 0.3 | 0.3 | 635 | 36 | 0.006 | Ex. |
| KB18-OZ | n | 3.6 | 0.25 | 695 | 36 | 0.022 | Comp. ex. |
| KB18-OZ-600 | o | 1.7 | 0.2 | 680 | 35 | 0.019 | Ex. |
| KB18-OZ-900 | p | 0.8 | 0.15 | 685 | 35 | 0.018 | Ex. |
| KB18-OZ-1200 | q | <0.1 | <0.1 | 670 | 34 | 0.012 | Comp. ex. |
| KB18-OZ-1400 | r | <0.1 | <0.1 | 675 | 33 | 0.009 | Comp. ex. |
| KB18-PO | s | 1.4 | 0.35 | 690 | 36 | 0.019 | Ex. |
| KB18-PO-600 | t | 1.0 | 0.30 | 685 | 35 | 0.017 | Ex. |
| KB18-PO-900 | u | 0.7 | 0.25 | 680 | 35 | 0.016 | Ex. |
| KB18-PO-1200 | v | <0.1 | <0.1 | 675 | 36 | 0.015 | Comp. ex. |
| KB18-PO-1400 | w | <0.1 | <0.1 | 670 | 34 | 0.014 | Comp. ex. |
| MC18 | x | <0.1 | <0.1 | 1160 | 43 | <0.001 | Comp. ex. |
| MC18-HP-900 | y | 1.4 | 0.90 | 1150 | 45 | 0.009 | Ex. |
| MC18-NA-1300 | z | 1.2 | 0.80 | 1095 | 46 | 0.012 | Ex. |
| MC18-PO-600 | zz | 0.9 | 0.35 | 1135 | 44 | 0.008 | Ex. |
| KB18-AC-HP900 | A1 | 1.5 | 0.45 | 825 | 32 | 0.009 | Ex. |
| KB18-AC-NA1300 | A2 | 0.7 | 0.50 | 835 | 30 | 0.012 | Ex. |
| KB18-AC-PO600 | A3 | 1.1 | 0.35 | 845 | 31 | 0.008 | Ex. |
| MC18-AC-HP900 | A4 | 1.5 | 0.95 | 1355 | 49 | 0.009 | Ex. |
| MC18-AC-NA1300 | A5 | 0.8 | 0.85 | 1365 | 50 | 0.012 | Ex. |
| MC18-AC-PO600 | A6 | 1.2 | 0.40 | 1370 | 47 | 0.008 | Ex. |
| MC16-AC-PO600 | A7 | 1.3 | 0.45 | 1480 | 68 | 0.015 | Ex. |
| MC20-AC-PO600 | A8 | 1.0 | 0.35 | 985 | 36 | 0.009 | Ex. |
| MC21-AC-PO600 | A9 | 0.8 | 0.25 | 655 | 31 | 0.007 | Ex. |

2. Preparation of Fuel Cell and Evaluation of Cell Performance

Each of the above prepared carbon materials was used to prepare a catalyst for solid-polymer fuel cell use on which a catalyst metal was carried in the following way. Furthermore, the obtained catalyst was used to prepare a catalyst layer ink solution. Next, this catalyst layer ink solution was used to form a catalyst layer.

Furthermore, the formed catalyst layer was used to prepare a membrane electrode assembly (MEA). This prepared MEA was assembled into a fuel cell and tested for power generation using a fuel cell measuring apparatus. Below, details of the preparation of the different members and experiments will be explained in detail.

(1) Preparation of Catalyst for Solid-Polymer Fuel Cell Use

The carbon material for catalyst carrier use of each of the examples and comparative examples was dispersed in distilled water. To this dispersion, formaldehyde was added, then the dispersion was set in a water bath set to 40° C. Next, when the temperature of the dispersion became the same 40° C. as the bath, a dinitrodiamine Pt complex nitric acid aqueous solution was slowly poured into this dispersion while stirring. After that, the stirring was continued for about 2 hours, then the dispersion was filtered and the obtained solids were washed. The thus obtained solids were dried at 90° C. in a vacuum, then were crushed by a mortar. Next, the crushed solids were heat treated in a hydrogen atmosphere at 180° C. for 1 hour to thereby prepare a catalyst for solid-polymer fuel cell use (Pt catalyst) of each of the examples and comparative examples.

Note that, the carried amount of platinum of the Pt catalyst of each of the examples and comparative examples was adjusted to 40 mass % with respect to the total mass of the carbon material for catalyst carrier use and platinum particles. Note that, the carried amount was measured by inductively coupled plasma-atomic emission spectrometry (ICP-AES).

(2) Preparation of Catalyst Layer

The Pt catalysts of the thus prepared examples and comparative examples and an electrolytic resin comprised of Nafion® made by Dupont (persulfonic acid-based ion exchange resin) were prepared. Next, in an Ar atmosphere, each Pt catalyst and Nafion were mixed in ratios of the mass of the Nafion solid component to the mass of the platinum catalyst particle carrying carbon material of 1.25. These were lightly stirred, then the Pt catalyst was crushed by ultrasonic waves. Furthermore, ethanol was added to the solids to give a total solid component concentration of the Pt catalyst and the electrolytic resin combined of 1.1 mass %. Due to the above steps, a catalyst layer ink solution comprised of a Pt catalyst and electrolytic resin mixed together was prepared.

To each thus prepared catalyst layer ink solution, furthermore ethanol was added to prepare a spray coating-use catalyst layer ink solution with a platinum concentration of 0.5 mass %. Next, the spray conditions were adjusted so that the mass of the platinum per catalyst layer unit area (below, referred to as "platinum basis weight") became 0.2 mg/cm², the spray coating-use catalyst layer ink was sprayed onto a Teflon® sheet, then the sheet was dried in argon at 120° C. for 60 minutes to prepare a catalyst layer of a Pt catalyst of each of the examples and comparative examples.

(3) Preparation of MEA

The thus prepared catalyst layers of a Pt catalyst were used to prepare an MEA (membrane electrode assembly) by the following method.

A square piece of electrolytic film of 6 cm per side was cut out from a Nafion film (made by Dupont, NR211). Further, the catalyst layers of the anode and cathode coated on Teflon® sheets were respectively cut out by a cutter knife to square pieces of 2.5 cm per side.

Between the thus cut out catalyst layers of the anode and cathode, this electrolytic film was sandwiched so that the catalyst layers sandwiched and contacted the center part of the electrolytic film and were not offset from each other, the assembly was pressed at 120° C. by 100 kg/cm² for 10 minutes, then cooled down to room temperature, then only the Teflon® sheets were carefully peeled off at both the anode and cathode to prepare a catalyst layer-electrolytic film assembly with the catalyst layers of the anode and cathode fixed to the electrolytic film.

As the gas diffusion layers, a pair of square shaped pieces of carbon paper (made by SGL Carbon, 35BC) were cut out from the carbon paper in sizes of 2.5 cm per side. Between these pieces of carbon paper, the catalyst layer-electrolytic film assembly was sandwiched so that the anode and cathode catalyst layers were aligned with no offset. This was pressed at 120° C. by 50 kg/cm² for 10 minutes to prepare an MEA.

Note that, the basis weights of the different components of the catalyst metal component, carbon material, and electrolytic material in each MEA prepared were calculated by finding the mass of the catalyst layers fixed to the Nafion film (electrolytic film) from the difference of the mass of the Teflon® sheets with the catalyst layers before pressing and the mass of the Teflon® sheets peeled off after pressing and using the mass ratios of the compositions of the catalyst layers.

(4) Test for Evaluation of Initial Performance Under Low Humidity Conditions of Fuel Cell Each of the prepared MEAs of the examples and comparative examples was assembled into a cell and set in a fuel cell measurement apparatus to evaluate the performance of the fuel cell by the following routine:

Regarding the gas, the cathode was supplied with air and, further, the anode was supplied with pure hydrogen, under atmospheric pressure, so as to respectively give rates of utilization of 40% and 70%. The cell temperature was set to 80° C. The supplied gas, both at the cathode side and anode side, was passed through a humidifier so that it was supplied to the cell along with saturated steam corresponding to the water temperature inside the humidifier. The state of humidity at this time was controlled by the temperature of the humidifier. The output at the time of a cell temperature 80° C. and saturated humidity state was defined as the "output at time of high humidity", while the output at the time of the state of humidity corresponding to a relative humidity 30% was defined as the "output at time of low humidity". These output at time of high humidity and output at time of low humidity were used to evaluate the output characteristics.

Under conditions supplying gas to the cell under the above such settings, the load was gradually increased. The voltage across cell terminals at 1000 mA/cm² was recorded as the output voltage and the fuel cell was evaluated for performance based on this.

In the results of evaluation of performance of the obtained fuel cell, use was made of passing ranks of "E" (Excellent) and "VG" (Very Good) and a failing rank of "B" (Bad) as criteria for evaluation. Regarding the passing ranks, passing samples were ranked as "VG" (Very Good) and higher performance samples were ranked as "E" (Excellent). Details will be described below.

The passing rank "E" was defined as satisfying an output voltage at 1000 mA/cm² of 0.65V or more and a current density at a cell voltage of 0.3V of 1600 mA/cm² or more.

Further, the passing rank "VG" was defined as satisfying an output voltage at 1000 mA/cm² of 0.60V or more and a current density at a cell voltage of 0.3V of 1400 mA/cm² or more. Furthermore, the failing rank of "B" was defined as not satisfying the passing rank "VG". The results are shown in Table 2.

(5) Test for Durability of Fuel Cell As the durability test, the voltage across the cell terminals was held at 1.0V for 1.5 seconds, then the voltage across the cell terminals was raised to 1.35V and held there for 1.5 seconds, then the voltage across cell terminals was returned to 1.0V. The cycle was repeated 3000 times, then the cell performance was measured in the same way as the case of the test for evaluation of initial performance under low humidity conditions before the durability test.

The ratio of the cell voltage after the durability test to the cell voltage before the durability test was defined as the output maintenance rate and shown by a percentage (%). This was used as an indicator of numerical evaluation of the durability. A passing rank was 80% or more, while particularly a good characteristic was deemed 90% or more. Further, for failing, this was defined as not satisfying the passing rank. The results are shown in Table 2.

TABLE 2

| Type | Catalyst Type of carbon material for catalyst carrier use | Evaluation of performance of fuel cell | | | Evaluation of durability |
|---|---|---|---|---|---|
| | | High humidity output (V) | Low humidity output (V) | Evaluation | Output maintenance rate (%) |
| Ex. 1-1 | b | 0.60 | 0.66 | G | 92 |
| Ex. 1-2 | c | 0.65 | 0.62 | G | 91 |
| Ex. 1-3 | g | 0.62 | 0.60 | G | 90 |
| Ex. 1-4 | h | 0.66 | 0.63 | G | 92 |
| Ex. 1-5 | i | 0.65 | 0.63 | G | 90 |
| Ex. 1-6 | k | 0.62 | 0.65 | G | 91 |
| Ex. 1-7 | l | 0.66 | 0.64 | G | 93 |
| Ex. 1-8 | m | 0.62 | 0.61 | G | 90 |
| Ex. 1-9 | o | 0.66 | 0.67 | VG | 90 |
| Ex. 1-10 | p | 0.65 | 0.66 | VG | 89 |
| Ex. 1-11 | s | 0.65 | 0.64 | G | 91 |
| Ex. 1-12 | t | 0.61 | 0.62 | G | 90 |
| Ex. 1-13 | u | 0.65 | 0.67 | VG | 91 |
| Ex. 1-14 | y | 0.65 | 0.63 | G | 95 |
| Ex. 1-15 | z | 0.60 | 0.62 | G | 95 |
| Ex. 1-16 | zz | 0.65 | 0.67 | VG | 94 |
| Ex. 1-17 | A1 | 0.65 | 0.66 | VG | 89 |
| Ex. 1-18 | A2 | 0.66 | 0.67 | VG | 90 |
| Ex. 1-19 | A3 | 0.67 | 0.68 | VG | 90 |
| Ex. 1-20 | A4 | 0.69 | 0.69 | E | 94 |
| Ex. 1-21 | A5 | 0.70 | 0.72 | E | 93 |
| Ex. 1-22 | A6 | 0.70 | 0.70 | E | 92 |
| Ex. 1-23 | A7 | 0.70 | 0.71 | E | 89 |
| Ex. 1-24 | A8 | 0.66 | 0.67 | VG | 95 |
| Ex. 1-25 | A9 | 0.64 | 0.66 | G | 97 |
| Comp. Ex. 1-1 | a | 0.51 | 0.48 | B | 59 |
| Comp. Ex. 1-2 | d | 0.50 | 0.46 | B | 63 |
| Comp. Ex. 1-3 | e | 0.49 | 0.45 | B | 60 |
| Comp. Ex. 1-4 | f | 0.48 | 0.42 | B | 53 |
| Comp. Ex. 1-5 | j | 0.49 | 0.41 | B | 62 |

TABLE 2-continued

| Type | Catalyst Type of carbon material for catalyst carrier use | Evaluation of performance of fuel cell | | | Evaluation of durability |
|---|---|---|---|---|---|
| | | High humidity output (V) | Low humidity output (V) | Evaluation | Output maintenance rate (%) |
| Comp. Ex. 1-6 | n | 0.45 | 0.40 | B | 68 |
| Comp. Ex. 1-7 | q | 0.48 | 0.42 | B | 62 |
| Comp. Ex. 1-8 | r | 0.47 | 0.42 | B | 64 |
| Comp. Ex. 1-9 | v | 0.50 | 0.41 | B | 67 |
| Comp. Ex. 1-10 | w | 0.50 | 0.43 | B | 59 |
| Comp. Ex. 1-11 | x | 0.41 | 0.39 | B | 55 |

From the results of Table 2, it was learned that the examples of the present invention all displayed excellent solid-polymer fuel cell characteristics. That is, these examples were particularly excellent in durability and power generation performance under operating conditions at the time of low humidity.

2. Example 2

Example 2 will be explained. Example 2 corresponds to the above-mentioned second embodiment. Note that, in Example 2, the oxygen content $O_{ICP}$ (mass %) by trace oxygen analysis, residual amount of oxygen $O_{1200°\ C.}$ (mass %) remaining after heat treatment in an inert gas (or vacuum) atmosphere at 1200° C., CO gas quantity $Q_{CO}$ (μmol/g) generated in TPD measurement in a 300 to 700° C. temperature region, $CO_2$ gas quantity $Q_{CO2}$ (μmol/g) generated in TPD measurement in a 600 to 900° C. temperature region, BET specific surface area $S_{BET}$ (m$^2$/g), G-band half-width $\Delta G$ (cm$^{-1}$) of the Raman spectrum, and micropore surface area $S_{micro}$ (m$^2$/g) were respectively measured by the following methods:

Measurement of Oxygen Content $O_{ICP}$

The oxygen content $O_{ICP}$ (mass %) was measured using an analysis apparatus comprised of a Model RH402 made by LECO. The usual inert gas fusion-thermal conductivity method used for measurement of C, H, O, and N was used for the measurement.

Measurement of Residual Amount of Oxygen $O_{1200°\ C.}$ Remaining After Heat Treatment in Inert Gas (or Vacuum) Atmosphere at 1200° C.

A sample was set in a graphitization furnace through which argon gas was circulated, was raised the furnace temperature by 15° C./min, and was held at 1200° C. for 1 hour. After that, while running argon through the inside of the furnace, the inside of the furnace was cooled to room temperature, then the sample was taken out. The amount of oxygen in this sample was measured in the same way as the above-mentioned measurement of the oxygen content. Further, the measured amount of oxygen was made the residual amount of oxygen $O_{1200°\ C.}$ remaining after heat treatment in an inert atmosphere at 1200° C.

Measurement of $Q_{CO}$ and $Q_{CO2}$ in TPD Measurement

For the TPD measurement, a BELCAT-A made by Bel Japan (mass analyzer BEL-Mass) was used. He was used as the carrier gas, the temperature was raised by a temperature elevation rate of 10° C./min, the gases generated at that time were introduced into a mass analyzer, and the temperature dependencies of the amounts of generation of CO and $CO_2$ were measured. Based on the measurement results, the cumulative values of the amounts of gas generated in the 600 to 900° C. temperature region for CO and in the 300 to 700° C. temperature region for $CO_2$ were calculated and respectively defined as the CO gas quantity $Q_{CO}$ and $CO_2$ gas quantity $Q_{CO2}$.

Measurement of BET Specific Surface Area $S_{BET}$ and Micropore Surface Area $S_{micro}$ The BET specific surface area $S_{BET}$ (m$^2$/g) was measured as follows. That is, about 50 mg of a sample was weighed out and dried at 90° C. for 2 hours in a vacuum. Further, the obtained dried sample was set in an automatic specific surface area measurement apparatus (BELSORPmini, made by Bel Japan) and an adsorption isotherm was prepared by the gas adsorption method using nitrogen gas. Next, by analyzing this adsorption isotherm by the attached BET analysis software, the BET specific surface area was measured. Further, for analysis of the micropore surface area $S_{micro}$, the αs plot method was applied to the same measurement data as the BET to calculate the micropore surface area $S_{micro}$. For αs analysis, analysis software attached to the apparatus was used.

Measurement of G-Band Half-Width of Raman Spectrum

The G-band half-width of the Raman spectrum (cm$^{-1}$) was measured as follows. That is, about 3 mg of a sample was weighed out and set in a laser Raman spectrometer (made by JASCO, NRS-7100). Next, under measurement conditions of an excitation laser of 532 nm, a laser power of 100 mW (sample irradiation power: 0.1 mW), collection mode: backscattering, slit: 100 μm×100 μm, object lens: ×100, spot size: 1 μm, exposure time: 30 sec, observed wave number: 3200 to 750 cm$^{-1}$, cumulative times: 2, the Raman spectrum was measured. The G-band half-width was calculated based on the measurement results.

1. Preparation of Carbon Material for Catalyst Carrier Use

Below, the specific method of preparation so that the (A) oxygen content $O_{ICP}$ and (B) residual amount of oxygen $O_{1200°\ C.}$ give the desired (C) BET specific surface area, (D) $\Delta G$, (E) $Q_{CO}$, (F) $Q_{CO2}$, (G) $S_{micro}$, and (H) $Q_{CO}$>$Q_{CO2}$ prescribed in the present invention will be shown. In the same way as the guidelines of the method of preparation for obtaining the carbon material prescribed in the present invention in the above Example 1, these were controlled by strong oxidation treatment and by heat treatment in an inert atmosphere at 600 to 1600° C. to remove the unnecessary oxygen. In the starting material of the porous carbon material used at that time, it is important to select the (C) BET surface area, (D) $\Delta G$, and (G) $S_{micro}$ so as to comply with the present invention.

Preparation of Carbon Material

Ketjen Black EC600JD made by Lion Corporation (below, abbreviated as "EJ"), Escarbon MCND made by Nippon Steel & Sumikin Chemical (below, abbreviated as "MC"), and Tokablack #4500 made by Tokai Carbon (below, abbreviated as "CB") were prepared. All were nanosize carbon materials with highly developed 3D dendritic structures. The shapes were roughly similar. EJ and CB both had primary particle sizes of 40 nm or so and had 3D structures with primary particles fused in a 3D dendritic form. The shapes of the two were generally similar including size as well. MC had a size of the branches of 100 nm or so and a length of 100 nm or so or a size of 2 to 3 times the EJ or CB. EJ and MC were both porous carbon materials and respectively had 1270 m$^2$/g and 1510 m$^2$/g BET specific surface areas. Further, CB had a 41 m$^2$/g BET specific surface area.

Introduction of Micropores to Carbon Material: $CO_2$ Activation Treatment

To introduce micropores suitable for the present invention, the carbon materials EJ, MC, and CB were treated by $CO_2$ to activate them.

Each carbon material was placed in an alumina boat in an amount of several grams. This was set inside a tubular electrical furnace. The gas inside of the tubular electrical furnace was replaced with $CO_2$. After that, the carbon material was heated in a 100 to 200 mL/min stream of $CO_2$ gas at 850 to 1000° C. for 1 to 15 hours. When introducing micropores into the carbon material, it is possible to preferentially introduce micropores by treatment at a low temperature for a long period of time in a range causing activation.

The thus obtained carbon material after $CO_2$ activation treatment is, for example, when the carbon material after $CO_2$ activation treatment is a carbon material obtained by $CO_2$ activation treatment of EJ under treatment conditions of 880° C. for 3 hours, denoted such as "EJ880-3".

Control of Crystallinity of Carbon Material

To improve the crystallinity of a carbon material, a graphitization furnace (Tammann-type Graphitization Furnace made by Shinsei Denro) was used to heat treat the material under a flow of argon gas at 1600 to 2400° C. for 2 hours.

The thus prepared heat treated carbon material is, for example, when the heat treated carbon material is a carbon material obtained by heat treating EJ880-3 at a heat treatment temperature of 1600° C., denoted such as "EJ880-3-1600".

Surface Treatment A 1.0 g of the carbon material was placed in 200 ml of a 30% concentration hydrogen peroxide solution. This was fully stirred, then was warmed by a 70° C. water bath for 5 hours. The obtained carbon material after warming treatment was further heat treated in an inert atmosphere at 300° C., 500° C., 700° C., 900° C., or 1100° C. for 1 hour.

The thus obtained heat treated carbon material is, for example, when the heat treated carbon material is a carbon material obtained by heat treating EJ880-3-1800 at a heat treatment temperature of 300° C., denoted such as "EJ880-3-1800-A300".

Surface Treatment B 1.0 g of the carbon material was placed in 200 ml of a 69% concentration nitric acid. This was fully stirred, then was warmed in a 90° C. oil bath for 2 hours. The obtained carbon material after warming treatment was further heat treated in an inert atmosphere at 500° C., 700° C., 900° C., 1100° C., or 1300° C. for 1 hour.

The thus obtained heat treated carbon material is, for example, when the heat treated carbon material is a carbon material obtained by heat treating EJ880-3-1800 at a heat treatment temperature of 500° C., denoted such as "EJ880-3-1800-B500".

Surface Treatment C 1.0 g of the carbon material was placed in a reaction vessel. Ozone gas was run through the vessel to treat the material for 8 hours. After that, the material was heat treated in an inert atmosphere at 300° C., 500° C., 700° C., 900° C., or 1100° C. for 1 hour.

The thus obtained heat treated carbon material is, for example, when the heat treated carbon material is a carbon material obtained by heat treating EJ880-3-1800 by a heat treatment temperature of 300° C., denoted such as "EJ880-3-1800-C300".

The oxygen content $O_{ICP}$ (mass %), residual amount of oxygen $O_{1200° C.}$, CO gas quantity $Q_{CO}$ (μmol/g), $CO_2$ gas quantity $Q_{CO2}$ (μmol/g), BET specific surface area $S_{BET}$ (m²/g), G-band half-width $\Delta G$ (cm$^{-1}$), and micropore surface area $S_{micro}$ (m²/g) of the thus obtained series of carbon materials were measured. The results are shown in Table 3.

TABLE 3

| Carbon material for catalyst carrier use | Type | $O_{ICP}$ mass % | $O_{1200° C.}$ mass % | $Q_{CO}$ μmol/g | $Q_{CO2}$ μmol/g | $S_{BET}$ m²/g | $S_{MICRO}$ m²/g | $\Delta G$ cm$^{-1}$ | Remarks |
|---|---|---|---|---|---|---|---|---|---|
| EJ | E1 | 0.28 | <0.1 | 43 | 11 | 1240 | 625 | 73 | Comp. ex. |
| EJ880-3 | E2 | 0.19 | 0.17 | 33 | 9 | 1460 | 755 | 82 | Comp. ex. |
| EJ880-3-1600 | E3 | 0.16 | 0.16 | 11 | <5 | 1095 | 605 | 72 | Comp. ex. |
| EJ880-3-1800 | E4 | <0.1 | <0.1 | 7 | <5 | 835 | 465 | 52 | Comp. ex. |
| EJ880-3-2000 | E5 | <0.1 | <0.1 | <5 | <5 | 585 | 95 | 34 | Comp. ex. |
| EJ880-3-2200 | E6 | <0.1 | <0.1 | <5 | <5 | 295 | 35 | 28 | Comp. ex. |
| EJ880-3-1800-A300 | E7 | 2.75 | 0.35 | 185 | 78 | 825 | 385 | 55 | Ex. |
| EJ880-3-1800-A500 | E8 | 1.33 | 0.34 | 164 | 32 | 820 | 415 | 54 | Ex. |
| EJ880-3-1800-A700 | E9 | 0.87 | 0.33 | 122 | 12 | 815 | 455 | 55 | Ex. |
| EJ880-3-1800-A900 | E10 | 0.66 | 0.34 | 106 | 8 | 830 | 465 | 53 | Ex. |
| EJ880-3-1800-A1100 | E11 | 0.42 | 0.34 | 85 | <5 | 835 | 475 | 53 | Ex. |
| EJ880-3-1800-B500 | E12 | 2.06 | 0.49 | 305 | 136 | 825 | 405 | 57 | Ex. |
| EJ880-3-1800-B700 | E13 | 1.23 | 0.48 | 223 | 85 | 820 | 420 | 56 | Ex. |
| EJ880-3-1800-B900 | E14 | 0.75 | 0.48 | 182 | 34 | 815 | 440 | 58 | Ex. |
| EJ880-3-1800-B1100 | E15 | 0.51 | 0.24 | 122 | 17 | 830 | 465 | 52 | Ex. |
| EJ880-3-1800-B1300 | E16 | 0.24 | 0.24 | 41 | 7 | 825 | 425 | 49 | Ex. |
| EJ880-3-1800-C300 | E17 | 1.56 | <0.1 | 215 | 122 | 825 | 455 | 57 | Comp. ex. |
| EJ880-3-1800-C500 | E18 | 0.88 | <0.1 | 156 | 75 | 825 | 450 | 56 | Ex. |
| EJ880-3-1800-C700 | E19 | 0.65 | <0.1 | 101 | 36 | 815 | 465 | 55 | Ex. |
| EJ880-3-1800-C900 | E20 | 0.52 | <0.1 | 74 | 13 | 825 | 460 | 54 | Ex. |
| EJ880-3-1800-C1100 | E21 | 0.36 | <0.1 | 23 | 8 | 830 | 465 | 48 | Comp. ex. |
| EJ900-3-1900-C700 | E22 | 0.82 | <0.1 | 86 | 31 | 720 | 370 | 46 | Ex. |
| EJ860-5-1800-B900 | E23 | 0.66 | 0.46 | 195 | 36 | 805 | 550 | 61 | Ex. |
| EJ880-8-1900-A500 | E24 | 1.09 | 0.33 | 175 | 40 | 920 | 510 | 47 | Ex. |
| MC | M1 | 0.06 | <0.1 | 10 | <5 | 1150 | 346 | 81 | Comp. ex. |
| MC860-5-2000-A500 | M2 | 0.82 | 0.62 | 185 | 46 | 755 | 426 | 45 | Ex. |
| MC860-5-2000-B900 | M3 | 0.69 | 0.48 | 198 | 39 | 765 | 415 | 46 | Ex. |
| MC860-5-2000-C700 | M4 | 0.58 | 0.38 | 116 | 31 | 760 | 431 | 44 | Ex. |
| MC900-3-1900-A500 | M5 | 0.98 | 0.67 | 208 | 88 | 855 | 556 | 32 | Ex. |
| MC900-3-1900-B900 | M6 | 0.86 | 0.59 | 221 | 46 | 865 | 548 | 30 | Ex. |
| MC900-3-1900-C700 | M7 | 0.71 | 0.50 | 126 | 38 | 865 | 565 | 31 | Ex. |

TABLE 3-continued

| Carbon material for catalyst carrier use | Type | $O_{ICP}$ mass % | $O_{1200°\ C.}$ mass % | $Q_{CO}$ μmol/g | $Q_{CO2}$ μmol/g | $S_{BET}$ m²/g | $S_{MICRO}$ m²/g | ΔG cm⁻¹ | Remarks |
|---|---|---|---|---|---|---|---|---|---|
| CB950-3-1700 | C1 | <0.1 | <0.1 | <5 | <5 | 580 | 215 | 49 | Comp. ex. |
| CB950-3-1700-A500 | C2 | 0.62 | 0.35 | 65 | 22 | 565 | 208 | 50 | Ex. |
| CB950-3-1700-B900 | C3 | 0.57 | 0.30 | 77 | 23 | 570 | 212 | 47 | Ex. |
| CB950-3-1700-C700 | C4 | 0.49 | 0.25 | 89 | 23 | 575 | 206 | 68 | Ex. |
| CB970-8-1800-C700 | C5 | 0.59 | 0.32 | 111 | 34 | 855 | 236 | 36 | Ex. |
| CB1000-3-1900-C700 | C6 | 0.74 | 0.42 | 126 | 36 | 925 | 269 | 31 | Ex. |

2. Preparation of Fuel Cell and Evaluation of Cell Performance

Each of the above prepared carbon materials was used to prepare a catalyst for solid-polymer fuel cell use on which a catalyst metal was carried in the following way. Furthermore, the obtained catalyst was used to prepare a catalyst layer ink solution. Next, this catalyst layer ink solution was used to form a catalyst layer and furthermore the formed catalyst layer was used to prepare a membrane electrode assembly (MEA). This prepared MEA was assembled into a fuel cell and tested for power generation using a fuel cell measuring apparatus. Below, details of the preparation of the members and tests will be explained concretely.

(1) Preparation of Catalyst for Solid-Polymer Fuel Cell Use

Each carbon material for catalyst carrier use of the examples and comparative examples was made to disperse in distilled water. To this dispersion, formaldehyde was added. The dispersion was set in a water bath set to 40° C. Next, when the temperature of the dispersion became the same 40° C. as the bath, while stirring, a dinitrodiamine Pt complex nitric acid aqueous solution was slowly poured into this dispersion. After that, the dispersion continued to be stirred for about 2 hours, then the dispersion was filtered and the obtained solids were washed. The thus obtained solids were dried at 90° C. in vacuum, then were crushed by a mortar. Next, the crushed solids were heat treated in a hydrogen atmosphere at 150° C. for 1 hour to prepare a catalyst for solid-polymer fuel cell use (Pt catalyst) for each of the examples and comparative examples.

Note that, the carried amounts of platinum of the PT catalysts of the examples and comparative examples were adjusted to 40 mass % with respect to the total mass of the carbon material for catalyst carrier use and platinum particles. Note that, the carried amount was measured by inductively coupled plasma-atomic emission spectrometry (ICP-AES).

(2) Preparation of Catalyst Layer

The Pt catalyst of each of the examples and comparative examples prepared in the above way and an electrolytic resin comprised of Nafion® made by Dupont (persulfonic acid-based ion exchange resin) were prepared. Next, in an Ar atmosphere, each Pt catalyst and Nafion were mixed in ratios of the mass of the Nafion solid component to the mass of the platinum catalyst particle carrying carbon material of 1.25. These were lightly stirred, then the Pt catalyst was crushed by ultrasonic waves. Furthermore, ethanol was added to the solids to give a total solid component concentration of the Pt catalyst and the electrolytic resin combined of 1.1 mass %. Due to the above steps, a catalyst layer ink solution comprised of a Pt catalyst and electrolytic resin mixed together was prepared.

To each thus prepared catalyst layer ink solution, furthermore ethanol was added to prepare a spray coating-use catalyst layer ink solution with a platinum concentration of 0.5 mass %. Next, the spray conditions were adjusted to give a mass per catalyst layer unit area of the platinum (below, referred to as "platinum basis weight") of 0.2 mg/cm². The spray coating-use catalyst layer ink was sprayed on a Teflon® sheet, then was treated to dry in argon at 120° C. for 60 minutes to prepare a catalyst layer of a Pt catalyst of each of the examples and comparative examples.

(3) Preparation of MEA

The thus prepared catalyst layers of a Pt catalyst were used to prepare an MEA (membrane electrode assembly) by the following method.

A square piece of electrolytic film of 6 cm per side was cut out from a Nafion film (made by Dupont, NR211). Further, the catalyst layers of the anode and cathode coated on Teflon® sheets were respectively cut out by a cutter knife to square pieces of 2.5 cm per side.

Between the catalyst layers of the thus cut out anode and cathode, this electrolytic film was sandwiched so that the catalyst layers contacted the center parts of the electrolytic film straddling the same and were not offset from each other. This assembly was pressed at 120° C. by 100 kg/cm² for 10 minutes, then was cooled down to room temperature, then only the Teflon® sheets were carefully peeled off at both the anode and cathode to thereby prepare a catalyst layer-electrolytic film assembly with the catalyst layers of the anode and cathode fixed to the electrolytic film.

As the gas diffusion layers, a pair of square shaped pieces of carbon paper (made by SGL Carbon, 35BC) were cut out from the carbon paper in sizes of 2.5 cm per side. Between these pieces of carbon paper, the catalyst layer-electrolytic film assembly was sandwiched so that the anode and cathode catalyst layers were aligned with no offset. This was pressed at 120° C. by 50 kg/cm² for 10 minutes to prepare an MEA.

Note that, the basis weights of the different components of the catalyst metal component, carbon material, and electrolytic material in each MEA prepared were calculated by finding the mass of the catalyst layers fixed to the Nafion film (electrolytic film) from the difference of the mass of the Teflon® sheets with the catalyst layers before pressing and the mass of the Teflon® sheets peeled off after pressing and using the mass ratios of the compositions of the catalyst layers.

(4) Test for Evaluation of Performance of Fuel Cell

Each of the prepared MEAs of the examples and comparative examples was assembled into a cell and set in a fuel cell measurement apparatus to evaluate the performance of the fuel cell by the following routine:

Regarding the gas, the cathode was supplied with air and, further, the anode was supplied with pure hydrogen, by pressurization to 0.2 atm (output side pressure) so as to respectively give rates of utilization of 40% and 70%. The cell temperature was set to 80° C. The supplied gas, both at the cathode side and anode side, was passed through a humidifier so that it is supplied to the cell along with saturated steam corresponding to the water temperature inside the humidifier. The state of humidity at this time was controlled by the temperature of the humidifier. The output at the time of a cell temperature 80° C. and saturated humidity state was defined as the "output at time of high humidity", while the output at the time of the state of humidity corresponding to a relative humidity 30% was defined as the "output at time of low humidity". These output at time of high humidity and output at time of low humidity were used to evaluate the output characteristics.

Under conditions supplying gas to the cell under the above such settings, the load was gradually increased. The voltage across cell terminals at 1000 mA/cm² was recorded as the output voltage and the fuel cell was evaluated for performance based on this.

In the results of evaluation of performance of the obtained fuel cell, use was made of passing ranks of "E" (Excellent) and "VG" (Very Good) and a failing rank of "B" (Bad) as criteria for evaluation. Regarding the passing ranks, passing samples were ranked as "VG" (Very Good) and higher performance samples were ranked as "E" (Excellent). Details will be described below. The passing rank "E" was defined as an output voltage at 1000 mA/cm² of 0.65V or more. Further, the passing rank "VG" was defined as an output voltage at 1000 mA/cm² of 0.60V or more. Furthermore, the failing rank of "B" was defined as not satisfying the passing rank "VG". The results are shown in Table 4.

(5) Durability Test of Fuel Cell

As the durability test, the voltage across cell terminals was held at 1.0V for 1.5 seconds, then the voltage across cell terminals was raised to 1.35V and held there for 1.5 seconds, then the voltage across cell terminals was returned to the original 1.0V. The cycle was repeated 3000 times, then the cell performance of output at time of low humidity was measured in the same way as the case of the test for evaluation of performance before the durability test.

The ratio of the cell voltage after the durability test to the cell voltage before the durability test was defined as the output maintenance rate and shown by a percentage (%). This was used as an indicator of evaluation of the durability. The case where this output maintenance rate is 80% or more is defined as passing. The case where it is 90% or more is deemed as particularly good. Further, the case where this output maintenance rate does not satisfy 80% is defined as failing. The results are shown in Table 4.

TABLE 4

| Type | Evaluation of performance of fuel cell | | | Evaluation of durability | |
|---|---|---|---|---|---|
| | High humidity output (V) | Low humidity output (V) | Evaluation | Output maintenance rate (%) | Remarks |
| E1 | 0.55 | 0.49 | B | 41 | Comp. ex. |
| E2 | 0.57 | 0.43 | B | 38 | Comp. ex. |
| E3 | 0.52 | 0.39 | B | 72 | Comp. ex. |
| E4 | 0.48 | 0.35 | B | 85 | Comp. ex. |
| E5 | 0.35 | 0.32 | B | 94 | Comp. ex. |
| E6 | 0.35 | 0.31 | B | 91 | Comp. ex. |
| E7 | 0.66 | 0.64 | VG | 83 | Ex. |
| E8 | 0.67 | 0.67 | VG | 84 | Ex. |
| E9 | 0.68 | 0.66 | VG | 86 | Ex. |
| E10 | 0.65 | 0.64 | VG | 86 | Ex. |
| E11 | 0.63 | 0.61 | VG | 87 | Ex. |
| E12 | 0.63 | 0.61 | VG | 72 | Ex. |
| E13 | 0.66 | 0.69 | VG | 81 | Ex. |
| E14 | 0.71 | 0.72 | E | 87 | Ex. |
| E15 | 0.69 | 0.69 | VG | 87 | Ex. |
| E16 | 0.65 | 0.63 | VG | 85 | Ex. |
| E17 | 0.62 | 0.62 | B | 85 | Comp. ex. |

TABLE 4-continued

| Type | Evaluation of performance of fuel cell | | | Evaluation of durability | |
|---|---|---|---|---|---|
| | High humidity output (V) | Low humidity output (V) | Evaluation | Output maintenance rate (%) | Remarks |
| E18 | 0.67 | 0.66 | VG | 82 | Ex. |
| E19 | 0.73 | 0.71 | E | 86 | Ex. |
| E20 | 0.66 | 0.68 | VG | 81 | Ex. |
| E21 | 0.62 | 0.61 | B | 80 | Comp. ex. |
| E22 | 0.74 | 0.73 | E | 91 | Ex. |
| E23 | 0.71 | 0.75 | E | 88 | Ex. |
| E24 | 0.72 | 0.75 | E | 92 | Ex. |
| M1 | 0.66 | 0.59 | B | 59 | Comp. ex. |
| M2 | 0.76 | 0.77 | E | 94 | Ex. |
| M3 | 0.74 | 0.75 | E | 94 | Ex. |
| M4 | 0.75 | 0.77 | E | 95 | Ex. |
| M5 | 0.68 | 0.67 | VG | 91 | Ex. |
| M6 | 0.67 | 0.66 | VG | 90 | Ex. |
| M7 | 0.68 | 0.68 | VG | 91 | Ex. |
| C1 | 0.62 | 0.49 | B | 79 | Comp. ex. |
| C2 | 0.66 | 0.66 | VG | 82 | Ex. |
| C3 | 0.67 | 0.66 | VG | 81 | Ex. |
| C4 | 0.68 | 0.67 | VG | 82 | Ex. |
| C5 | 0.69 | 0.68 | VG | 88 | Ex. |
| C6 | 0.69 | 0.68 | VG | 91 | Ex. |

Ketjen Black EC600JD (EJ, symbol E1) had a low crystallinity ($\Delta G$) and, further, was not controlled in functional groups (CO gas quantity $Q_{CO}$, $CO_2$ gas quantity $Q_{CO2}$), so the output maintenance rate was remarkably poor.

Further, E2 obtained by $CO_2$ activation of E1 was improved in output at time of high humidity due to the effect of enlarged pores, but fell in output at the time of low humidity due to the effect of the drop in polarity due to $CO_2$ activation. Further, the crystallinity also fell due to $CO_2$ activation and the output maintenance rate fell as well.

E3, E4, E5, and E6 obtained by heat treating E2 in an inert atmosphere were all improved in crystallinity ($\Delta G$ decreased) along with the increase in the heat treatment temperature and were improved in output maintenance rate. However, due to the extreme drop in polarity due to heat treatment at 1600° C. or more, there was a remarkable drop in performance in both the output at time of high humidity and output at time of low humidity in the output characteristics. In particular, the sample treated at 2000° C. (E5) and the same treated at 2200° C. (E6) greatly fell in micropore area and greatly fell in output characteristics.

Samples obtained by treating E4 while changing the heat treatment temperature after the A-type hydrogen peroxide treatment are denoted as E7 to E11. E7, E10, and E11 satisfying the requirements (A) to (D) gave good enough results to an extent. However, E7, E10, and E11 did not satisfy one or more of the requirements (E) to (H), so fell somewhat in characteristics compared with the examples satisfying all of the requirements (A) to (H). The sample with a heat treatment temperature of 500° C. (E8) and the one with 700° C. (E9) were excellent in output characteristics in the performance evaluation test and, further, were excellent in the output maintenance rate in the durability test.

Samples obtained by treating E4 while changing the heat treatment temperature after the B-type nitric acid treatment are denoted as E12 to E16. E12 and E16 satisfying the requirements (A) to (D) gave good enough results to an extent. However, E12 and E16 did not satisfy one or more of the requirements (E) to (H), so fell somewhat in characteristics compared with the examples satisfying all of the requirements (A) to (H). E13, E14, and E15 with heat treatment temperatures of 700, 900, and 1100° C. were good in both output characteristics and durability. In particular, E14 with a heat treatment temperature of 900° C. was excellent in characteristics.

Further, samples obtained by treating E4 while changing the heat treatment temperature after the C-type ozone oxidation treatment are denoted as E17 to E21. E17 had a low heat treatment temperature resulting in a high $CO_2$ gas quantity $Q_{CO2}$, low output at time of high humidity, and low output maintenance rate. E21 had a heat treatment temperature of 1100° C. resulting in a low CO gas quantity $Q_{CO}$ and $CO_2$ gas quantity $Q_{CO2}$ and a low output at time of high humidity. E18, E19, and E20 with heat treatment temperatures of 500° C., 700° C., and 900° C. exhibited excellent output characteristics in both the performance evaluation test and durability test and output maintenance rates.

Furthermore, E22 obtained by raising the activation treatment temperature to raise the extent of activation and perform the optimum C-type treatment, E23 prepared by lowering the activation treatment temperature and making the treatment time longer, and E24 with a longer activation treatment time of E4 all were excellent in both output characteristics and output maintenance rates.

When using MCND made by Nippon Steel & Sumikin Chemical (MC, symbol M1) instead of Ketjen Black EC600JD (EJ, symbol E1), this M1 was treated at the relatively weak 860° C. by $CO_2$ to activate it, then was heat treated at 2000° C. The obtained carbon material was treated under the A-type, B-type, and C-type optimum treatment conditions giving excellent characteristics with the Ketjen system (EJ system) to respectively obtain M2, M3, and M4. Further, the activation treatment temperature was raised to 900° C., the heat treatment temperature was lowered to 1900° C., and the obtained material was treated under the A-type, B-type, and C-type optimum treatment conditions to respectively obtain M5, M6, and M7. M1 was low in oxygen content $O_{ICP}$ and, further, was low in CO gas quantity $Q_{CO}$ and $CO_2$ gas quantity $Q_{CO2}$ and undeveloped in crystallinity $\Delta G$. The output at time of low humidity was low and, further, the durability was also low, but M2 to M7 all exhibited excellent output characteristics and output maintenance rates. In particular, M2, M3, and M4 all exhibited particularly excellent characteristics of output characteristics and output maintenance rates.

Commercially available nonporous carbon black (CB) was treated by $CO_2$ to activate it (950° C., 3 hours), then was heat treated at 1700° C. The obtained C1 (CB950-3-1700) was treated under the A-type, B-type, and C-type optimum treatment conditions to respectively obtain C2, C3, and C4. Further, the treatment conditions when treating the material by $CO_2$ to activate it were strengthened (970° C., 8 hours) and the material was heat treated at 1800° C. to obtain C5 (CB970-8-1800-C700), while the treatment conditions when treating the material by $CO_2$ to activate it were further strengthened (1000° C., 3 hours) and the material was heat treated at 1900° C. to obtain C6 (CB1000-3-1900-C700). C1 was excellent in pore characteristics of the BET specific surface area $S_{BET}$, micropores area $S_{micro}$, and G-band half-width $\Delta G$, but was low in all of the oxygen content $O_{ICP}$, CO gas quantity $Q_{CO}$, and $CO_2$ gas quantity $Q_{CO2}$ and was low in output at time of low humidity, low in crystallinity ($\Delta G$), and low in output maintenance rate. As opposed to this, C2 to C6 all exhibited excellent output characteristics and output maintenance rates.

3. Example 3

Example 3 will be explained. Example 3 corresponds to the above-mentioned third embodiment. Note that, in Example 3, the oxygen content $O_{ICP}$ (mass %) by trace oxygen analysis, residual amount of oxygen $O_{1200° C.}$ (mass %) remaining after heat treatment in an inert gas (or vacuum) atmosphere at 1200° C., nitrogen content $N_{ice}$ (mass %) contained in the carbon material, residual amount of nitrogen $N_{900° C.}$ (mass %) remaining after heat treatment in an inert gas (or vacuum) atmosphere at 900° C., BET specific surface area $S_{BET}$ (m²/g), G-band half-width $\Delta G$ (cm$^{-1}$) detected at 1550 to 1650 cm$^{-1}$ in range of the Raman spectrum, and $N_{is}$ intensity ratio (N-Q/N-6) between the N-6 peak near the binding energy 398.5 eV and the N-Q peak near the binding energy 400.5 eV in the $N_{1s}$ spectrum measured by XPS were respectively measured by the following methods:

Measurement of Oxygen Content $O_{ICP}$ The oxygen content $O_{ICP}$ (mass %) was measured using an analysis apparatus comprised of a Model RH402 made by LECO. The usual inert gas fusion-thermal conductivity method used for measurement of C, H, O, and N was used for the measurement.

Measurement of Residual Amount of Oxygen $O_{ICP}$ Remaining After Heat Treatment in Inert Gas (or Vacuum) Atmosphere at 1200° C.

A sample was set in a graphitization furnace through which argon gas was circulated, was raised the furnace temperature by 15° C./min, and was held at 1200° C. for 1 hour. After that, while running argon through the inside of the furnace, the inside of the furnace was cooled to room temperature, then the sample was taken out. The amount of oxygen in this sample was measured in the same way as the above-mentioned measurement of the oxygen content. Further, the measured amount of oxygen was made the residual amount of oxygen $O_{1200° C.}$ remaining after heat treatment in an inert atmosphere at 1200° C.

Measurement of Nitrogen Content $N_{ICP}$

The nitrogen content $N_{ICP}$ (mass %) was measured using an analysis apparatus comprised of Model RH402 made by LECO and applying the usual inert gas fusion-thermal conductivity method used for measurement of C, H, O, and N.

Measurement of Residual Amount of Nitrogen $N_{900° C.}$ Remaining After Heat Treatment in Inert Gas (or Vacuum) Atmosphere at 900° C.

A sample was set in a graphitization furnace through which argon gas was circulated, was raised the furnace temperature by 10° C./min, and was held at 900° C. for 1 hour. After that, while running argon through the inside of the furnace, the inside of the furnace was cooled to room temperature, then the sample was taken out. The amount of nitrogen in this sample was measured in the same way as the above measurement of the nitrogen content. Further, the measured amount of nitrogen was made the residual amount of nitrogen $N_{900° C.}$ remaining after heat treatment in an inert gas (or vacuum) atmosphere at 900° C.

Measurement of BET Specific Surface Area $S_{BET}$

The BET specific surface area $S_{BET}$ (m²/g) was measured as follows. That is, about 50 mg of a sample was weighed out and dried at 90° C. for 2 hours in a vacuum. Further, the obtained dried sample was set in an automatic specific surface area measurement apparatus (BELSORPmini, made by Bel Japan) and an adsorption isotherm was prepared by the gas adsorption method using nitrogen gas. Next, this adsorption isotherm was analyzed by the attached BET analysis software to measure the BET specific surface area.

Measurement of G-Band Half-Width of Raman Spectrum

The G-band half-width of the Raman spectrum (cm$^{-1}$) was measured as follows. That is, about 3 mg of a sample was weighed out and a laser Raman spectrometer (made by JASCO, NRS-7100) was used under measurement conditions of an excitation laser of 532 nm, a laser power of 100 mW (sample irradiation power: 0.1 mW), collection mode: backscattering, slit: 100 μm×100 μm, object lens: ×100, spot size: 1 μm, exposure time: 30 sec, observed wave number: 3200 to 750 cm$^{-1}$, cumulative times: 2 to measure the Raman spectrum. The G-band half-width was calculated based on the measurement results.

Calculation of $N_{1s}$ Intensity Ratio (N-Q/N-6) of N-6 Peak Near Binding Energy 398.5 eV and N-Q Peak Near Binding Energy 400.5 eV From $N_{1s}$ Spectrum in XPS Measurement XPS measurement was performed using an X-ray photoelectron spectroscope (Quantum 2000 model scan type X-ray photoelectronic spectroscope μ-ESCA made by ULVAC-PHI). 5 to 10 mg of a sample was weighed out, buried in indium metal, and irradiated by X-rays in a 300 μm square range. For the X-ray source, Kα rays of Al (14866.6 eV) were used. Measurement was performed by an output of 15 kV 25 W. A range of a binding energy of 396 to 408 eV corresponding to the $N_{1S}$ path was measured.

1. Preparation of Carbon Material for Catalyst Carrier Use

Below, the specific method of preparation so that the (A) oxygen content $O_{ICP}$ and (B) residual amount of oxygen $O_{1200° C.}$ give the desired (C) BET specific surface area, (D) ΔG, (I) nitrogen content $N_{ICP}$, and (J) residual amount of nitrogen $N_{900° C.}$ remaining after heat treatment in the atmosphere at 900° C. prescribed in the present invention will be shown. In the same way as the guidelines of the method of preparation for obtaining the carbon material prescribed in the present invention in the above Example 1, these were controlled by strong oxidation treatment and by heat treatment in an inert atmosphere at 600 to 1600° C. to remove the unnecessary oxygen. In the starting material of the porous carbon material used at that time, it is important to select the (C) BET surface area and (D) ΔG so as to comply with the present invention. Furthermore, the carbon material adjusted in amount of oxygen is heat treated in ammonia gas to introduce nitrogen, but at this time, to obtain a sufficient amount of (I) $N_{ICP}$ and obtain the prescribed (J) $N_{900° C.}$, it is important to set the treatment temperature in the ammonia gas to 500° C. to 1100° C. or so. Due to this treatment, stable nitrogen which will remain even if treating the carbon material in an inert atmosphere at 900° C. can be introduced into the material. Furthermore, for the purpose of eliminating the unnecessary nitrogen not suitable for resistance to oxidative consumption, furthermore, it is possible to heat treat the material in an inert atmosphere at 700° C. to 1100° C. or so in order to achieve the (I) $N_{ICP}$ and (J) $N_{900° C.}$ prescribed by the present invention.

(1) Preparation of Porous Carbon Material

Ketjen Black EC600JD made by Lion Corporation (below, abbreviated as "EJ"), ESCARBON MCND made by Nippon Steel & Sumikin Chemical (below, abbreviated as "MC"), a carbon material obtained by activating Tokablack #4500 made by Tokai Carbon by heat treatment in a flow of $CO_2$ at 930° C. for 6 hours (below, abbreviated as "AC1") and a carbon material obtained by heat treating #4500 in an inert atmosphere at 1500° C. for 2 hours, then activating it by heat treatment in a flow of $CO_2$ at 970° C. for 6 hours (below, abbreviated as "AC2") were prepared.

(2) Control of Crystallinity of Porous Carbon Material

To raise the crystallinity of the carbon material, a graphitization furnace (Tammann type graphitization furnace made by Shinsei Denro) was used for heat treatment in a flow of argon gas at 1600 to 2200° C. for 1 hour. The obtained carbon material after heat treatment is, for example, when the carbon material after heat treatment is obtained by heat treating EJ at the heat treatment temperature 1800° C., denoted such as "EJ-1800".

(3) Oxidation Treatment of Porous Carbon Material

Treatment for Introduction of Oxygen-Containing Functional Groups A: Oxidation Treatment by Nitric Acid 1.0 g of the starting material of carbon material was placed in 200 ml of 69 mass % concentration nitric acid, then the dispersion was fully stirred. After that, the dispersion was warmed in a 90° C. oil bath for 2 hours, then was heat treated in an inert atmosphere at 500° C., 700° C., or 900° C. for 1 hour. The obtained carbon material after heat treatment is, for example, when the carbon material after heat treatment is a carbon material obtained by heat treating EJ-1800 at the heat treatment temperature 500° C., denoted such as "EJ-1800-A500".

Treatment for Introduction of Oxygen-Containing Functional Groups B: Oxidation Treatment by Ozone 3 g of the starting carbon material was placed in a 1-liter Erlenmeyer flask. In this Erlenmeyer flask, oxygen containing ozone was introduced and treatment by ozone was performed at 50° C. temperature for 5 hours (EJ-1800-B). Note that, for the ozone generation unit, KQS-050 made by Kotohira Industry was used. Further, oxygen gas was introduced into the apparatus and ozone was generated. Furthermore, the ozone treated carbon material was set in a graphitization furnace and was heat treated in an argon gas circulating atmosphere at 400 to 1000° C. for 1 hour. The obtained carbon material after heat treatment is, for example, when the carbon material after heat treatment is a carbon material obtained by heat treating EJ-1800-B at the heat treatment temperature 900° C., denoted such as "EJ-1800-B900".

(4) Treatment for Substituting Nitrogen of Porous Carbon Material and Treatment for Modifying Functional Groups Treatment for Introduction of Nitrogen-Containing Functional Groups N: Treatment by Ammonia Gas To a reaction vessel in which 1.0 g of the carbon material was introduced, ammonia gas was run and the material was heated at 500° C., 700° C., 900° C., 1100° C., or 1200° C. for 3 hours as nitrogen substitution treatment. The obtained carbon material after nitrogen substitution treatment is, for example, when the carbon material after nitrogen substitution treatment is a carbon material obtained by heat treating EJ-1800-A500 at a temperature of 700° C., denoted such as "EJ-1800-A500-N700".

After that, the thus obtained carbon material after nitrogen substitution treatment was heated in an inert atmosphere at 700° C., 900° C., 1100° C., or 1300° C. for 1 hour as functional group modifying treatment. The obtained carbon material after functional group modifying treatment is, for example, when the carbon material after functional group modifying treatment is a carbon material obtained by heat treating EJ-1800-A500-N700 at a temperature of 900° C., denoted such as "EJ-1800-A500-N700-900".

The above such obtained series of porous carbon materials were measured for nitrogen content $N_{ICP}$ (mass %), residual amount of nitrogen $N_{900° C.}$ (mass %), BET specific surface area $S_{BET}$ (M/g), G-band half-width ΔG (cm$^{-1}$), and $N_{1s}$ intensity ratio (N-Q/N-6). The results are shown in Table 5.

TABLE 5

| Carbon material for catalyst carrier use | Type | $O_{ICP}$ mass % | $O_{1200° C.}$ mass % | $N_{ICP}$ mass % | $N_{900° C.}$ mass % | $S_{BET}$ m²/g | $\Delta G$ cm$^{-1}$ | $N_{1S}$ intensity ratio NQ/N-6 | Remarks |
|---|---|---|---|---|---|---|---|---|---|
| EJ-1600 | E1 | <0.1 | <0.1 | <0.1 | <0.1 | 825 | 64 | No peak | Comp. ex. |
| EJ-1800 | E2 | <0.1 | <0.1 | <0.1 | <0.1 | 605 | 53 | No peak | Comp. ex. |
| EJ-2000 | E3 | <0.1 | <0.1 | <0.1 | <0.1 | 285 | 35 | No peak | Comp. ex. |
| EJ-2200 | E4 | <0.1 | <0.1 | <0.1 | <0.1 | 180 | 28 | No peak | Comp. ex. |
| EJ-1800-A500-N500 | E5 | 1.20 | <0.1 | 5.2 | 0.95 | 595 | 62 | 0.15 | Comp. ex. |
| EJ-1800-A500-N500-700 | E6 | 1.10 | 0.12 | 2.3 | 0.99 | 600 | 55 | 0.85 | Ex. |
| EJ-1800-A500-N500-900 | E7 | 1.00 | 0.15 | 0.99 | 0.97 | 605 | 54 | 1.1 | Ex. |
| EJ-1800-A500-N500-1100 | E8 | 0.45 | 0.18 | 0.67 | 0.67 | 605 | 54 | 1.4 | Ex. |
| EJ-1800-A500-N500-1300 | E9 | <0.1 | <0.1 | 0.26 | 0.25 | 615 | 53 | 1.7 | Comp. ex. |
| EJ-1800-A500-N700-700 | E10 | 1.23 | 0.16 | 3.2 | 1.6 | 615 | 53 | 0.95 | Ex. |
| EJ-1800-A500-N700-900 | E11 | 0.96 | 0.18 | 1.7 | 1.6 | 620 | 57 | 1.1 | Ex. |
| EJ-1800-A500-N700-1100 | E12 | 0.34 | 0.12 | 1.2 | 1.2 | 610 | 56 | 1.3 | Ex. |
| EJ-1800-A500-N900-700 | E13 | 0.88 | 0.16 | 4.6 | 3.6 | 615 | 58 | 1.1 | Ex. |
| EJ-1800-A500-N900-900 | E14 | 0.74 | 0.19 | 3.3 | 3.2 | 620 | 52 | 1.3 | Ex. |
| EJ-1800-A500-N900-1100 | E15 | 0.33 | 0.12 | 2.2 | 2.2 | 615 | 53 | 1.4 | Ex. |
| EJ-1800-A500-N1100-1100 | E16 | 0.21 | <0.1 | 2.4 | 2.3 | 615 | 54 | 1.5 | Ex. |
| EJ-1800-A500-N1200-1100 | E17 | 0.15 | <0.1 | 0.29 | 0.29 | 620 | 56 | 1.8 | Comp. ex. |
| EJ-1800-A700-N700-700 | E18 | 1.22 | 0.23 | 2.7 | 1.6 | 620 | 55 | 1.1 | Ex. |
| EJ-1800-A700-N700-900 | E19 | 1.06 | 0.27 | 1.6 | 1.5 | 625 | 54 | 1.2 | Ex. |
| EJ-1800-A700-N700-1100 | E20 | 0.37 | 0.19 | 0.99 | 0.96 | 625 | 54 | 1.3 | Ex. |
| EJ-1800-A900-N700-700 | E21 | 1.37 | 0.32 | 1.9 | 1.3 | 620 | 55 | 1.2 | Ex. |
| EJ-1800-A900-N700-900 | E22 | 0.71 | 0.26 | 1.4 | 1.3 | 625 | 52 | 1.3 | Ex. |
| EJ-1800-A900-N700-1100 | E23 | 0.43 | 0.19 | 1.1 | 0.99 | 620 | 53 | 1.4 | Ex. |
| EJ-1800-B400-N700 | E24 | 1.35 | <0.1 | 3.3 | 0.85 | 620 | 63 | 0.18 | Comp. ex. |
| EJ-1800-B400-N700-700 | E25 | 0.65 | 0.19 | 1.1 | 0.83 | 625 | 54 | 0.95 | Ex. |
| EJ-1800-B400-N700-900 | E26 | 0.52 | 0.17 | 0.84 | 0.82 | 625 | 54 | 1.1 | Ex. |
| EJ-1800-B400-N700-1100 | E27 | 0.26 | 0.13 | 0.59 | 0.59 | 620 | 53 | 1.4 | Ex. |
| EJ-1800-B600-N700-900 | E28 | 0.62 | 0.31 | 0.68 | 0.58 | 615 | 54 | 1.2 | Ex. |
| EJ-1800-B800-N700-900 | E29 | 0.73 | 0.37 | 0.62 | 0.56 | 620 | 52 | 1.3 | Ex. |
| EJ-1800-B1000-N700-900 | E30 | 0.51 | 0.17 | 0.46 | 0.41 | 625 | 52 | 1.3 | Ex. |
| EJ-1800-B600-N900-900 | E31 | 0.72 | 0.34 | 0.78 | 0.77 | 620 | 53 | 1.2 | Ex. |
| EJ-1800-B600-N1100-1100 | E32 | 0.16 | 0.13 | 0.83 | 0.82 | 620 | 53 | 1.4 | Ex. |
| EJ-1900-B600-N700-900 | E33 | 0.57 | 0.17 | 0.52 | 0.51 | 485 | 45 | 1.2 | Ex. |
| EJ-1900-B600-N900-900 | E34 | 0.62 | 0.19 | 0.59 | 0.56 | 480 | 45 | 1.2 | Ex. |
| MC-1900-A500-N700-900 | M1 | 0.67 | 0.23 | 3.5 | 3.4 | 955 | 55 | 1.3 | Ex. |
| MC-2000-A500-N700-900 | M2 | 0.63 | 0.22 | 2.9 | 2.8 | 880 | 48 | 1.4 | Ex. |
| MC-2100-A500-N700-900 | M3 | 0.59 | 0.19 | 2.3 | 2.2 | 750 | 44 | 1.5 | Ex. |
| MC-2000-A700-N700-900 | M4 | 0.68 | 0.22 | 3.2 | 3.1 | 885 | 48 | 1.4 | Ex. |
| MC-2000-A900-N700-900 | M5 | 0.72 | 0.24 | 3.3 | 3.2 | 880 | 48 | 1.4 | Ex. |
| MC-2000-B600-N700-900 | M6 | 0.59 | 0.20 | 2.8 | 2.8 | 890 | 48 | 1.4 | Ex. |
| MC-1900-B600-N700-900 | M7 | 0.62 | 0.23 | 3.4 | 3.3 | 890 | 48 | 1.3 | Ex. |
| MC-1800-B600-N700-900 | M8 | 0.64 | 0.26 | 3.9 | 3.8 | 1100 | 58 | 1.2 | Ex. |
| AC1-1800-A700-N700-900 | C1 | 0.47 | 0.23 | 1.2 | 1.1 | 560 | 39 | 0.9 | Ex. |
| AC1-1900-A700-N700-900 | C2 | 0.41 | 0.21 | 1.1 | 1.0 | 525 | 37 | 0.8 | Ex. |
| AC1-2000-A700-N700-900 | C3 | 0.37 | 0.19 | 0.9 | 0.8 | 475 | 35 | 0.8 | Ex. |
| AC2-1800-B700-N700-900 | C4 | 0.45 | 0.22 | 1.1 | 1.0 | 505 | 37 | 0.7 | Ex. |
| AC2-1900-B700-N700-900 | C5 | 0.42 | 0.19 | 0.8 | 0.7 | 465 | 34 | 0.6 | Ex. |
| AC2-2000-B700-N700-900 | C6 | 0.39 | 0.18 | 0.5 | 0.5 | 405 | 32 | 0.4 | Ex. |

2. Preparation of Fuel Cell and Evaluation of Cell Performance

Each of the above prepared carbon materials was used to prepare a catalyst for solid-polymer fuel cell use on which a catalyst metal was carried in the following way. Furthermore, the obtained catalyst was used to prepare a catalyst layer ink solution. Next, this catalyst layer ink solution was used to form a catalyst layer and furthermore the formed catalyst layer was used to prepare a membrane electrode assembly (MEA). This prepared MEA was assembled into a fuel cell and tested for power generation using a fuel cell measuring apparatus. Below, details of the preparation of the members and tests will be explained concretely.

(1) Preparation of Catalyst for Solid-Polymer Fuel Cell Use

Each carbon material for catalyst carrier use of the examples and comparative examples was made to disperse in distilled water. To this dispersion, formaldehyde was added. The dispersion was set in a water bath set to 40° C. Next, when the temperature of the dispersion became the same 40° C. as the bath, while stirring, a dinitrodiamine Pt complex nitric acid aqueous solution was slowly poured into this dispersion. After that, the dispersion continued to be stirred for about 2 hours, then the dispersion was filtered and the obtained solids were washed. The thus obtained solids were dried at 90° C. in vacuum, then were crushed by a mortar. Next, the crushed solids were heat treated in a hydrogen atmosphere at 150° C. for 1 hour to prepare a catalyst for solid-polymer fuel cell use (Pt catalyst) for each of the examples and comparative examples.

Note that, the carried amounts of platinum of the PT catalysts of the examples and comparative examples were adjusted to 40 mass % with respect to the total mass of the carbon material for catalyst carrier use and platinum particles. Note that, the carried amount was measured by inductively coupled plasma-atomic emission spectrometry (ICP-AES).

(2) Preparation of Catalyst Layer

The Pt catalysts of the thus prepared examples and comparative examples and an electrolytic resin comprised of Nafion® made by Dupont (persulfonic acid-based ion exchange resin) were prepared. Next, in an Ar atmosphere, each Pt catalyst and Nafion were mixed in ratios of the mass of the Nafion solid component to the mass of the platinum catalyst particle carrying carbon material of 1.25. These were lightly stirred, then the Pt catalyst was crushed by ultrasonic waves. Furthermore, ethanol was added to the solids to give a total solid component concentration of the Pt catalyst and the electrolytic resin combined of 1.1 mass %. Due to the above steps, a catalyst layer ink solution comprised of a Pt catalyst and electrolytic resin mixed together was prepared.

To each thus prepared catalyst layer ink solution, furthermore ethanol was added to prepare a spray coating-use catalyst layer ink solution with a platinum concentration of 0.5 mass %. Next, the spray conditions were adjusted to give a mass per catalyst layer unit area of the platinum (below, referred to as "platinum basis weight") of 0.2 mg/cm². The spray coating-use catalyst layer ink was sprayed on a Teflon® sheet, then was treated to dry in argon at 120° C. for 60 minutes to prepare a catalyst layer of a Pt catalyst of each of the examples and comparative examples.

(3) Preparation of MEA

The above such prepared catalyst layers of the Pt catalyst were used to prepare an MEA (membrane electrode assembly) by the following method.

A square piece of electrolytic film of 6 cm per side was cut out from a Nafion film (made by Dupont, NR211). Further, the catalyst layers of the anode and cathode coated on Teflon® sheets were respectively cut out by a cutter knife to square pieces of 2.5 cm per side.

Between the thus cut out catalyst layers of the anode and cathode, this electrolytic film was sandwiched so that the catalyst layers sandwiched and contacted the center part of the electrolytic film and were not offset from each other, the assembly was pressed at 120° C. by 100 kg/cm² for 10 minutes, then cooled down to room temperature, then only the Teflon® sheets were carefully peeled off at both the anode and cathode to prepare a catalyst layer-electrolytic film assembly with the catalyst layers of the anode and cathode fixed to the electrolytic film.

As the gas diffusion layers, a pair of square shaped pieces of carbon paper (made by SGL Carbon, 35BC) were cut out from the carbon paper in sizes of 2.5 cm per side. Between these pieces of carbon paper, the catalyst layer-electrolytic film assembly was sandwiched so that the anode and cathode catalyst layers were aligned with no offset. This was pressed at 120° C. by 50 kg/cm² for 10 minutes to prepare an MEA.

Note that, the basis weights of the different components of the catalyst metal component, carbon material, and electrolytic material in each MEA prepared were calculated by finding the mass of the catalyst layers fixed to the Nafion film (electrolytic film) from the difference of the mass of the Teflon® sheets with the catalyst layers before pressing and the mass of the Teflon® sheets peeled off after pressing and using the mass ratios of the compositions of the catalyst layers.

(4) Test for Evaluation of Performance of Fuel Cell

Each of the prepared MEAs of the examples and comparative examples was assembled into a cell and set in a fuel cell measurement apparatus to evaluate the performance of the fuel cell by the following routine:

Regarding the gas, the cathode was supplied with air and, further, the anode was supplied with pure hydrogen, by pressurization to 0.2 atm (output side pressure) so as to respectively give rates of utilization of 40% and 70%. The cell temperature was set to 80° C. The supplied gas, both at the cathode side and anode side, was passed through a humidifier so that it was supplied to the cell along with saturated steam corresponding to the water temperature inside the humidifier. The state of humidity at this time was controlled by the temperature of the humidifier. The output at the time of a cell temperature 80° C. and saturated humidity state was defined as the "output at time of high humidity", while the output at the time of the state of humidity corresponding to a relative humidity 30% was defined as the "output at time of low humidity". These output at time of high humidity and output at time of low humidity were used to evaluate the output characteristics.

Under conditions supplying gas to the cell under the above such settings, the load was gradually increased. The voltage across cell terminals at 1000 mA/cm² was recorded as the output voltage and the fuel cell was evaluated for performance based on this.

In the obtained results of evaluation of performance of the "output at time of high humidity" and "output at time of low humidity", use was made of passing ranks of "E" (Excellent) and "VG" (Very Good) and a failing rank of "B" (Bad) as criteria for evaluation. Regarding the passing ranks, passing samples were ranked as "VG" (Very Good) and higher performance samples were ranked as "E" (Excellent). Details will be described below.

The passing rank "E" was defined as satisfying an output voltage at 1000 mA/cm² of 0.65V or more in both the "output at time of high humidity" and "output at time of low humidity". Further, the passing rank "VG" was defined as satisfying an output voltage at 1000 mA/cm² of 0.60V or more in both the "output at time of high humidity" and "output at time of low humidity". Furthermore, the failing rank of "B" was defined as not satisfying the passing rank "VG". The results are shown in Table 6.

(5) Durability Test of Fuel Cell

As the durability test, under the conditions of the "output at time of high humidity", in the measurement mode of a constant output voltage, the voltage across cell terminals was held at 1.0V for 1.5 seconds, then the voltage across cell terminals was raised to 1.35V and held there for 1.5 seconds, then the voltage across cell terminals was returned to the original 1.0V. The cycle was repeated 3000 times, then the cell performance was measured in the same way as the case of the test for evaluation of performance of the "output at time of high humidity" before the durability test.

The ratio of the cell voltage after the durability test to the cell voltage before the durability test was defined as the output maintenance rate and shown by a percentage (%). This was used as an indicator of evaluation of the durability. The case where this output maintenance rate is 80% or more is defined as passing. The case where it is 90% or more is deemed as particularly good. Further, the case where this output maintenance rate is less than 80% is defined as failing. The results are shown in Table 6.

TABLE 6

| | | Evaluation of cell performance | | Evaluation of durability | |
| --- | --- | --- | --- | --- | --- |
| Type | Eval. | High humidity output (V) | Low humidity output (V) | Output maintenance rate (%) | Remarks |
| E1 | B | 0.55 | 0.42 | 75 | Comp. ex. |
| E2 | B | 0.51 | 0.38 | 76 | Comp. ex. |
| E3 | B | 0.48 | 0.37 | 78 | Comp. ex. |
| E4 | B | 0.42 | 0.35 | 78 | Comp. ex. |
| E5 | B | 0.57 | 0.62 | 65 | Comp. ex. |
| E6 | VG | 0.61 | 0.63 | 81 | Ex. |
| E7 | VG | 0.63 | 0.62 | 82 | Ex. |
| E8 | VG | 0.64 | 0.62 | 86 | Ex. |
| E9 | B | 0.57 | 0.55 | 88 | Comp. ex. |

TABLE 6-continued

| Type | Eval. | Evaluation of cell performance | | Evaluation of durability | Remarks |
|---|---|---|---|---|---|
| | | High humidity output (V) | Low humidity output (V) | Output maintenance rate (%) | |
| E10 | VG | 0.61 | 0.63 | 81 | Ex. |
| E11 | VG | 0.64 | 0.63 | 83 | Ex. |
| E12 | VG | 0.64 | 0.62 | 86 | Ex. |
| E13 | VG | 0.62 | 0.64 | 81 | Ex. |
| E14 | VG | 0.64 | 0.63 | 83 | Ex. |
| E15 | VG | 0.64 | 0.62 | 85 | Ex. |
| E16 | VG | 0.64 | 0.63 | 86 | Ex. |
| E17 | B | 0.64 | 0.51 | 87 | Comp. ex. |
| E18 | VG | 0.62 | 0.63 | 83 | Ex. |
| E19 | VG | 0.64 | 0.63 | 83 | Ex. |
| E20 | VG | 0.64 | 0.62 | 84 | Ex. |
| E21 | VG | 0.64 | 0.62 | 83 | Ex. |
| E22 | VG | 0.64 | 0.64 | 85 | Ex. |
| E23 | VG | 0.64 | 0.62 | 86 | Ex. |
| E24 | B | 0.58 | 0.62 | 75 | Comp. ex. |
| E25 | VG | 0.62 | 0.63 | 81 | Ex. |
| E26 | VG | 0.64 | 0.64 | 82 | Ex. |
| E27 | VG | 0.64 | 0.63 | 86 | Ex. |
| E28 | VG | 0.64 | 0.64 | 83 | Ex. |
| E29 | VG | 0.64 | 0.62 | 85 | Ex. |
| E30 | VG | 0.62 | 0.62 | 84 | Ex. |
| E31 | VG | 0.64 | 0.64 | 83 | Ex. |
| E32 | VG | 0.64 | 0.62 | 85 | Ex. |
| E33 | VG | 0.64 | 0.62 | 89 | Ex. |
| E34 | VG | 0.64 | 0.64 | 89 | Ex. |
| M1 | VG | 0.64 | 0.64 | 91 | Ex. |
| M2 | E | 0.71 | 0.67 | 93 | Ex. |
| M3 | E | 0.70 | 0.66 | 95 | Ex. |
| M4 | E | 0.69 | 0.66 | 95 | Ex. |
| M5 | E | 0.69 | 0.66 | 94 | Ex. |
| M6 | E | 0.68 | 0.67 | 95 | Ex. |
| M7 | E | 0.70 | 0.67 | 92 | Ex. |
| M8 | VG | 0.70 | 0.68 | 87 | Ex. |
| C1 | E | 0.69 | 0.68 | 91 | Ex. |
| C2 | E | 0.71 | 0.67 | 93 | Ex. |
| C3 | VG | 0.64 | 0.64 | 95 | Ex. |
| C4 | VG | 0.64 | 0.63 | 91 | Ex. |
| C5 | VG | 0.63 | 0.62 | 92 | Ex. |
| C6 | VG | 0.63 | 0.60 | 95 | Ex. |

As clear from the results of Table 5 and Table 6, the carbon materials E1 to E4 (EJ1600-1600, 1800, 2000, 2200) were all poor in cell performance, in particular were low in low humidity characteristics, due to the drop in polarity of the surface due to heat treatment at the time of crystallinity control.

Further, the carbon materials E5 to E17 were all obtained by treating EJ-1800 (Ketjen black heat treated at 1800° C.) by A500 (nitric acid oxidation treatment, then heat treatment in inert atmosphere at 500° C.) and then treating the material by ammonia gas under various conditions. The carbon materials E5 to E9 were treated by N500 (treatment at 500° C. by ammonia gas). The carbon material E5, not heat treated in an inert atmosphere after this treatment at 500° C. by ammonia gas, became too large in $N_{ICP}$ and low in both high humidity characteristics and durability as a result. On the other hand, the carbon materials E6 to E9, which were heat treated in an inert atmosphere after this treatment at 500° C. by ammonia gas, all exhibited excellent power generation characteristics and durability. Further, the carbon materials E10 to E15 were treated by N700 (treatment at 700° C. by ammonia gas) or by N900 (treatment at 900° C. by ammonia gas) to introduce nitrogen, then was treated to modify the functional groups during which the heat treatment temperature in the inert atmosphere was made 700° C., 900° C., or 1100° C. All exhibited excellent power generation characteristics and durability.

Furthermore, the carbon material E16 was treated by N1100-1100 (treatment at 1100° C. by ammonia gas, then treatment in an inert atmosphere at 1100° C.), while the carbon material E17 was treated by N1200-1100 (treatment at 1200° C. by ammonia gas, then heat treatment in an inert atmosphere at 1100° C.). The carbon material E16 exhibited excellent characteristics, but the carbon material E17 had little nitrogen introduced, was low in hydrophilicity, and was low in high humidity characteristics.

The carbon materials E18 to E23 were obtained by treating EJ-1800 by nitric acid by A700 (nitric acid oxidation treatment, then heat treatment in inert atmosphere at 700° C.) or by A900 (nitric acid oxidation treatment, then heat treatment in inert atmosphere at 900° C.), then performing N700 (treatment at 700° C. by ammonia gas), and furthermore modifying the functional groups while making the final heat treatment temperature in the inert atmosphere 700° C., 900° C., or 1100° C. In all cases, excellent power generation characteristics and durability were realized.

The carbon materials E24 to E34 were obtained by B-type oxidation treatment by ozone, then N-type treatment by ammonia gas. The carbon materials E24 to E32 were all obtained by treating EJ-1800 by B-type oxidation treatment and further the carbon material E33 and carbon material E34 were obtained by treating EJ-1900 by the same. Here, the carbon material E24 was obtained without modifying the functional groups after B400-N700, so the $N_{ts}$ intensity ratio (N-Q/N-6) was small and the high humidity characteristics and durability were low. Further, the carbon materials E25 to E27 were obtained by making the heat treatment temperature in the inert atmosphere in the modifying of the functional groups after B400-N700 700° C., 900° C., or 1100° C. All had excellent output characteristics and durability. Further, the carbon materials E28 to E30 were obtained by making the heat treatment temperature at the time of B-type oxidation treatment by ozone 600° C., 800° C., or 1000° C. and making the subsequent N-type treatment by ammonia gas constant at N700-900. Each was excellent in output characteristics and durability. By fixing B600, which was excellent in both the "high humidity characteristics" and "low humidity characteristics", among them and changing the treatment conditions in N-type treatment of EJ-1800 and EJ-1900 by ammonia gas, the carbon materials E31 to E34 were obtained. Each was excellent in output characteristics and durability.

The carbon materials M1 to M8 are catalyst carriers prepared using the MCND made by Nippon Steel & Sumikin Chemical. The heat treatment temperature at the time of control of the crystallinity was made 1800° C., 1900° C., 2000° C., or 2100° C. Further, for the N-type treatment by ammonia gas, the materials were fixed to N700-900. Here, the carbon materials M1 to M5 were prepared while changing the treatment conditions at the time of the A-type oxidation treatment by nitric acid, but each was excellent in output characteristics and durability. In particular, the carbon materials M2 to M5 exhibited excellent power generation characteristics and durability. Further, in the carbon materials M6 to M8, MC-2000, MC-1900, and MC-1800 were treated by B600-N700-900. Each exhibited excellent power generation characteristics and durability.

The carbon materials C1 to C6 are carbon materials obtained by treating Carbon Black #4500 made by Tokai Carbon by $CO_2$ gas to activate them to make them porous, furthermore making the treatment temperature at the time of the subsequent control of crystallinity 1800° C., 1900° C., or 2000° C. and heat treating the materials in an inert atmosphere, furthermore performing the A-type oxidation treatment by nitric acid (carbon materials C1 to C3) or B-type oxidation treatment by ozone (carbon materials C4 to C6), then performing the N-type ammonia gas treatment fixed to N700-900. These carbon materials C1 to C6 were all excellent in output characteristics and durability. In particular, the carbon material C1 and carbon material C2 exhibited excellent power generation characteristics and durability.

From the above results, it was learned that catalysts using porous carbon materials according to the examples of the present invention as catalyst carriers all exhibit excellent solid-polymer fuel cell characteristics.

4. Example 4

Example 4 will be explained. Example 4 corresponds to the above-mentioned fourth embodiment. Note that, in Example 4, the oxygen content $O_{ICP}$ (mass %) by trace oxygen analysis, residual amount of oxygen $O_{1200°\ C.}$ (mass %) remaining after heat treatment in an inert gas (or vacuum) atmosphere at 1200° C., nitrogen content $N_{ICP}$ (mass %) contained in the carbon material, residual amount of nitrogen $N_{900°\ C.}$ (mass %) remaining after heat treatment in an inert gas (or vacuum) atmosphere at 900° C., BET specific surface area $S_{BET}$ (m$^2$/g), G-band half-width $\Delta G$ (cm$^{-1}$) detected at 1550 to 1650 cm$^{-1}$ in range of the Raman spectrum, and $N_{1s}$ intensity ratio (N-Q/N-6) between the N-6 peak near the binding energy 398.5 eV and the N-Q peak near the binding energy 400.5 eV in the $N_{1s}$ spectrum measured by XPS were respectively measured by the following methods:

Measurement of Oxygen Content $O_{ICP}$

The oxygen content $O_{ICP}$ (mass %) was measured using an analysis apparatus comprised of a Model RH402 made by LECO. The usual inert gas fusion-thermal conductivity method used for measurement of C, H, O, and N was used for the measurement.

Measurement of Residual Amount of Oxygen $O_{1200°\ C.}$ Remaining After Heat Treatment in Inert Gas (or Vacuum) Atmosphere at 1200° C.

A sample was set in a graphitization furnace through which argon gas was circulated, was raised the furnace temperature by 15° C./min, and was held at 1200° C. for 1 hour. After that, while running argon through the inside of the furnace, the inside of the furnace was cooled to room temperature, then the sample was taken out. The amount of oxygen in this sample was measured in the same way as the above-mentioned measurement of the oxygen content. Further, the measured amount of oxygen was made the residual amount of oxygen $O_{1200°\ C.}$ remaining after heat treatment in an inert atmosphere at 1200° C.

Measurement of Nitrogen Content $N_{ICP}$

The nitrogen content $N_{ICP}$ (mass %) was measured using an analysis apparatus comprised of Model RH402 made by LECO and applying the usual inert gas fusion-thermal conductivity method used for measurement of C, H, O, and N.

Measurement of Residual Amount of Nitrogen $N_{900°\ C.}$ Remaining After Heat Treatment in Inert Gas (or Vacuum) Atmosphere at 900° C.

A sample was set in a graphitization furnace through which argon gas was circulated, was raised the furnace temperature by 10° C./min, and was held at 900° C. for 1 hour. After that, while running argon through the inside of the furnace, the inside of the furnace was cooled to room temperature, then the sample was taken out. The amount of nitrogen in this sample was measured in the same way as the above measurement of the nitrogen content. Further, the measured amount of nitrogen was made the residual amount of nitrogen $N_{900°\ C.}$ remaining after heat treatment in an inert gas (or vacuum) atmosphere at 900° C.

Measurement of BET Specific Surface Area $S_{BET}$

The BET specific surface area $S_{BET}$ (m$^2$/g) was measured as follows. That is, about 50 mg of a sample was weighed out and dried at 90° C. for 2 hours in a vacuum. Further, the obtained dried sample was set in an automatic specific surface area measurement apparatus (BELSORPmini, made by Bel Japan) and an adsorption isotherm was prepared by the gas adsorption method using nitrogen gas. Next, this adsorption isotherm was analyzed by the attached BET analysis software to measure the BET specific surface area.

Measurement of G-Band Half-Width of Raman Spectrum

The G-band half-width of the Raman spectrum (cm$^{-1}$) was measured as follows. That is, about 3 mg of a sample was weighed out and a laser Raman spectrometer (made by JASCO, NRS-7100) was used under measurement conditions of an excitation laser of 532 nm, a laser power of 100 mW (sample irradiation power: 0.1 mW), collection mode: backscattering, slit: 100 μm×100 μm, object lens: ×100, spot size: 1 μm, exposure time: 30 sec, observed wave number: 3200 to 750 cm$^{-1}$, cumulative times: 2 to measure the Raman spectrum. The G-band half-width was calculated based on the measurement results.

Calculation of $N_{1s}$ Intensity Ratio (N-Q/N-6) of N-6 Peak Near Binding Energy 398.5 eV and N-Q Peak Near Binding Energy 400.5 eV From $N_{1s}$ Spectrum in XPS Measurement XPS measurement was performed using an X-ray photoelectron spectroscope (Quantum 2000 model scan type X-ray photoelectronic spectroscope μ-ESCA made by ULVAC-PHI). 5 to 10 mg of a sample was weighed out, buried in indium metal, and irradiated by X-rays in a 300 μm square range. For the X-ray source, Kα rays of Al (14866.6 eV) were used. Measurement was performed by an output of 15 kV 25 W. A range of a binding energy of 396 to 408 eV corresponding to the $N_{is}$ path was measured.

1. Preparation of Carbon Material for Catalyst Carrier Use

The porous carbon material used as the starting material for preparing a carbon material for catalyst carrier use (below, sometimes referred to as simply a "carbon material") was prepared as follows.

(1) Preparation of Porous Carbon Material

Ketjen Black EC600JD made by Lion Corporation (below, abbreviated as "EJ"), ESCARBON MCND made by Nippon Steel & Sumikin Chemical (below, abbreviated as "MC"), and carbon materials obtained by activating Tokablack #4500 made by Tokai Carbon (below, abbreviated as "AC") by heat treatment in a flow of $CO_2$ at 950° C. for 1 to 8 hours were prepared. Note that, for the carbon material AC, for example, when performing activation treatment for 4 hours, the obtained carbon material is denoted such as "AC4".

(2) Control of Crystallinity of Porous Carbon Material

To raise the crystallinity of the prepared carbon material, a graphitization furnace (Tammann type graphitization furnace made by Shinsei Denro) was used for heat treatment in a stream of argon gas at 1600 to 2400° C. for 2 hours (below, referred to as "heat treatment for controlling crystallinity") to prepare the carbon material. The obtained carbon material after heat treatment for controlling crystallinity is, for example, when the carbon material after heat treatment is obtained by heat treating EJ at the heat treatment temperature 1800° C., denoted such as "EJ-1800".

(3) Introduction of Oxygen-Containing Functional Groups into Porous Carbon Material The above prepared carbon material; 1.0 g was placed in 200 ml of a 30 mass % concentration hydrogen peroxide solution. This was fully stirred, then was warmed in a 40° C. oil bath for 10 hours. Due to this process, a carbon material in which oxygen-containing functional groups were introduced was prepared. The carbon material after oxidation treatment is, when, for example, the carbon material after oxidation treatment is obtained by oxidation treatment of EJ-1800, denoted such as "EJ-1800-Ox".

The BET specific surface area $S_{BET}$ (m²/g) and nitrogen content $O_{ICP}$ (mass %) of the above prepared carbon materials were measured. The results are shown in Table 7.

TABLE 7

| Carbon material | $S_{BET}$ m²/g | $O_{ICP}$ mass % |
|---|---|---|
| EJ-1800 | 635 | 0.3 |
| EJ-1800-Ox | 615 | 2.4 |
| EJ-2000-Ox | 450 | 1.8 |
| EJ-2200-Ox | 390 | 1.3 |
| EJ-2400-Ox | 305 | 0.7 |
| MC-1800-Ox | 1155 | 2.9 |
| MC-1900-Ox | 1040 | 2.2 |
| MC-2000-Ox | 965 | 1.7 |
| MC-2100-Ox | 720 | 1.2 |
| AC2-1600-Ox | 320 | 1.1 |
| AC4-1600-Ox | 495 | 1.5 |
| AC6-1600-Ox | 635 | 1.9 |
| AC8-1600-Ox | 905 | 2.2 |
| AC8-1800-Ox | 660 | 1.6 |
| AC8-2000-Ox | 315 | 0.8 |

Treatment for Introducing Nitrogen-Containing Functional Groups (Carrying Treatment Step)

To a reaction vessel in which 1.0 g of the starting carbon material was introduced, 0.2 g of uracil (commercially available product made by Kanto Chemical (symbol U)) and 150 ml of distilled water were added. The mixture was refluxed in a 100° C. oil bath for 1 hour. After that, an evaporator was used to make the water evaporate under reduced pressure and remove it to obtain a carbon material carrying uracil. Further, in the same way as the case of uracil, a carbon material carrying xanthine (commercially available product made by Kanto Chemical (symbol X)) was obtained. Furthermore, to a reaction vessel in which 1.0 g of the starting carbon material was introduced, 0.2 g of meso-tetraphenylporphyrin (commercially available product made by Sigma Aldrich (symbol P)) and 200 ml of DMF (dimethyl formamide, commercially available reagent) were added. The mixture was refluxed in a 140° C. oil bath for 1 hour. After that, an evaporator was used to make the solvent evaporate under reduced pressure and remove it to obtain a carbon material carrying porphyrin. The thus obtained carbon material after carrying treatment is, for example, when the carbon material after carrying treatment is a carbon material obtained by carrying treatment of EJ-1800-Ox, denoted such as "EJ-1800-Ox-U", "EJ-1800-Ox-X", and "EJ-1800-Ox-P".

Furthermore, in the same way as the case of meso-tetraphenylporphyrin, benzimidazole (made by Tokyo Chemical), guanine (made by Tokyo Chemical), melamine (monomer: made by Tokyo Chemical), indole (made by Tokyo Chemical), pyrimidine (made by Kanto Chemical), and pyrazole (made by Kanto Chemical) were carried on carriers for use for the test. The above cases, in the same way as the above, were respectively in order denoted as "EJ-1800-Ox-B", "EJ-1800-Ox-G", "EJ-1800-Ox-M", "EJ-1800-Ox-I", "EJ-1800-Ox-Py", and "EJ-1800-Ox-Z".

Fixation Treatment Step: Argon Gas Atmosphere (Ar) and/or Ammonia Gas Atmosphere (Am)

1.0 g of the porous carbon material after the carrying treatment obtained in the carrying treatment step was placed in a reaction vessel. In this reaction vessel, argon gas or ammonia gas was run and the material was treated to fix the nitrogen at 300° C., 500° C., 700° C., 900° C., 1100° C., or 1300° C. for 1 hour. The obtained fixed carbon material is, when that carbon material, for example, the fixed carbon material, is a carbon material obtained by fixing EJ-1800-Ox-U in an argon gas atmosphere of argon gas 100 vol % at 500° C., called such as "EJ-1800-Ox-U-Ar100-500".

Further, when the obtained carbon material is a carbon material obtained by fixation treatment in an ammonia gas atmosphere of ammonia gas 100 vol % at 500° C., that carbon material is denoted such as "EJ-1800-Ox-U-Am100-500".

Further, when the obtained carbon material is a carbon material obtained by fixation treatment by heat treatment in a mixed gas of ammonia gas 10 vol % and argon gas 90 vol % at 500° C., that carbon material is denoted such as "EJ-1800-Ox-U-Am10Ar90-500".

Further, when the obtained carbon material is a carbon material obtained by such fixation treatment, then again heat treatment in argon gas at 700° C., that carbon material is denoted such as "EJ-1800-Ox-U-Am10Ar90-500-Ar700".

The oxygen content $O_{ICP}$ (mass %), residual amount of oxygen $O_{1200° C.}$, nitrogen content $N_{ICP}$ (mass %), residual amount of nitrogen $N_{900° C.}$ (mass %), BET specific surface area (m²/g), G-band half-width $\Delta G$ (cm$^{-1}$), and $N_{1s}$ intensity ratio (N-Q/N-6) of the thus obtained series of carbon materials were measured. The results are shown in Table 8.

TABLE 8

| | | Carbon material for catalyst carrier use | | $O_{ICP}$ | $O_{1200° C.}$ | $N_{ICP}$ | $N_{900° C.}$ | $S_{BET}$ | $\Delta G$ | $N_{1s}$ intensity ratio |
|---|---|---|---|---|---|---|---|---|---|---|
| | | Symbol | Type | (mass %) | (mass %) | (mass %) | (mass %) | (m²/g) | (cm$^{-1}$) | (N-Q/N-6) |
| Comp. ex. | 1 | EJ-1800-U | E1 | 0.21 | <0.1 | 3.6 | 0.86 | 360 | 52 | <0.1 |
| | 2 | EJ-1800-U-Ar100-300 | E2 | 0.18 | <0.1 | 2.7 | 0.95 | 590 | 52 | 0.15 |
| | 3 | EJ-1800-U-Ar100-400 | E3 | 0.16 | <0.1 | 2.4 | 0.95 | 590 | 52 | 0.15 |
| | 4 | EJ-1800-U-Ar100-1200 | E4 | <0.1 | <0.1 | 0.27 | 0.25 | 605 | 52 | 1.6 |
| | 5 | EJ-1800-U-Ar100-1300 | E5 | <0.1 | <0.1 | 0.26 | 0.25 | 610 | 53 | 1.7 |
| | 6 | EJ-1800-U-Am100-1200 | E6 | 0.21 | <0.1 | 0.30 | 0.29 | 590 | 52 | 1.6 |
| | 7 | EJ-1800-U-Am100-1300 | E7 | 0.18 | <0.1 | 0.29 | 0.28 | 590 | 52 | 1.6 |
| Ex. | 1 | EJ-1800-Ox-X-Am100-700-Ar900 | E8 | 0.21 | 0.16 | 2.9 | 2.7 | 605 | 53 | 1.5 |
| | 2 | EJ-2000-Ox-X-Am100-700-Ar900 | E9 | 0.18 | 0.15 | 1.3 | 1.2 | 440 | 53 | 1.5 |
| | 3 | EJ-2200-Ox-X-Am100-700-Ar900 | E10 | 0.17 | 0.14 | 1.1 | 1.0 | 390 | 52 | 1.3 |
| | 4 | EJ-2400-Ox-X-Am100-700-Ar900 | E11 | 0.13 | 0.12 | 0.75 | 0.73 | 305 | 54 | 1.2 |

TABLE 8-continued

| | Carbon material for catalyst carrier use | | $O_{ICP}$ | $O_{1200°\ C.}$ | $N_{ICP}$ | $N_{900°\ C.}$ | $S_{BET}$ | $\Delta G$ | $N_{1s}$ intensity ratio |
|---|---|---|---|---|---|---|---|---|---|
| | Symbol | Type | (mass %) | (mass %) | (mass %) | (mass %) | (m²/g) | (cm⁻¹) | (N-Q/N-6) |
| 5 | EJ-1800-Ox-U-Am100-700-Ar900 | E12 | 0.22 | 0.18 | 2.8 | 2.6 | 603 | 54 | 1.5 |
| 6 | EJ-2000-Ox-U-Am100-700-Ar900 | E13 | 0.19 | 0.15 | 1.5 | 1.4 | 432 | 53 | 1.4 |
| 7 | EJ-2200-Ox-U-Am100-700-Ar900 | E14 | 0.18 | 0.16 | 1.2 | 1.1 | 391 | 53 | 1.4 |
| 8 | EJ-2400-Ox-U-Am100-700-Ar900 | E15 | 0.14 | 0.13 | 0.83 | 0.79 | 304 | 51 | 1.3 |
| 9 | MC-1800-Ox-U-Am100-700-Ar900 | E16 | 0.28 | 0.22 | 3.2 | 2.8 | 1122 | 47 | 1.5 |
| 10 | MC-1900-Ox-U-Am100-700-Ar900 | E17 | 0.27 | 0.20 | 2.9 | 2.7 | 1028 | 46 | 1.4 |
| 11 | MC-2000-Ox-U-Am100-700-Ar900 | E18 | 0.25 | 0.22 | 2.7 | 2.5 | 958 | 44 | 1.4 |
| 12 | MC-2100-Ox-U-Am100-700-Ar900 | E19 | 0.23 | 0.20 | 2.5 | 2.3 | 702 | 43 | 1.3 |
| 13 | AC2-1600-Ox-U-Am100-700-Ar900 | E20 | 0.13 | 0.12 | 1.9 | 1.7 | 315 | 48 | 1.2 |
| 14 | AC4-1600-Ox-U-Am100-700-Ar900 | E21 | 0.16 | 0.15 | 2.2 | 2 | 488 | 46 | 1.2 |
| 15 | AC6-1600-Ox-U-Am100-700-Ar900 | E22 | 0.22 | 0.19 | 2.5 | 2.3 | 622 | 45 | 1.3 |
| 16 | AC8-1600-Ox-U-Am100-700-Ar900 | E23 | 0.25 | 0.22 | 2.7 | 2.6 | 899 | 46 | 1.4 |
| 17 | AC8-1800-Ox-U-Am100-700-Ar900 | E24 | 0.20 | 0.18 | 2.4 | 2.1 | 654 | 41 | 1.5 |
| 18 | AC8-2000-Ox-U-Am100-700-Ar900 | E25 | 0.12 | 0.12 | 1.50 | 1.4 | 311 | 38 | 1.5 |

2. Preparation of Fuel Cell and Evaluation of Cell Performance

Using each of the above prepared carbon materials, a catalyst for solid-polymer fuel cell use on which a catalyst metal was carried was prepared in the following way. Furthermore, the obtained catalyst was used to prepare a catalyst layer ink solution. Next, this catalyst layer ink solution was used to form a catalyst layer and furthermore the formed catalyst layer was used to prepare a membrane electrode assembly (MEA). This prepared MEA was assembled into a fuel cell and tested for power generation using a fuel cell measuring apparatus. Below, details of the preparation of the members and tests will be explained concretely.

(1) Preparation of Catalyst for Solid-Polymer Fuel Cell

Each carbon material for catalyst carrier use of the examples and comparative examples was made to disperse in distilled water. To this dispersion, formaldehyde was added. The dispersion was set in a water bath set to 40° C. Next, when the temperature of the dispersion became the same 40° C. as the bath, while stirring, a dinitrodiamine Pt complex nitric acid aqueous solution was slowly poured into this dispersion. After that, the dispersion continued to be stirred for about 2 hours, then the dispersion was filtered and the obtained solids were washed. The thus obtained solids were dried at 90° C. in vacuum, then were crushed by a mortar. Next, the crushed solids were heat treated in a hydrogen atmosphere at 150° C. for 1 hour to prepare a catalyst for solid-polymer fuel cell use (Pt catalyst) for each of the examples and comparative examples.

Note that, the carried amounts of platinum of the PT catalysts of the examples and comparative examples were adjusted to 40 mass % with respect to the total mass of the carbon material for catalyst carrier use and platinum particles. Note that, the carried amount was measured by inductively coupled plasma-atomic emission spectrometry (ICP-AES).

(2) Preparation of Catalyst Layer

The Pt catalysts of the thus prepared examples and comparative examples and an electrolytic resin comprised of Nafion® made by Dupont (persulfonic acid-based ion exchange resin) were prepared. Next, in an Ar atmosphere, each Pt catalyst and Nafion were mixed in ratios of the mass of the Nafion solid component to the mass of the platinum catalyst particle carrying carbon material of 1.25. These were lightly stirred, then the Pt catalyst was crushed by ultrasonic waves. Furthermore, ethanol was added to the solids to give a total solid component concentration of the Pt catalyst and the electrolytic resin combined of 1.1 mass %. Due to the above steps, a catalyst layer ink solution comprised of a Pt catalyst and electrolytic resin mixed together was prepared.

To each thus prepared catalyst layer ink solution, furthermore ethanol was added to prepare a spray coating-use catalyst layer ink solution with a platinum concentration of 0.5 mass %. Next, the spray conditions were adjusted to give a mass per catalyst layer unit area of the platinum (below, referred to as "platinum basis weight") of 0.2 mg/cm². The spray coating-use catalyst layer ink was sprayed on a Teflon® sheet, then was treated to dry in argon at 120° C. for 60 minutes to prepare a catalyst layer of a Pt catalyst of each of the examples and comparative examples.

(3) Preparation of MEA

The above such prepared catalyst layers of the Pt catalyst were used to prepare an MEA (membrane electrode assembly) by the following method. A square piece of electrolytic film of 6 cm per side was cut out from a Nafion film (made by Dupont, NR211). Further, the catalyst layers of the anode and cathode coated on Teflon® sheets were respectively cut out by a cutter knife to square pieces of 2.5 cm per side.

Between the thus cut out catalyst layers of the anode and cathode, this electrolytic film was sandwiched so that the catalyst layers sandwiched and contacted the center part of the electrolytic film and were not offset from each other, the assembly was pressed at 120° C. by 100 kg/cm² for 10 minutes, then cooled down to room temperature, then only the Teflon® sheets were carefully peeled off at both the anode and cathode to prepare a catalyst layer-electrolytic film assembly with the catalyst layers of the anode and cathode fixed to the electrolytic film.

As the gas diffusion layers, a pair of square shaped pieces of carbon paper (made by SGL Carbon, 35BC) were cut out from the carbon paper in sizes of 2.5 cm per side. Between these pieces of carbon paper, the catalyst layer-electrolytic film assembly was sandwiched so that the anode and cathode catalyst layers were aligned with no offset. This was pressed at 120° C. by 50 kg/cm² for 10 minutes to prepare an MEA.

Note that, the basis weights of the different components of the catalyst metal component, carbon material, and electrolytic material in each MEA prepared were calculated by finding the mass of the catalyst layers fixed to the Nafion film (electrolytic film) from the difference of the mass of the Teflon® sheets with the catalyst layers before pressing and the mass of the Teflon® sheets peeled off after pressing and using the mass ratios of the compositions of the catalyst layers.

(4) Test for Evaluation of Performance of Fuel Cell

Each of the prepared MEAs of the examples and comparative examples was assembled into a cell and set in a fuel cell measurement apparatus to evaluate the performance of the fuel cell by the following routine: Regarding the gas, the cathode was supplied with air and, further, the anode was supplied with pure hydrogen, by pressurization to 0.2 atm (output side pressure) so as to respectively give rates of utilization of 40% and 70%. The cell temperature was set to 80° C. The supplied gas, both at the cathode side and anode side, was passed through a humidifier so that it was supplied to the cell along with saturated steam corresponding to the water temperature inside the humidifier. The state of humidity at this time was controlled by the temperature of the humidifier. The output at the time of a cell temperature of 80° C. and saturated humidity state was defined as the "output at time of high humidity", while the output at the time of the state of humidity corresponding to a relative humidity 30% was defined as the "output at time of low humidity". These output at time of high humidity and output at time of low humidity were used to evaluate the output characteristics.

Under conditions supplying gas to the cell under the above such settings, the load was gradually increased. The voltage across cell terminals at 1000 mA/cm² was recorded as the output voltage and the fuel cell was evaluated for performance based on this.

From the obtained results of the evaluation of performance of the "output at time of high humidity" and "output at time of low humidity", the cell performance of the fuel cell was evaluated by the following criteria.

"E (Excellent)": Output voltages at 1000 mA/cm² at time of high humidity and at time of low humidity are both 0.65V or more "VG (Very Good)": Output voltages at 1000 mA/cm² at time of high humidity and at time of low humidity are 0.60V to less than 0.65V "G (Good)": Output voltages at 1000 mA/cm² at time of high humidity and at time of low humidity are both 0.45V to less than 0.60V "B (Bad)": Output voltages at 1000 mA/cm² at time of high humidity and at time of low humidity are both less than 0.45V (5) Durability Test of Fuel Cell As the durability test, under the conditions of the "output at time of high humidity", the voltage across cell terminals was held at 1.0V for 1.5 seconds in the measurement mode of a constant output voltage, then the voltage across cell terminals was raised to 1.35V and held there for 1.5 seconds, then the voltage across cell terminals was returned to the original 1.0V. The cycle was repeated 3000 times, then the cell performance was measured in the same way as the case of the test for evaluation of performance of the "output at time of high humidity" before the durability test.

The ratio of the cell voltage after the durability test to the cell voltage before the durability test was defined as the output maintenance rate and shown by a percentage (%). This was used as an indicator of evaluation of the durability. The case where this output maintenance rate is less than 80% is defined as failing, the case where it is 80% or more is defined as passing, and the case where it is 85% or more is defined as particularly good.

Further, the prepared carbon materials of the examples and comparative examples were evaluated as a whole as follows based on the results of the above performance evaluation tests and durability tests.

"E (Excellent)": Cell performance is evaluated as "VG (Very Good)" or "E (Excellent)" and rate of maintenance of output in evaluation of durability is 85% or more or cell performance is evaluated as "E (Excellent)" and rate of maintenance of output in evaluation of durability is 80% to less than 85%, "VG (Very Good)": Cell performance is evaluated as "G (Good)" and rate of maintenance of output in evaluation of durability is 85% or more or cell performance is evaluated as "VG (Very Good)" and rate of maintenance of output in evaluation of durability is 80% to less than 85%, "G (Good)": Cell performance is evaluated as "G (Good)" and rate of maintenance of output in evaluation of durability is 80% to less than 85%, "B (Bad)": Cell performance is evaluated as "G (Good)" or "VG (Very Good)" and rate of maintenance of output in evaluation of durability is less than 80%

The results of the performance evaluation tests and durability tests and the results of the overall evaluations of the above prepared carbon materials of the examples and comparative examples are shown in Table 9.

TABLE 9

| | | Carbon material for catalyst carrier use | Type | Evaluation of fuel cell performance | | | Evaluation of durability Output maintenance rate (%) | Overall evaluation |
|---|---|---|---|---|---|---|---|---|
| | | | | High humidity output (V) | Low humidity output (V) | Eval. | | |
| Comp. ex. | 1 | EJ-1800-U | E1 | 0.57 | 0.56 | G | 55 | B |
| | 2 | EJ-1800-U-Ar100-300 | E2 | 0.61 | 0.60 | VG | 58 | B |
| | 3 | EJ-1800-U-Ar100-400 | E3 | 0.62 | 0.61 | VG | 58 | B |
| | 4 | EJ-1800-U-Ar100-1200 | E4 | 0.58 | 0.53 | G | 81 | G |
| | 5 | EJ-1800-U-Ar100-1300 | E5 | 0.57 | 0.51 | G | 81 | G |
| | 6 | EJ-1800-U-Am100-1200 | E6 | 0.58 | 0.54 | G | 81 | G |
| | 7 | EJ-1800-U-Am100-1300 | E7 | 0.58 | 0.52 | G | 81 | G |
| Ex. | 1 | EJ-1800-Ox-X-Am100-700-Ar900 | E8 | 0.64 | 0.64 | VG | 86 | E |
| | 2 | EJ-2000-Ox-X-Am100-700-Ar900 | E9 | 0.63 | 0.63 | VG | 89 | E |
| | 3 | EJ-2200-Ox-X-Am100-700-Ar900 | E10 | 0.62 | 0.62 | VG | 89 | E |
| | 4 | EJ-2400-Ox-X-Am100-700-Ar900 | E11 | 0.61 | 0.61 | VG | 91 | E |
| | 5 | EJ-1800-Ox-U-Am100-700-Ar900 | E12 | 0.63 | 0.63 | VG | 87 | E |
| | 6 | EJ-2000-Ox-U-Am100-700-Ar900 | E13 | 0.65 | 0.63 | VG | 88 | E |
| | 7 | EJ-2200-Ox-U-Am100-700-Ar900 | E14 | 0.64 | 0.63 | VG | 88 | E |
| | 8 | EJ-2400-Ox-U-Am100-700-Ar900 | E15 | 0.62 | 0.61 | VG | 89 | E |
| | 9 | MC-1800-Ox-U-Am100-700-Ar900 | E16 | 0.66 | 0.65 | VG | 89 | E |

TABLE 9-continued

|  | Carbon material for catalyst carrier use | Type | Evaluation of fuel cell performance | | | Evaluation of durability Output | |
|---|---|---|---|---|---|---|---|
|  |  |  | High humidity output (V) | Low humidity output (V) | Eval. | maintenance rate (%) | Overall evaluation |
| 10 | MC-1900-Ox-U-Am100-700-Ar900 | E17 | 0.66 | 0.65 | VG | 88 | E |
| 11 | MC-2000-Ox-U-Am100-700-Ar900 | E18 | 0.67 | 0.65 | VG | 87 | E |
| 12 | MC-2100-Ox-U-Am100-700-Ar900 | E19 | 0.65 | 0.64 | VG | 89 | E |
| 13 | AC2-1600-Ox-U-Am100-700-Ar900 | E20 | 0.65 | 0.64 | VG | 86 | E |
| 14 | AC4-1600-Ox-U-Am100-700-Ar900 | E21 | 0.66 | 0.65 | VG | 87 | E |
| 15 | AC6-1600-Ox-U-Am100-700-Ar900 | E22 | 0.67 | 0.66 | VG | 89 | E |
| 16 | AC8-1600-Ox-U-Am100-700-Ar900 | E23 | 0.66 | 0.65 | VG | 90 | E |
| 17 | AC8-1800-Ox-U-Am100-700-Ar900 | E24 | 0.64 | 0.64 | VG | 89 | E |
| 18 | AC8-2000-Ox-U-Am100-700-Ar900 | E25 | 0.66 | 0.65 | VG | 91 | E |

From the above results, it was learned that the carbon material for catalyst carrier use obtained by the fourth embodiment is useful as a carbon material for catalyst carrier use for a solid-polymer fuel cell.

5. Example 5

Example 5 will be explained. Example 5 is an example corresponding to the above-mentioned fifth embodiment. Note that, in Example 5, the (A) boron content $B_{ICP}$ contained in the carbon material (mass %), (B) oxygen content $O_{ICP}$ contained in carbon material and $O_{900° C.}$ after heat treatment in inert gas atmosphere at 900° C. (mass %), (C) BET specific surface area $S_{BET}$ (m²/g), (D) G-band half-width ΔG detected in a range of 1550 to 1650 cm$^{-1}$ of the Raman spectrum (cm$^{-1}$), and the intensity ratio (BO/BC) of the peak (BO) corresponding to the B—O bonds near the binding energy 192 eV in the $B_{1s}$ spectrum and the peak (BC) corresponding to the B—C bonds near the binding energy 186 eV ($B_{1s}$ spectrum intensity ratio (BO/BC)) were respectively measured by the following methods:

Measurement of Boron Content $B_{ICP}$

The boron content $B_{ICP}$ (mass %) contained in the carbon material was measured using a usual ICP analysis apparatus. Specifically, the carbon material was burned in the air to remove the carbon from the carbon material. Next, the remaining boron oxide was dissolved in water to obtain an aqueous solution. This aqueous solution was used for analysis.

Measurement of Oxygen Content $O_{ICP}$

The oxygen content $O_{155}$ (mass %) was measured using an analysis apparatus comprised of a Model RH402 made by LECO. The usual inert gas fusion-thermal conductivity method used for measurement of C, H, O, and N was used for the measurement.

Measurement of Residual Amount Of Oxygen $O_{1200° C.}$ Remaining After Heat Treatment in Inert Gas (or Vacuum) Atmosphere at 1200° C.

A sample was set in a graphitization furnace through which argon gas was circulated, was raised the furnace temperature by 15° C./min, and was held at 1200° C. for 1 hour. After that, while running argon through the inside of the furnace, the inside of the furnace was cooled to room temperature, then the sample was taken out. The amount of oxygen in this sample was measured in the same way as the above-mentioned measurement of the oxygen content. Further, the measured amount of oxygen was made the residual amount of oxygen $O_{1200° C.}$ remaining after heat treatment in an inert atmosphere at 1200° C.

Measurement of Residual Amount of Oxygen $O_{900° C.}$

A sample was set in a graphitization furnace through which argon gas was circulated, was raised the furnace temperature by 10° C./min, and was held at 900° C. for 1 hour. After that, while running argon through the inside of the furnace, the inside of the furnace was cooled to room temperature, then the sample was taken out. The amount of the nitrogen in the sample was measured by a method similar to the above-mentioned measurement of the oxygen content $O_{ICP}$. Further, the measured amount of nitrogen was made the residual amount of oxygen $O_{900° C.}$ after heat treatment in an inert gas atmosphere at 900° C.

Measurement of BET Specific Surface Area $S_{BET}$

The BET specific surface area $S_{BET}$ (m²/g) was measured in the following way. That is, about 50 mg of a sample was weighed out and dried at 90° C. for 2 hours in a vacuum. Further, the obtained dried sample was set in an automatic specific surface area measurement apparatus (BELSO-RPmini made by Bel Japan) and an adsorption isotherm was prepared by the gas adsorption method using nitrogen gas. Next, this adsorption isotherm was analyzed by the attached BET analysis software to measure the BET specific surface area.

Measurement of G-Band Half-Width of Raman Spectrum

The G-band half-width of the Raman spectrum (cm$^{-1}$) was measured as follows. That is, about 3 g of a sample was weighed out and a laser Raman spectrometer (made by JASCO, NRS-7100) was used under measurement conditions of an excitation laser of 532 nm, a laser power of 100 mW (sample irradiation power: 0.1 mW), collection mode: backscattering, slit: 100 μm×100 μm, object lens: ×100, spot size: 1 μm, exposure time: 30 sec, observed wave number: 3200 to 750 cm$^{-1}$, cumulative times: 2 to measure the Raman spectrum. The G-band half-width was calculated based on the measurement results.

Calculation of $B_{1s}$ Spectrum Intensity Ratio (BO/BC)

XPS measurement was performed using an X-ray photoelectron spectrometer (Quantum 2000 model scan type X-ray photoelectronic spectrometer μ-ESCA made by ULVAC-PHI). 5 to 10 mg of a sample was weighed out, buried in indium metal, and irradiated by X-rays in a 300 μm square range. For the X-ray source, Kα rays of Al (14866.6 eV) were used. Measurement was performed by an output of 15 kV 25 W. A range of a binding energy of 170 to 204 eV corresponding to the $B_{1s}$ path was measured. The intensity of the peak (BO) corresponding to the B—O bonds near 192 eV and the intensity of the peak (BC) corresponding to the B—C bonds near the binding energy 186 eV were found. The ratio was found from the intensity of the peak (BO) and the intensity of the peak (BC).

1. Preparation of Carbon Material for Catalyst Carrier Use
(1) Preparation of Starting Carbon Material
(1) Preparation of Porous Carbon Material A porous carbon material obtained by heat treating Ketjen Black EC600JD made by Lion Corporation in a stream of $CO_2$ at 1000° C. for 3 hours (below, abbreviated as "EJ-ac"), a porous carbon material comprised of ESCARBON MCND made by Nippon Steel & Sumikin Chemical (below, abbreviated as "MC"), and a porous carbon material obtained by heat treating Tokablack GSVH made by Tokai Carbon in a flow of $CO_2$ at 1000° C. for 6 hours and furthermore at 1100° C. for 2 hours to activate it (below, abbreviated as "AC") were respectively prepared. Note that, the BET specific surface areas of EJ-ac, MC, and AC were respectively 1950, 1660, and 1220 m²/g.

(2) Control of Crystallinity of Porous Carbon Material

To improve the crystallinity of a porous carbon material prepared above, a graphitization furnace (Tammann type graphitization furnace made by Shinsei Denro) was used to heat treat the material under a stream of argon gas at 1600 to 2200° C. for 1 hour to prepare the starting carbon material. The thus prepared heat treated starting carbon material is, for example, when the heat treated starting carbon material is obtained by treating EJ-ac at a heat treatment temperature of 1800° C., denoted as "EJ-ac-1800".

(2) Boron Source Carrying Step Making Surface of Starting Carbon Material Carry Boron Source
(1) Carrying Treatment A As the boron source, the organic boron-containing compound of 9-anthraceneboronic acid (made by Tokyo Chemical) was prepared. 1.0 to 6.0 g of this boron source was dissolved in methanol to prepare a boron source solution, 2.0 g of the above prepared starting carbon material was added into the obtained boron source solution, and the mixture was fully stirred. After that, the solvent in the dispersion was made to evaporate until the carbon material became dry by an evaporator. Due to this, a boron source-carrying carbon material carrying the boron source of 9-anthraceneboronic acid was prepared. The thus prepared boron source-carrying carbon material is for example denoted as "EJ-ac-1800-AA".

(2) Carrying Treatment B

As the boron source, the organic boron-containing compound of 1-butanaminium-N,N,N-tributyl-(T-4)-butyltris[4-(1,1-dimethylethyl)phenyl]borate (1-) (product name BP3 made by Showa Denko) was prepared. 1.0 to 7.0 g of this boron source was dissolved in acetone to prepare a boron source solution, 2.0 g of the above prepared starting carbon material was added into the obtained boron source solution, and the mixture was fully stirred. After that, the solvent in the dispersion was made to evaporate until the carbon material became dry by an evaporator. Due to this, a boron source-carrying carbon material carrying the boron source of BP3 was prepared. The thus prepared boron source-carrying carbon material is for example denoted as "EJ-ac-1800-BP".

(3) Boron Introducing Step Causing Boron to Diffuse to Inside of Starting Carbon Material In an inert gas atmosphere (Ar) using argon gas as an inert gas, the boron source-carrying carbon material was heat treated at 1500 to 2300° C. for 1 to 10 hours to prepare a boron-containing carbon material comprised of the starting carbon material inside of which boron was introduced. The thus prepared boron-containing carbon material was for example denoted as "EJ-ac-1800-AA-1700".

(4) Oxygen Content Adjusting Step Adjusting Oxygen Content of Boron-Containing Carbon Material Using an oxidizing gas comprising nitrogen gas with an oxygen concentration of 1 to 10 vol %, the boron-containing carbon material was heated in this oxidizing gas atmosphere at 300° C. for 2 hours as oxidation treatment. After that, the atmosphere was switched to an inert gas atmosphere (Ar) using argon as an inert gas and the boron-containing carbon material was heat treated at 900 to 1200° C. for 1 hour. Due to the above steps, a carbon material for catalyst carrier use with an adjusted oxygen content was prepared. For example, when using an oxidizing gas comprised of nitrogen gas with a 1 vol % oxygen concentration for oxidation treatment, then heat treating the material at 900° C. in an inert gas atmosphere using argon gas, the carbon material for catalyst carrier use is denoted such as "EJ-ac-1800-AA-1700-01-900".

The above such obtained carbon materials for a catalyst carrier of Examples 5-30 and Comparative Examples 5-1 to 5-13 are shown together with their symbols in Tables 7 to 9.

Further, the boron content $B_{ICP}$ (mass %), oxygen content $O_{ICP}$ (mass %), residual amount of oxygen $O_{900° C.}$ (mass %), BET specific surface area $S_{BET}$ (m²/g), G-band half-width $\Delta G$ (cm$^{-1}$), and $B_{1s}$ intensity ratio BO/BC of the carbon materials for a catalyst carrier according to Examples 5-1 to 5-30 and Comparative Examples 5-1 to 5-13 were measured.

The results of Examples 5-1 to 5-20 and Comparative Examples 5-1 to 5-13 (all EJ-ac) are shown in Table 10, the results of Examples 5-21 to 5-25 (MC) are shown in Table 11, and the results of Examples 5-26 to 5-30 (AC) are shown in Table 12.

TABLE 10

| | | Carbon material for catalyst carrier use | | $B_{ICP}$ | $O_{ICP}$ | $O_{1200° C.}$ | $S_{BET}$ | $\Delta G$ | $B_{1s}$ intensity ratio | $O_{900° C.}$ |
|---|---|---|---|---|---|---|---|---|---|---|
| | | Symbol | Type | (mass %) | (mass %) | (mass %) | (m²/g) | (cm$^{-1}$) | (BO/BC) | (mass %) |
| Comp. ex. | 5-1 | EJ-ac-1600 | E1 | <0.1 | <0.1 | <0.1 | 1105 | 52 | — | <0.1 |
| | 5-2 | EJ-ac-1800 | E2 | <0.1 | <0.1 | <0.1 | 925 | 42 | — | <0.1 |
| | 5-3 | EJ-ac-2000 | E3 | <0.1 | <0.1 | <0.1 | 735 | 32 | — | <0.1 |
| | 5-4 | EJ-ac-2200 | E4 | <0.1 | <0.1 | <0.1 | 285 | 28 | — | <0.1 |
| | 5-5 | EJ-ac-1800-AA-1500 | E5 | 1.8 | <0.1 | <0.1 | 755 | 38 | <0.1 | <0.1 |
| | 5-6 | EJ-ac-1800-AA-1800 | E6 | 3.6 | <0.1 | <0.1 | 510 | 31 | <0.1 | <0.1 |
| | 5-7 | EJ-ac-1800-AA-1500-05-500 | E7 | 1.8 | 3.2 | 0.35 | 620 | 38 | 1.5 | 2.2 |
| | 5-8 | EJ-ac-1800-AA-1500-05-1300 | E8 | 1.8 | 0.1 | 1.9 | 620 | 38 | 0.4 | 0.1 |
| | 5-9 | EJ-ac-1800-AA-1300-05-500 | E9 | 0.2 | 0.8 | <0.1 | 785 | 35 | 0.9 | 0.8 |
| | 5-10 | EJ-ac-1800-AA-2100-05-500 | E10 | 5.3 | 0.4 | <0.1 | 215 | 27 | 0.3 | 0.4 |
| Ex. | 5-1 | EJ-ac-1600-AA-1300-05-900 | E11 | 0.6 | 2.8 | 0.21 | 955 | 47 | 1.3 | 1.6 |
| | 5-2 | EJ-ac-1600-AA-1500-05-900 | E12 | 2.1 | 1.7 | 0.19 | 910 | 44 | 1.2 | 1.6 |
| | 5-3 | EJ-ac-1800-AA-1300-05-900 | E13 | 0.4 | 2.3 | 0.18 | 805 | 38 | 1.0 | 1.4 |

TABLE 10-continued

| | Carbon material for catalyst carrier use | | $B_{ICP}$ | $O_{ICP}$ | $O_{1200°C.}$ | $S_{BET}$ | $\Delta G$ | $B_{1s}$ intensity ratio | $O_{900°C.}$ |
|---|---|---|---|---|---|---|---|---|---|
| | Symbol | Type | (mass %) | (mass %) | (mass %) | (m²/g) | (cm⁻¹) | (BO/BC) | (mass %) |
| 5-4 | EJ-ac-1800-AA-1500-05-900 | E14 | 1.8 | 1.4 | 0.16 | 750 | 38 | 0.8 | 1.4 |
| 5-5 | EJ-ac-2000-AA-1500-05-900 | E15 | 0.9 | 1.1 | 0.15 | 565 | 30 | 0.9 | 1.1 |
| 5-6 | EJ-ac-1800-AA-1700-05-900 | E16 | 3.2 | 0.8 | 0.15 | 615 | 31 | 0.6 | 0.8 |
| 5-7 | EJ-ac-1800-AA-1900-05-900 | E17 | 4.2 | 0.6 | 0.15 | 425 | 30 | 0.3 | 0.6 |
| 5-8 | EJ-ac-1800-AA-1500-02-900 | E18 | 1.8 | 1.0 | 0.12 | 750 | 38 | 0.6 | 1.0 |
| 5-9 | EJ-ac-1800-AA-1500-04-900 | E19 | 1.8 | 1.3 | 0.14 | 745 | 38 | 0.7 | 1.3 |
| 5-10 | EJ-ac-1800-AA-1500-06-900 | E20 | 1.8 | 1.8 | 0.19 | 760 | 38 | 0.9 | 1.8 |
| 5-11 | EJ-ac-1800-AA-1500-08-900 | E21 | 1.8 | 2.1 | 0.31 | 765 | 38 | 1.2 | 2.1 |
| 5-12 | EJ-ac-1800-AA-1500-10-900 | E22 | 1.8 | 2.9 | 0.45 | 785 | 38 | 1.5 | 2.8 |
| 5-13 | EJ-ac-1800-AA-1500-05-700 | E23 | 1.8 | 1.8 | 0.27 | 755 | 38 | 0.9 | 1.4 |
| 5-14 | EJ-ac-1800-AA-1500-05-1100 | E24 | 1.8 | 1.1 | 0.17 | 750 | 38 | 0.7 | 1.1 |
| 5-15 | EJ-ac-1800-BP-1500-05-900 | E25 | 2.1 | 1.8 | 0.24 | 785 | 41 | 1.1 | 1.8 |
| 5-16 | EJ-ac-1800-BP-1600-05-900 | E26 | 2.6 | 1.5 | 0.24 | 735 | 39 | 0.9 | 1.5 |
| 5-17 | EJ-ac-1800-BP-1700-05-900 | E27 | 3.2 | 1.2 | 0.24 | 690 | 37 | 0.7 | 1.2 |
| 5-18 | EJ-ac-1800-BP-1700-07-900 | E28 | 3.2 | 1.5 | 0.31 | 695 | 37 | 0.9 | 1.5 |
| 5-19 | EJ-ac-1800-BP-1700-07-1000 | E29 | 3.2 | 1.3 | 0.25 | 695 | 37 | 0.7 | 1.3 |
| 5-20 | EJ-ac-1800-BP-1700-07-1100 | E30 | 3.2 | 0.9 | 0.21 | 695 | 37 | 0.5 | 0.9 |

TABLE 11

| | Carbon material for catalyst carrier use | | $B_{ICP}$ | $O_{ICP}$ | $O_{1200°C.}$ | $S_{BET}$ | $\Delta G$ | $B_{1s}$ intensity ratio | $O_{900°C.}$ |
|---|---|---|---|---|---|---|---|---|---|
| | Symbol | Type | (mass %) | (mass %) | (mass %) | (m²/g) | (cm⁻¹) | (BO/BC) | (mass %) |
| Ex. 5-21 | MC-1600-BP-1300-04-900 | M1 | 1.2 | 1.5 | 0.33 | 955 | 46 | 1.1 | 1.5 |
| 5-22 | MC-1600-BP-1500-06-900 | M2 | 2.9 | 1.7 | 0.31 | 910 | 42 | 0.9 | 1.7 |
| 5-23 | MC-1800-BP-1400-06-900 | M3 | 1.3 | 1.6 | 0.38 | 805 | 37 | 0.8 | 1.6 |
| 5-24 | MC-1800-BP-1600-06-900 | M4 | 2.2 | 1.2 | 0.27 | 750 | 35 | 0.7 | 1.2 |
| 5-25 | MC-1900-BP-1600-06-1000 | M5 | 1.8 | 0.9 | 0.22 | 620 | 32 | 0.5 | 0.9 |

TABLE 12

| | Carbon material for catalyst carrier use | | $B_{ICP}$ | $O_{ICP}$ | $O_{1200°C.}$ | $S_{BET}$ | $\Delta G$ | $B_{1s}$ intensity ratio | $O_{900°C.}$ |
|---|---|---|---|---|---|---|---|---|---|
| | Symbol | Type | (mass %) | (mass %) | (mass %) | (m²/g) | (cm⁻¹) | (BO/BC) | (mass %) |
| Ex. 5-26 | AC-1600-BP-1300-04-900 | A1 | 0.7 | 1.8 | 0.35 | 925 | 42 | 1.1 | 1.8 |
| 5-27 | AC-1600-BP-1500-06-900 | A2 | 1.2 | 1.6 | 0.32 | 870 | 38 | 0.9 | 1.6 |
| 5-28 | AC-1800-BP-1400-06-900 | A3 | 1.0 | 1.4 | 0.42 | 805 | 35 | 0.8 | 1.4 |
| 5-29 | AC-1800-BP-1600-06-900 | A4 | 1.8 | 1.4 | 0.18 | 750 | 33 | 0.6 | 1.4 |
| 5-30 | AC-1900-BP-1600-06-1000 | A5 | 1.5 | 0.8 | 0.14 | 565 | 31 | 0.5 | 0.8 |

2. Preparation of Fuel Cell and Evaluation of Cell Performance

Using each of the carbon materials for a catalyst carrier of Examples 5-1 to 5-30 and Comparative Examples 5-1 to 5-13 prepared in the above way, a catalyst for solid-polymer fuel cell use on which a catalyst metal was carried was prepared in the following way. Next, the obtained catalyst was used to prepare a catalyst layer ink solution. Next, this catalyst layer ink solution was used to form a catalyst layer and furthermore the formed catalyst layer was used to prepare a membrane electrode assembly (MEA). Each prepared MEA was assembled into a fuel cell and tested for power generation using a fuel cell measuring apparatus. Below, details of the preparation of the members and tests will be explained concretely.

(1) Preparation of Catalyst for Solid-Polymer Fuel Cell

Each carbon material for catalyst carrier use of the examples and comparative examples was made to disperse in distilled water. To this dispersion, formaldehyde was added. The dispersion was set in a water bath set to 40° C. Next, when the temperature of the dispersion became the same 40° C. as the bath, while stirring, a dinitrodiamine Pt complex nitric acid aqueous solution was slowly poured into this dispersion. After that, the dispersion continued to be stirred for about 2 hours, then the dispersion was filtered and the obtained solids were washed. The thus obtained solids were dried at 90° C. in vacuum, then were crushed by a mortar. Next, the crushed solids were heat treated in a hydrogen atmosphere at 150° C. for 1 hour to prepare a catalyst for solid-polymer fuel cell use (Pt catalyst) for each of the examples and comparative examples.

Note that, the carried amounts of platinum of the PT catalysts of the examples and comparative examples were adjusted to 40 mass % with respect to the total mass of the carbon material for catalyst carrier use and platinum particles. Note that, the carried amount was measured by inductively coupled plasma-atomic emission spectrometry (ICP-AES).

(2) Preparation of Catalyst Layer

The Pt catalysts of the thus prepared examples and comparative examples and an electrolytic resin comprised of Nafion® made by Dupont (persulfonic acid-based ion exchange resin) were prepared. Next, in an Ar atmosphere, each Pt catalyst and Nafion were mixed in ratios of the mass of the Nafion solid component to the mass of the platinum catalyst particle carrying carbon material of 1.25. These were lightly stirred, then the Pt catalyst was crushed by ultrasonic waves. Furthermore, ethanol was added to the solids to give a total solid component concentration of the Pt catalyst and the electrolytic resin combined of 1.1 mass %. Due to the above steps, a catalyst layer ink solution comprised of a Pt catalyst and electrolytic resin mixed together was prepared.

To each of the thus prepared catalyst layer ink solutions, furthermore ethanol was added to prepare a spray coating-use catalyst layer ink solution with a platinum concentration of 0.5 mass %. Next, the spray conditions were adjusted to give a mass of platinum per catalyst layer unit area (below, referred to as "platinum basis weight") of 0.2 mg/cm$^2$, the spray coating-use catalyst layer ink was sprayed on a Teflon® sheet, then the result was dried in argon at 120° C. for 60 minutes to prepare a catalyst layer of a Pt catalyst of each of the examples and comparative examples.

(3) Preparation of MEA

Each of the thus prepared catalyst layers of a Pt catalyst was used to prepare an MEA (membrane electrode assembly) by the following method.

A square piece of electrolytic film of 6 cm per side was cut out from a Nafion film (made by Dupont, NR211). Further, the catalyst layers of the anode and cathode coated on Teflon® sheets were respectively cut out by a cutter knife to square pieces of 2.5 cm per side.

Between the thus cut out catalyst layers of the anode and cathode, this electrolytic film was sandwiched so that the catalyst layers sandwiched and contacted the center part of the electrolytic film and were not offset from each other, the assembly was pressed at 120° C. by 100 kg/cm$^2$ for 10 minutes, then cooled down to room temperature, then only the Teflon® sheets were carefully peeled off at both the anode and cathode to prepare a catalyst layer-electrolytic film assembly with the catalyst layers of the anode and cathode fixed to the electrolytic film.

As the gas diffusion layers, a pair of square shaped pieces of carbon paper (made by SGL Carbon, 35BC) were cut out from the carbon paper in sizes of 2.5 cm per side. Between these pieces of carbon paper, the catalyst layer-electrolytic film assembly was sandwiched so that the anode and cathode catalyst layers were aligned with no offset. This was pressed at 120° C. by 50 kg/cm$^2$ for 10 minutes to prepare an MEA.

Note that, the basis weights of the different components of the catalyst metal component, carbon material, and electrolytic material in each MEA prepared were calculated by finding the mass of the catalyst layers fixed to the Nafion film (electrolytic film) from the difference of the mass of the Teflon® sheets with the catalyst layers before pressing and the mass of the Teflon® sheets with the catalyst layers after pressing and using the mass ratios of the compositions of the catalyst layers.

(4) Performance Evaluation Test of Fuel Cell

Each of the prepared MEAs of the examples and comparative examples was assembled into a cell and set in a fuel cell measurement apparatus to evaluate the performance of the fuel cell by the following routine:

Regarding the gas, the cathode was supplied with air and, further, the anode was supplied with pure hydrogen, by pressurization to 0.2 atm (output side pressure) so as to respectively give rates of utilization of 40% and 70%. The cell temperature was set to 80° C. The gas supplied, both at the cathode side and anode side, was passed through a humidifier so that it was supplied to the cell along with saturated steam corresponding to the water temperature inside the humidifier. The humidity state at this time was controlled by the temperature of the humidifier. The output at the time of a saturated humidity state at a cell temperature of 80° C. was made the "output at time of high humidity", and, further, the output at the time of a humidity state corresponding to a relative humidity of 30% was made the "output at time of low humidity". These output at time of high humidity and output at time of low humidity were used to evaluate the output characteristics.

Under conditions supplying gas to the cell under the above such settings, the load was gradually increased. The voltage across cell terminals at 1000 mA/cm$^2$ was recorded as the output voltage and the fuel cell was evaluated for performance based on this.

From the obtained results of the evaluation of performance of the "output at time of high humidity" and "output at time of low humidity", the cell performance of the fuel cell was evaluated by the following criteria.

"E (Excellent)": Output voltages at 1000 mA/cm$^2$ at time of high humidity and at time of low humidity are both 0.65V or more "VG (Very Good)": Output voltages at 1000 mA/cm$^2$ at time of high humidity and at time of low humidity are 0.60V to less than 0.65V "G (Good)": Output voltages at 1000 mA/cm$^2$ at time of high humidity and at time of low humidity are both 0.45V to less than 0.60V "B (Bad)": Output voltages at 1000 mA/cm$^2$ at time of high humidity and at time of low humidity are both less than 0.45V (5) Durability Test of Fuel Cell As the durability test, under the conditions of the "output at time of high humidity", in the measurement mode of a constant output voltage, the voltage across cell terminals was held at 1.0V for 1.5 seconds, then the voltage across cell terminals was raised to 1.35V and held there for 1.5 seconds, then the voltage across cell terminals was returned to the original 1.0V. The cycle was repeated 3000 times, then the cell performance was measured in the same way as the case of the test for evaluation of performance of the "output at time of high humidity" before the durability test.

The ratio of the cell voltage after the durability test to the cell voltage before the durability test was defined as the output maintenance rate and shown by a percentage (%). This was used as an indicator of evaluation of the durability. The case where this output maintenance rate is less than 80% is defined as failing, the case where it is 80% or more is defined as passing, and the case where it is 85% or more is defined as particularly good.

Further, the prepared carbon materials of the examples and comparative examples were evaluated as a whole as follows based on the results of the above performance evaluation tests and durability tests.

"E (Excellent)": Cell performance is evaluated as "VG (Very Good)" or "E (Excellent)" and rate of maintenance of output in evaluation of durability is 85% or more or cell performance is evaluated as "E (Excellent)" and rate of maintenance of output in evaluation of durability is 80% to less than 85%, "VG (Very Good)": Cell performance is evaluated as "G (Good)" and rate of maintenance of output in evaluation of durability is 85% or more or cell performance is evaluated as "VG (Very Good)" and rate of maintenance of output in evaluation of durability is 80% to less than 85%, "G (Good)": Cell performance is evaluated as "G (Good)" and rate of maintenance of output in evaluation of durability is 80% to less than 85%, "B (Bad)": Cell performance is evaluated as "G (Good)" or "VG (Very Good)" and rate of maintenance of output in evaluation of durability is less than 80%

The results of Examples 5-1 to 5-20 and Comparative Examples 5-1 to 5-13 are shown in Table 13, the results of Examples 5-21 to 5-25 are shown in Table 14, and the results of Examples 5-26 to 5-30 are shown in Table 15.

TABLE 13

|  |  | Type | Eval. | Evaluation of cell performance | | Evaluation of durability | |
|---|---|---|---|---|---|---|---|
|  |  |  |  | High humidity output (V) | Low humidity output (V) | Output maintenance rate (%) | Overall evaluation |
| Comp. ex. | 5-1 | E1 | G | 0.64 | 0.53 | 69 | B |
|  | 5-2 | E2 | G | 0.62 | 0.48 | 78 | B |
|  | 5-3 | E3 | G | 0.57 | 0.41 | 78 | B |
|  | 5-4 | E4 | B | 0.47 | 0.36 | 75 | B |
|  | 5-5 | E5 | B | 0.58 | 0.33 | 83 | B |
|  | 5-6 | E6 | B | 0.56 | 0.35 | 85 | B |
|  | 5-7 | E7 | G | 0.56 | 0.55 | 82 | G |
|  | 5-8 | E8 | G | 0.52 | 0.42 | 81 | G |
|  | 5-9 | E9 | G | 0.61 | 0.58 | 76 | G |
|  | 5-10 | E10 | B | 0.45 | 0.32 | 84 | B |
| Ex. | 5-1 | E11 | VG | 0.61 | 0.62 | 81 | VG |
|  | 5-2 | E12 | VG | 0.62 | 0.61 | 85 | E |
|  | 5-3 | E13 | VG | 0.63 | 0.62 | 83 | VG |
|  | 5-4 | E14 | E | 0.67 | 0.65 | 86 | E |
|  | 5-5 | E15 | VG | 0.63 | 0.61 | 84 | VG |
|  | 5-6 | E16 | E | 0.66 | 0.65 | 88 | E |
|  | 5-7 | E17 | VG | 0.63 | 0.60 | 88 | E |
|  | 5-8 | E18 | VG | 0.65 | 0.61 | 88 | E |
|  | 5-9 | E19 | E | 0.67 | 0.66 | 88 | E |
|  | 5-10 | E20 | E | 0.67 | 0.65 | 87 | E |
|  | 5-11 | E21 | E | 0.66 | 0.65 | 86 | E |
|  | 5-12 | E22 | VG | 0.65 | 0.63 | 84 | VG |
|  | 5-13 | E23 | E | 0.68 | 0.66 | 85 | E |
|  | 5-14 | E24 | VG | 0.65 | 0.63 | 84 | VG |
|  | 5-15 | E25 | E | 0.69 | 0.67 | 86 | E |
|  | 5-16 | E26 | E | 0.68 | 0.67 | 87 | E |
|  | 5-17 | E27 | E | 0.68 | 0.66 | 88 | E |
|  | 5-18 | E28 | E | 0.67 | 0.66 | 87 | E |
|  | 5-19 | E29 | E | 0.66 | 0.65 | 87 | E |
|  | 5-20 | E30 | VG | 0.65 | 0.62 | 86 | E |

TABLE 14

|  |  | Type | Eval. | Evaluation of cell performance | | Evaluation of durability | |
|---|---|---|---|---|---|---|---|
|  |  |  |  | High humidity output (V) | Low humidity output (V) | Output maintenance rate (%) | Overall evaluation |
| Ex. | 5-21 | M1 | VG | 0.67 | 0.64 | 85 | E |
|  | 5-22 | M2 | E | 0.69 | 0.67 | 87 | E |
|  | 5-23 | M3 | E | 0.69 | 0.67 | 87 | E |
|  | 5-24 | M4 | E | 0.68 | 0.65 | 89 | E |
|  | 5-25 | M5 | VG | 0.65 | 0.63 | 87 | E |

TABLE 15

|  |  | Type | Eval. | Evaluation of cell performance | | Evaluation of durability | |
|---|---|---|---|---|---|---|---|
|  |  |  |  | High humidity output (V) | Low humidity output (V) | Output maintenance rate (%) | Overall evaluation |
| Ex. | 5-26 | A1 | E | 0.67 | 0.66 | 81 | E |
|  | 5-27 | A2 | E | 0.68 | 0.67 | 84 | E |
|  | 5-28 | A3 | E | 0.67 | 0.66 | 85 | E |
|  | 5-29 | A4 | E | 0.67 | 0.65 | 88 | E |
|  | 5-30 | A5 | VG | 0.62 | 0.60 | 89 | E |

From the results shown in the above Tables 13 to 15, it was learned that the catalysts using the porous carbon material according to Examples 5-1 to 5-30 of the present invention as the catalyst carriers all exhibited excellent solid-polymer fuel cell characteristics.

Above, while referring to the attached drawings, preferred embodiments of the present invention were explained in detail, but the present invention is not limited to these examples. It is clear that a person having ordinary skill in the field of art to which the present invention belongs can conceive of various changes or corrections within the scope of the technical concepts described in the claims. It will be understood that these naturally also fall in the technical scope of the present invention.

REFERENCE SIGNS LIST 1. solid-polymer fuel cell
10, 20. separator
30, 40. gas diffusion layer
50, 60. catalyst layer
70. electrolytic film

The invention claimed is:

1. A carbon material for catalyst carrier use able to carry a catalyst for solid-polymer fuel cell use, said carbon material for catalyst carrier use satisfying the following (A) to (D):
   (A) an oxygen content $O_{ICP}$ of 0.1 to 3.0 mass % contained in the carbon material for catalyst carrier use;
   (B) a residual amount of oxygen $O_{1200°\,C.}$ of 0.1 to 1.5 mass % wherein the residual amount of oxygen is measured by heating the carbon material in an inert gas (or vacuum) atmosphere at 1200° C.;
   (C) a BET specific surface area of 300 to 1500 m$^2$/g; and
   (D) a G-band half-width $\Delta G$ of 30 to 70 cm$^{-1}$ detected in a range of 1550 to 1650 cm$^{-1}$ of the Raman spectrum.

2. The carbon material for catalyst carrier use according to claim 1, wherein the residual amount of oxygen $O_{1200°\,C.}$ is 0.1 to 1.2 mass %.

3. The carbon material for catalyst carrier use according to claim 1 or 2, wherein a residual amount of hydrogen $H_{1200°\,C.}$ at the time of treatment in an inert gas (or vacuum) atmosphere at 1200° C. is 0.005 to 0.080 mass %, wherein the residual amount of hydrogen is measured by heating the carbon material.

4. The carbon material for catalyst carrier use according to claim 1 or 2, wherein the oxygen content $O_{ICP}$ is 0.1 to 2.0 mass %.

5. The carbon material for catalyst carrier use according to claim 1 or 2, wherein the BET specific surface area is 500 to 1500 m$^2$/g.

6. The carbon material for catalyst carrier use according to claim 1 or 2, further satisfying the following (E) to (H):
   (E) a CO gas quantity $Q_{CO}$ of 50 to 250 μmol/g generated at 600 to 900° C. in temperature region in TPD measurement;
   (F) a CO$_2$ gas quantity $Q_{CO2}$ of 10 to 100 μmol/g generated at 300 to 700° C. in temperature region in TPD measurement;
   (G) a micropore area $S_{micro}$ of 200 to 800 m$^2$/g; and
   (H) $Q_{CO} > Q_{CO2}$.

7. The carbon material for catalyst carrier use according to claim 6, wherein said CO gas quantity $Q_{CO}$ is 80 to 200 μmol/g.

8. The carbon material for catalyst carrier use according to claim 6, wherein said CO$_2$ gas quantity $Q_{CO2}$ is 15 to 60 μmol/g.

9. The carbon material for catalyst carrier use according to claim 7, wherein said CO$_2$ gas quantity $Q_{CO2}$ is 15 to 60 μmol/g.

10. The carbon material for catalyst carrier use according to claim 1 or 2, further satisfying the following (I) to (J):
    (I) a nitrogen content $N_{ICP}$ of 0.3 to 5.0 mass % contained in the carbon material for catalyst carrier use; and
    (J) a residual amount of nitrogen $N_{900°\,C.}$ of 0.2 to 4.0 mass % wherein the residual amount of nitrogen is measured by heating the carbon material in an inert gas (or vacuum) atmosphere at 900° C.

11. The carbon material for catalyst carrier use according to claim 10, wherein the BET specific surface area is 400 to 1200 m$^2$/g.

12. The carbon material for catalyst carrier use according to claim 10, wherein a G-band half-width $\Delta G$ detected in a range of 1550 to 1650 cm$^{-1}$ of the Raman spectrum is 30 to 60 cm$^{-1}$.

13. The carbon material for catalyst carrier use according to claim 11, wherein a G-band half-width $\Delta G$ detected in a range of 1550 to 1650 cm$^{-1}$ of the Raman spectrum is 30 to 60 cm$^{-1}$.

14. The carbon material for catalyst carrier use according to claim 10, wherein in an $N_{1s}$ spectrum measured by XPS, an $N_{1s}$ intensity ratio (N-Q/N-6) of an N-6 peak with a binding energy near 398.5 eV and an N-Q peak near 400.5 eV is 0.2 to 1.6 in range.

15. The carbon material for catalyst carrier use according to claim 10, wherein a residual amount of nitrogen $N_{900°\,C.}$ is 0.2 to 3.5 mass %.

16. The carbon material for catalyst carrier use according to claim 1 or 2, further satisfying the following (K):
    (K) a boron content $B_{ICP}$ of 0.3 to 5.0 mass %.

17. The carbon material for catalyst carrier use according to claim 16, wherein the oxygen content $O_{ICP}$ is 0.3 to 3.0 mass %.

18. The carbon material for catalyst carrier use according to claim 16, wherein the BET specific surface area $S_{BET}$ is 300 to 1000 m$^2$/g.

19. The carbon material for catalyst carrier use according to claim 17, wherein the BET specific surface area $S_{BET}$ is 300 to 1000 m$^2$/g.

20. The carbon material for catalyst carrier use according to claim 16, wherein in a $B_{1s}$ spectrum measured by XPS, an intensity ratio (BO/BC) of a peak (BO) corresponding to a B—O bond with a binding energy near 192 eV and a peak (BC) corresponding to a B—C bond with a binding energy near 186 eV is 0.2 to 1.5.

21. The carbon material for catalyst carrier use according to claim 16, wherein the residual amount of oxygen $O_{900°\,C.}$ after heat treatment in an inert gas atmosphere at 900° C. is 0.2 to 2.0 mass %, wherein the residual amount of oxygen is measured by heating the carbon material.

22. A catalyst for solid-polymer fuel cell use comprising the carbon material for catalyst carrier use according to claim 1 or 2 and a catalyst metal carried in said carbon material for catalyst carrier use.

23. The catalyst for solid-polymer fuel cell use according to claim 19, wherein said catalyst metal is platinum or a platinum alloy mainly comprised of platinum.

24. A solid-polymer fuel cell comprising the catalyst for solid-polymer fuel cell use according to claim 22.

25. A solid-polymer fuel cell comprising the catalyst for solid-polymer fuel cell use according to claim 23.

26. A method of production of a carbon material for catalyst carrier use according to claim 10,
    said method comprising:
    an oxidation treatment step of oxidizing a porous carbon material to introduce oxygen-containing functional groups into said porous carbon material;
    a step of adjusting the residual amount of oxygen $O_{1200°\,C.}$ by subsequent heat treatment in an inert atmosphere;
    a nitrogen substitution step of substituting nitrogen-containing functional groups for part or all of said oxygen-containing functional groups by nitrogen substitution treatment of heating the porous carbon material obtained by adjusting the residual amount of oxygen $O_{1200°\ C.}$, in an ammonia gas atmosphere; and a functional group modifying step of heat treating the porous carbon material after nitrogen substitution treatment obtained at said nitrogen substitution step, in an inert gas and/or ammonia gas atmosphere to modify the nitrogen-containing functional groups formed in the nitrogen substitution step to nitrogen-containing functional groups mainly comprised of pyridine-type nitrogen and quaternary-type nitrogen.

27. The method of production of a carbon material for catalyst carrier use according to claim 10, said method comprising:

an oxidation treatment step of oxidizing a porous carbon material to introduce oxygen-containing functional groups into said porous carbon material;

a step of adjusting the residual amount of oxygen $O_{1200°\ C.}$ by subsequent heat treatment in an inert atmosphere;

a carrying treatment step of making the porous carbon material obtained in the step of adjusting said residual amount of oxygen $O_{1200°\ C.}$ carry a nitrogen-containing organic compound; and a fixation treatment step of heat treating the porous carbon material after the carrying treatment obtained by this carrying treatment step in an inert gas and/or reducing gas atmosphere at 500 to 1100° C. to fix the nitrogen in the nitrogen-containing organic compound on the porous carbon material.

28. The method of production of a carbon material for catalyst carrier use according to claim 27, wherein said carrying treatment step comprising dispersing the porous carbon material in a nitrogen-containing organic compound solution obtained by dissolving the nitrogen-containing organic compound in a solvent, then evaporating off the solvent from the obtained nitrogen-containing organic compound solution.

29. The method of production of a carbon material for catalyst carrier use according to claim 27, wherein said fixation treatment step comprising performing heat treatment in a reducing gas atmosphere containing 5 to 100 vol % of ammonia gas as a reducing gas and having a balance of an inert gas, at 500 to 1100° C.

30. The method of production of a carbon material for catalyst carrier use according to claim 28, wherein said fixation treatment step comprising performing heat treatment in a reducing gas atmosphere containing 5 to 100 vol % of ammonia gas as a reducing gas and having a balance of an inert gas, at 500 to 1100° C.

31. The method of production of a carbon material for catalyst carrier use according to claim 27, wherein said fixation treatment step comprising performing heat treatment in a reducing gas atmosphere containing 5 to 100 vol % of ammonia gas as a reducing gas and having a balance of an inert gas, at 500 to 1100° C., then performing heat treatment again in an inert gas atmosphere at 700 to 1100° C.

32. The method of production of a carbon material for catalyst carrier use according to claim 27, wherein said porous carbon material is a porous carbon material controlled in crystallinity obtained by heat treating the porous carbon material in an inert gas atmosphere at 1400 to 2500° C. to control the crystallinity.

33. The method of production of a carbon material for catalyst carrier use according to claim 27, wherein a BET specific surface area of said porous carbon material is 300 to 1200 m$^2$/g.

34. The method of production of a carbon material for catalyst carrier use according to claim 27, wherein a melting point, decomposition temperature, or sublimation temperature of said nitrogen-containing organic compound is 200° C. or more.

35. The method of production of a carbon material for catalyst carrier use according to claim 16, said method comprising:

an oxidation treatment step of oxidizing the porous carbon material to introduce oxygen-containing functional groups into said porous carbon material;

a step of adjusting the residual amount of oxygen $O_{1200°\ C.}$ by subsequent heat treatment in an inert atmosphere;

a boron source carrying step of making a starting carbon material comprised of a porous carbon material obtained in said step of adjusting the residual amount of oxygen $O_{1200°\ C.}$ carry a boron source comprised of a boron-containing compound, a boron introducing step of heat treating the boron source-carrying carbon material obtained at said boron source carrying step in an inert gas atmosphere to make boron diffuse to the inside of the carbon material; and an oxygen content adjusting step of oxidizing the boron-containing carbon material obtained in said boron introducing step in an oxidizing gas atmosphere, then heat treating the boron-containing carbon material in an inert gas and/or reducing gas atmosphere to adjust the oxygen content.

* * * * *